US010698847B2

(12) United States Patent
Ngo et al.

(10) Patent No.: US 10,698,847 B2
(45) Date of Patent: Jun. 30, 2020

(54) ONE WIRE BUS TO RFFE TRANSLATION SYSTEM

(71) Applicant: Qorvo US, Inc., Greensboro, NC (US)

(72) Inventors: Christopher Truong Ngo, Queen Creek, AZ (US); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 572 days.

(21) Appl. No.: 15/365,295

(22) Filed: Nov. 30, 2016

(65) Prior Publication Data

US 2017/0255578 A1    Sep. 7, 2017

Related U.S. Application Data

(60) Provisional application No. 62/302,137, filed on Mar. 1, 2016.

(51) Int. Cl.
*G06F 13/364* (2006.01)
*G06F 13/42* (2006.01)
*G06F 13/40* (2006.01)

(52) U.S. Cl.
CPC .......... *G06F 13/364* (2013.01); *G06F 13/404* (2013.01); *G06F 13/4282* (2013.01)

(58) Field of Classification Search
CPC ...... G06F 3/0619; G06F 3/0604; G06F 3/061; G06F 3/0659; G06F 3/0647; G06F 2211/002
USPC ...................................................... 710/110
See application file for complete search history.

(56) References Cited

U.S. PATENT DOCUMENTS

| | | | |
|---|---|---|---|
| 3,953,835 | A | 4/1976 | Cuccio et al. |
| 5,684,803 | A | 11/1997 | Nguyen Thuy |
| 5,787,132 | A | 7/1998 | Kishigami et al. |
| 5,832,207 | A | 11/1998 | Little et al. |
| 6,408,163 | B1 | 6/2002 | Fik |
| 6,484,268 | B2 | 11/2002 | Tamura et al. |
| 7,685,320 | B1 | 3/2010 | Wishneusky |

(Continued)

OTHER PUBLICATIONS

Non-Final Office Action for U.S. Appl. No. 14/659,292, dated Dec. 21, 2018, 23 pages.

(Continued)

*Primary Examiner* — Titus Wong
(74) *Attorney, Agent, or Firm* — Withrow & Terranova, P.L.L.C.

(57) ABSTRACT

This disclosure relates generally to bus interface systems for mobile user devices. In one embodiment, the bus interface system includes a first bus interface subsystem that operates in accordance with a one wire bus protocol, a second bus interface subsystem that operates in accordance with a Mobile Industry Processor Interface (MIPI) radio frequency front end (RFFE) bus protocol, and a translation bus controller that translates commands between the first bus interface subsystem and the second bus interface system. The translation bus controller is configured to implement cross over bus operations between a master bus controller that operates in accordance with in the one wire bus protocol and a slave bus controller in the second bus interface system. In this manner, the translation bus allows the master bus controller to be the master of different bus systems that operate in accordance with different bus protocols.

20 Claims, 10 Drawing Sheets

(56) References Cited

U.S. PATENT DOCUMENTS

| | | | |
|---|---|---|---|
| 7,729,427 | B2 | 6/2010 | Kwok |
| 8,509,318 | B2 | 8/2013 | Tailliet |
| 9,430,321 | B2 | 8/2016 | Slik |
| 9,519,612 | B2 | 12/2016 | Hietala et al. |
| 9,569,386 | B2 | 2/2017 | Du |
| 9,639,500 | B2 | 5/2017 | Bas et al. |
| 9,652,451 | B2 | 5/2017 | Elder |
| 9,690,725 | B2 | 6/2017 | Sengoku |
| 9,755,821 | B2 | 9/2017 | Jang et al. |
| 9,946,677 | B2 | 4/2018 | Hapke |
| 2001/0050713 | A1 | 12/2001 | Kubo et al. |
| 2004/0049619 | A1* | 3/2004 | Lin .................... G06F 13/4068 710/105 |
| 2004/0100400 | A1 | 5/2004 | Perelman et al. |
| 2004/0128594 | A1 | 7/2004 | Elmhurst et al. |
| 2004/0221067 | A1 | 11/2004 | Huang et al. |
| 2005/0012492 | A1 | 1/2005 | Mihalka |
| 2006/0031618 | A1 | 2/2006 | Hansquine et al. |
| 2006/0050694 | A1 | 3/2006 | Bury et al. |
| 2006/0152236 | A1 | 7/2006 | Kim |
| 2006/0236008 | A1 | 10/2006 | Asano et al. |
| 2009/0248932 | A1 | 10/2009 | Taylor et al. |
| 2011/0035632 | A1 | 2/2011 | Hong et al. |
| 2011/0113171 | A1 | 5/2011 | Radhakrishnan et al. |
| 2012/0027104 | A1 | 2/2012 | Bas et al. |
| 2012/0030753 | A1 | 2/2012 | Bas et al. |
| 2012/0226965 | A1 | 9/2012 | Hammerschmidt et al. |
| 2012/0303836 | A1* | 11/2012 | Ngo .................... G06F 13/4247 710/10 |
| 2013/0054850 | A1 | 2/2013 | Co |
| 2013/0124763 | A1 | 5/2013 | Kessler |
| 2013/0132624 | A1 | 5/2013 | Chen et al. |
| 2013/0197920 | A1 | 8/2013 | Lesso et al. |
| 2013/0265884 | A1 | 10/2013 | Brombal et al. |
| 2013/0301689 | A1* | 11/2013 | Marchand ................ H04B 1/38 375/219 |
| 2014/0025999 | A1* | 1/2014 | Kessler ............... G06F 13/4295 714/43 |
| 2014/0112339 | A1 | 4/2014 | Safranek et al. |
| 2014/0376278 | A1 | 12/2014 | Fornage et al. |
| 2015/0056941 | A1* | 2/2015 | Lin .......................... H04B 1/18 455/352 |
| 2015/0074306 | A1* | 3/2015 | Ayyagari ............ G06F 13/4295 710/110 |
| 2015/0106541 | A1 | 4/2015 | Southcombe et al. |
| 2015/0127862 | A1 | 5/2015 | Fan et al. |
| 2015/0169482 | A1 | 6/2015 | Ngo et al. |
| 2015/0192974 | A1 | 7/2015 | Ngo et al. |
| 2015/0193297 | A1 | 7/2015 | Ngo et al. |
| 2015/0193298 | A1* | 7/2015 | Ngo ........................ G06F 11/08 714/758 |
| 2015/0193321 | A1 | 7/2015 | Ngo et al. |
| 2015/0193373 | A1 | 7/2015 | Ngo et al. |
| 2016/0050513 | A1* | 2/2016 | Wang ...................... H04W 4/70 340/870.07 |
| 2016/0124892 | A1 | 5/2016 | Amarilio et al. |

OTHER PUBLICATIONS

Non-Final Office Action for U.S. Appl. No. 14/659,355, dated Oct. 12, 2018, 8 pages.
Final Office Action for U.S. Appl. No. 15/467,790, dated Nov. 5, 2018, 15 pages.
Non-Final Office Action for U.S. Appl. No. 15/443,236, dated Nov. 16, 2018, 19 pages.
Final Office Action for U.S. Appl. No. 14/659,292, dated Apr. 30, 2018, 24 pages.
Final Office Action for U.S. Appl. No. 14/659,328, dated Mar. 20, 2018, 61 pages.
Final Office Action for U.S. Appl. No. 14/659,355, dated Apr. 17, 2018, 11 pages.
Final Office Action for U.S. Appl. No. 14/659,371, dated May 3, 2018, 21 pages.
Notice of Allowance for U.S. Appl. No. 14/659,379, dated Mar. 20, 2018, 10 pages.
Non-Final Office Action for U.S. Appl. No. 14/575,491, dated Nov. 30, 2017, 18 pages.
Advisory Action for U.S. Appl. No. 14/659,379, dated Feb. 26, 2018, 3 pages.
Author Unknown, "1-Wire," Wikipedia, last modified Jan. 16, 2015, accessed Feb. 12, 2015, http://en.wikipedia.org/wiki/1-Wire, 4 pages.
Author Unknown, "DS1822: Econo 1-Wire Digital Thermometer," Maxim Integrated, 2007, 21 pages.
Author Unknown, "Maxim 1-Wire® Tutorial," Maxim, online audiovisual presentation, 17 slides, No Date, accessed Feb. 12, 2015, http://www.maximintegrated.com/products/1-wire/flash/overview/ (38 images of slides).
Awtry, Dan, et al., "Design Guide v1.0," Springbok Digitronics, Aug. 19, 2004, 96 pages.
Advisory Action for U.S. Appl. No. 14/659,292, dated Aug. 10, 2018, 3 pages.
Notice of Allowance for U.S. Appl. No. 14/659,328, dated Jul. 2, 2018, 8 pages.
Advisory Action for U.S. Appl. No. 14/659,355, dated Jul. 5, 2018, 3 pages.
Advisory Action for U.S. Appl. No. 14/659,371, dated Aug. 1, 2018, 3 pages.
Non-Final Office Action for U.S. Appl. No. 15/467,790, dated Jun. 28, 2018, 14 pages.
Ex Parte Quayle Action for U.S. Appl. No. 15/365,315, mailed Jul. 26, 2018, 7 pages.
Notice of Allowance and Examiner-Initiated Interview Summary for U.S. Appl. No. 15/365,315, dated Sep. 14, 2018, 9 pages.
Notice of Allowance for U.S. Appl. No. 15/472,756, dated Aug. 8, 2018, 8 pages.
Non-Final Office Action for U.S. Appl. No. 14/575,491, dated May 26, 2017, 20 pages.
Non-Final Office Action for U.S. Appl. No. 14/659,379, dated Apr. 7, 2017, 37 pages.
Non-Final Office Action for U.S. Appl. No. 14/659,292, dated Sep. 29, 2017, 27 pages.
Non-Final Office Action for U.S. Appl. No. 14/659,328, dated Sep. 8, 2017, 51 pages.
Non-Final Office Action for U.S. Appl. No. 14/659,355, dated Sep. 20, 2017, 32 pages.
Non-Final Office Action for U.S. Appl. No. 14/659,371, dated Sep. 25, 2017, 23 pages.
Final Office Action for U.S. Appl. No. 14/659,379, dated Oct. 18, 2017, 44 pages.
Non-Final Office Action for U.S. Appl. No. 14/659,371, dated Feb. 26, 2019, 22 pages.
Advisory Action for U.S. Appl. No. 15/467,790, dated Feb. 26, 2019, 3 pages.
Final Office Action for U.S. Appl. No. 14/659,292, dated Jun. 4, 2019, 24 pages.
Final Office Action for U.S. Appl. No. 14/659,355, dated May 2, 2019, 8 pages.
Non-Final Office Action for U.S. Appl. No. 15/886,209, dated May 17, 2019, 7 pages.
Notice of Allowance for U.S. Appl. No. 15/467,790, dated May 20, 2019, 8 pages.
Final Office Action for U.S. Appl. No. 15/443,236, dated May 30, 2019, 20 pages.
Notice of Allowance for U.S. Appl. No. 15/886,209, dated Sep. 11, 2019, 7 pages.
Corrected Notice of Allowance for U.S. Appl. No. 15/467,790, dated Aug. 15, 2019, 6 pages.
Corrected Notice of Allowance for U.S. Appl. No. 15/467,790, dated Aug. 28, 2019, 6 pages.
Notice of Allowance for U.S. Appl. No. 15/443,236, dated Sep. 24, 2019, 8 pages.
Notice of Allowance for U.S. Appl. No. 16/402,613, dated Nov. 4, 2019, 9 pages.
Notice of Allowance for U.S. Appl. No. 16/407,397, dated Nov. 12, 2019, 7 pages.

(56) References Cited

OTHER PUBLICATIONS

International Search Report and Written Opinion for International Patent Application No. PCT/US2020/012702, dated Apr. 7, 2020, 17 pages.
Non-Final Office Action for U.S. Appl. No. 16/736,164, dated Feb. 27, 2020, 7 pages.

* cited by examiner

ONE WIRE BUS TO RFFE TRANSLATION SYSTEM

RELATED APPLICATIONS

This application claims the benefit of provisional patent application Ser. No. 62/302,137, filed Mar. 1, 2016, the disclosure of which is hereby incorporated herein by reference in its entirety.

FIELD OF THE DISCLOSURE

This disclosure relates generally to bus interface systems for mobile user devices.

BACKGROUND

Digital bus interfaces are used to communicate data between components within an electronic device, such as a computer, a radio frequency (RF) front-end module, a cellular telephone, a tablet, a camera, and/or the like. The digital bus interface generally includes at least one master bus controller and one or more slave bus controllers. The master bus controller(s) and the slave bus controller(s) are connected by bus lines and the master bus controller coordinates the transfer of data along the bus lines. The slave bus controllers perform commands (e.g., read and write commands) as coordinated by the master bus controller. If more than one master bus controller is provided, a bus arbitration scheme is generally implemented to negotiate between the various master bus controllers. The bus lines that connect the master bus controller(s) to the slave bus controllers typically include one or more data, power, and clock bus lines. Generally, the size of the digital bus interface increases as more bus lines are provided in the digital bus interface. The increase is due to the number of wires which must be routed between the bus controllers and the number of pins for the bus controllers that must be dedicated to the bus lines. In modern communication systems, the area available for pins and wires is minimal.

To minimize the area need by a digital bus interface, a digital bus interface may be provided as a one wire bus interface system, which provides communication and power to a slave bus controller with only a single bus line. To do this, the one wire bus system operates in accordance with a one wire bus protocol. The one wire bus protocol allows for slave bus controllers in the one wire bus system to decode data in an input data signal without requiring a separate clock signal to be transmitted to the slave bus controllers to synchronize data demodulations. Simultaneously, the one wire bus protocol allows for slave bus controllers to extract power from the input data signal without needing to transmit a separate power signal in order to power the slave bus controllers. This is highly desirable in modern mobile user devices in which space is at a premium and running multiple bus lines to each bus controller can be difficult.

However, Mobile Industry Processor Interface (MIPI) radio frequency front end (RFFE) bus interfaces are common in mobile user devices and utilize a MIPI RFFE bus protocol to communicate between a master bus controller and slave bus controllers in the MIPI bus interface. Often front end circuitry and processing circuitry within the mobile user device will be standardized to communicate using the MIPI bus interface. Therefore, methods and devices are needed which can integrate both types of bus systems to build more universal bus interface systems in a mobile user device.

SUMMARY

This disclosure relates generally to bus interface systems for mobile user devices. In one embodiment, the bus interface system includes a bus interface subsystem that operates in accordance with a pulse width modulation (PWM) bus protocol, a bus interface subsystem that operates in accordance with a Mobile Industry Processor Interface (MIPI) radio frequency front end (RFFE) bus protocol, and a translation bus controller that translates commands between the bus interface subsystem that operates in accordance with the PWM bus protocol and the bus interface system that operates in accordance with the MIPI RFFE bus protocol. The PWM bus protocol is a one wire microbus protocol and the MIPI RFFE bus protocol is a multiwire bus protocol. The translation bus controller is configured to implement cross over bus operations between a master bus controller that operates in accordance with the one wire bus protocol and one or more slave bus controllers in the bus interface subsystem that operate in accordance with the MIPI RFFE bus protocol. In this manner, using the translation bus controller, the master bus controller operating in accordance with the one wire bus protocol can be used as the master bus controller for both bus subsystems. Thus, the translation bus controller is configured to allow for integration between bus interface systems that operate in accordance with different bus protocols.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 illustrates one embodiment of a bus interface system that includes a bus interface subsystem that operates in accordance with a one wire bus protocol (also, a pulse width modulation (PWM) bus protocol), a bus interface subsystem that operates in accordance with a Mobile Industry Processor Interface (MIPI) radio frequency front end (RFFE) bus protocol (which is a type of multiwire bus protocol and also a Pulse Amplitude Modulation (PAM) bus protocol), and a translation bus controller that translates commands between a master bus controller that operates in accordance with one wire bus protocol and slave bus controllers that operate in accordance with the MIPI RFFE bus protocol.

Figure 2:
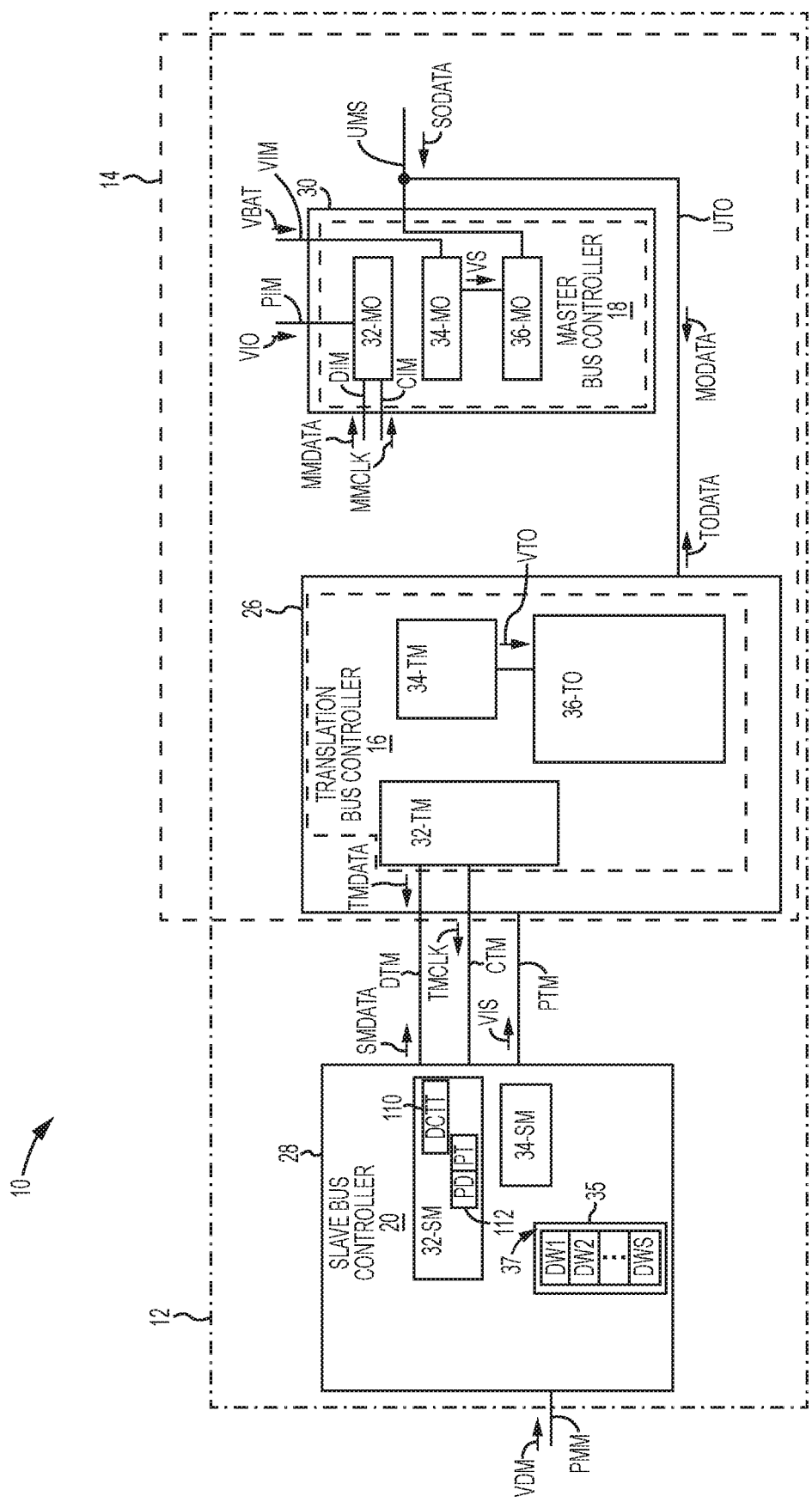
FIG. 2 illustrates an embodiment of the translation bus controller of FIG. 1, the master bus controller from FIG. 1 that operates in accordance with one wire bus protocol, and one of the slave bus controllers of FIG. 1 that operates in accordance with the MIPI RFFE bus protocol.
Figure 3:
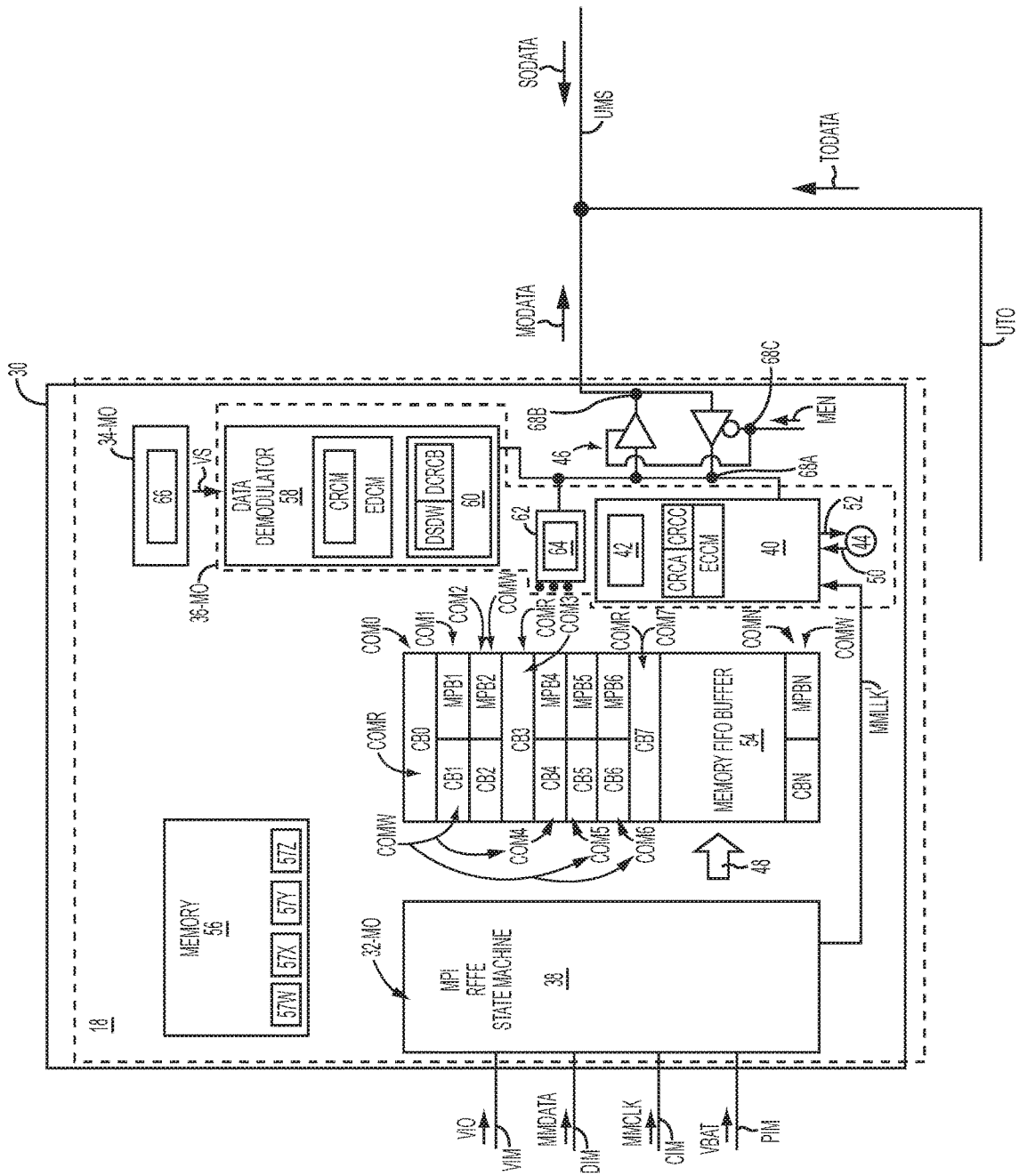
FIG. 3 illustrates a component diagram of one embodiment of the master bus controller shown in FIG. 2.
Figure 4:
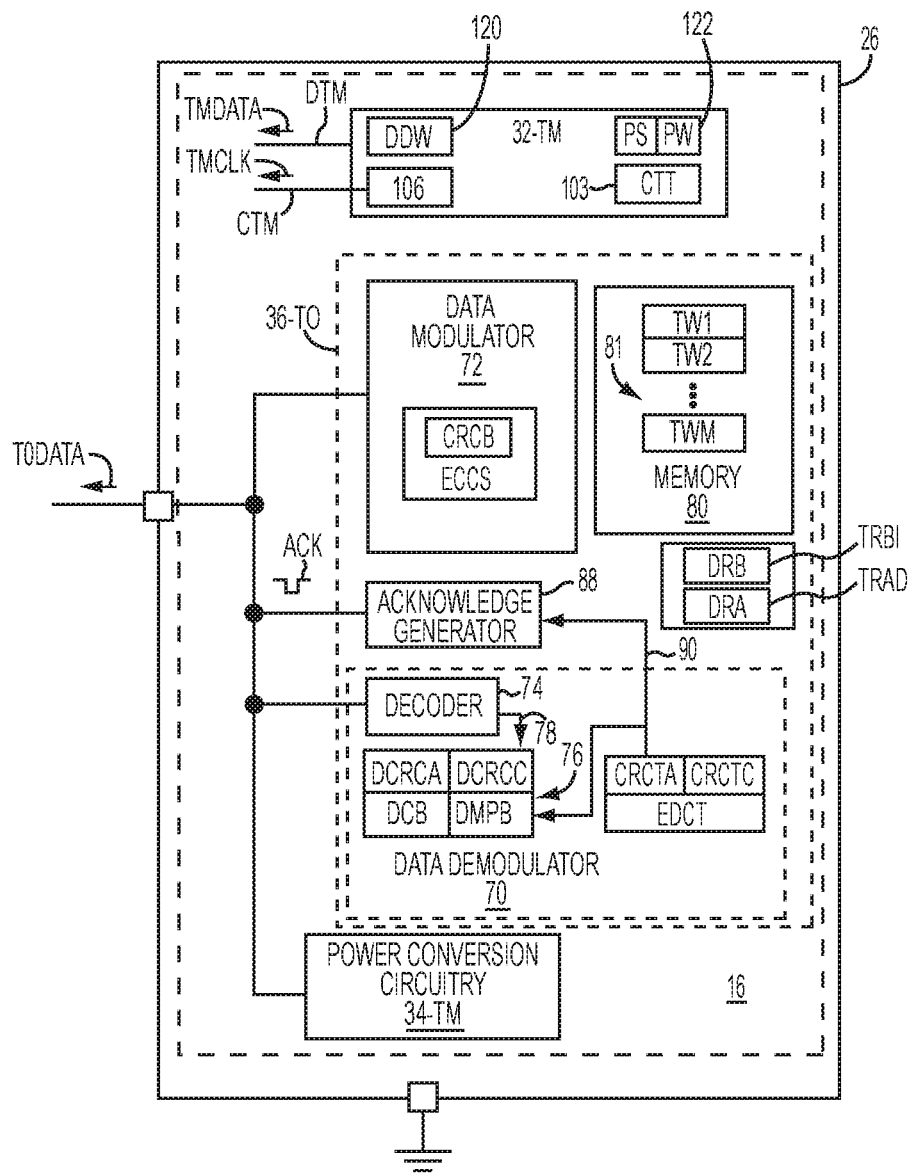
FIG. 4 illustrates a component diagram of one embodiment of the translation bus controller shown in FIG. 2.
Figure 7:
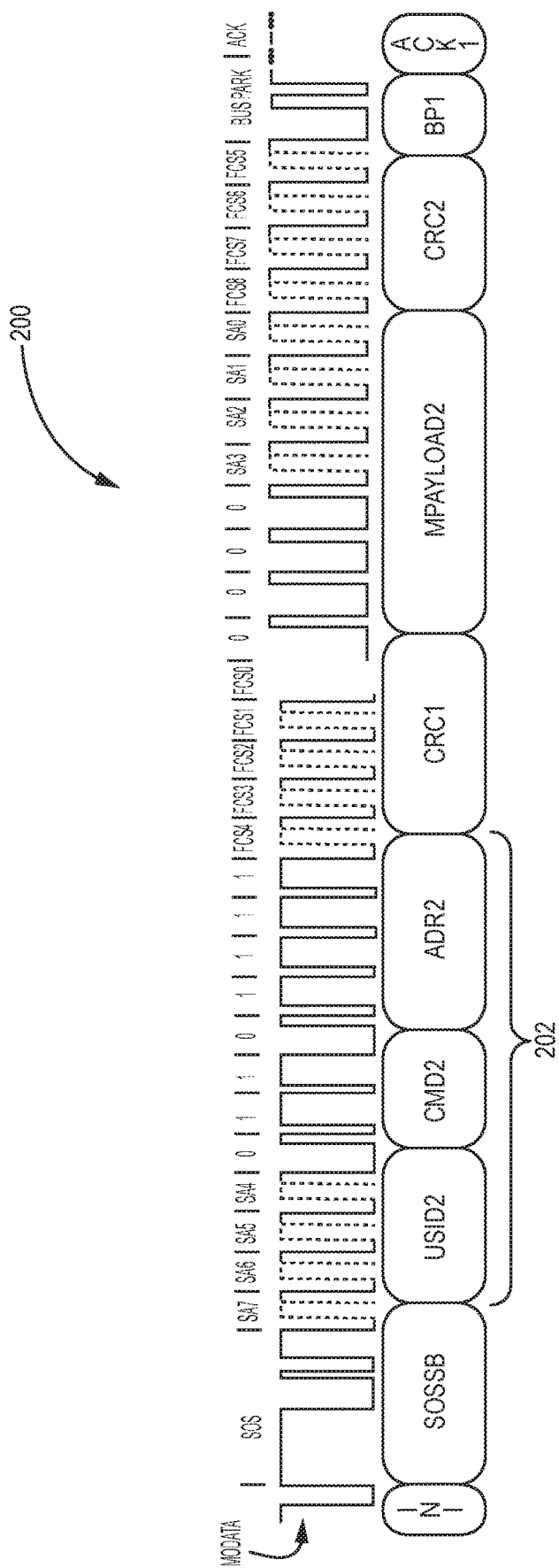
FIG. 7 is a data frame formatted in accordance with one wire bus protocol and implemented between the master bus controller shown in FIG. 3 and the translation bus controller shown in FIG. 4 so that a bus controller identifier for a cross over read bus operation is written to an operational data register of the translation bus controller shown in FIG. 4.
Figure 8:
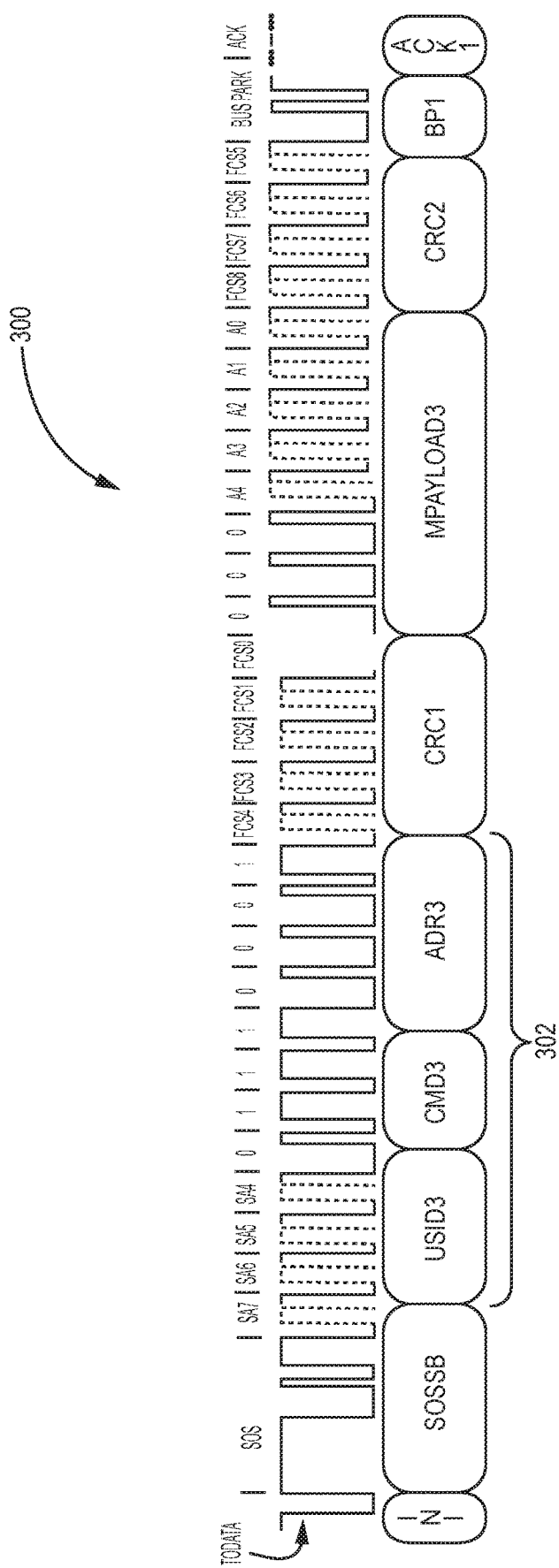
FIG. 8 is a data frame formatted in accordance with one wire bus protocol and implemented between the master bus controller shown in FIG. 3 and the translation bus controller shown in FIG. 4 so that a memory address for the cross over read bus operation is written to another operational data register of the translation bus controller shown in FIG. 4.
Figure 9:
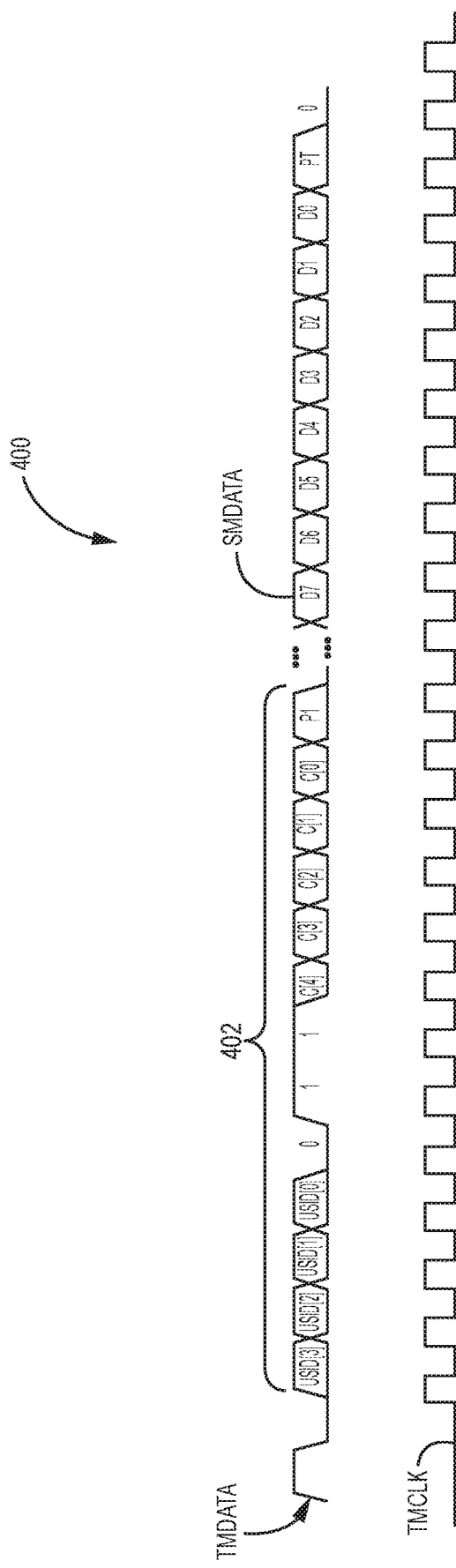

FIG. 9 is a data frame formatted in accordance with the MIPI RFFE bus protocol and implemented between the translation bus controller shown in FIG. 3 and the slave bus controller shown in FIG. 2 so that a data segment stored at a memory location identified by the memory address discussed with respect to FIG. 8 by the slave bus controller identified by the bus controller identifier discussed with respect to FIG. 7 is transmitted to the translation bus controller shown in FIG. 4.

Figure 10:
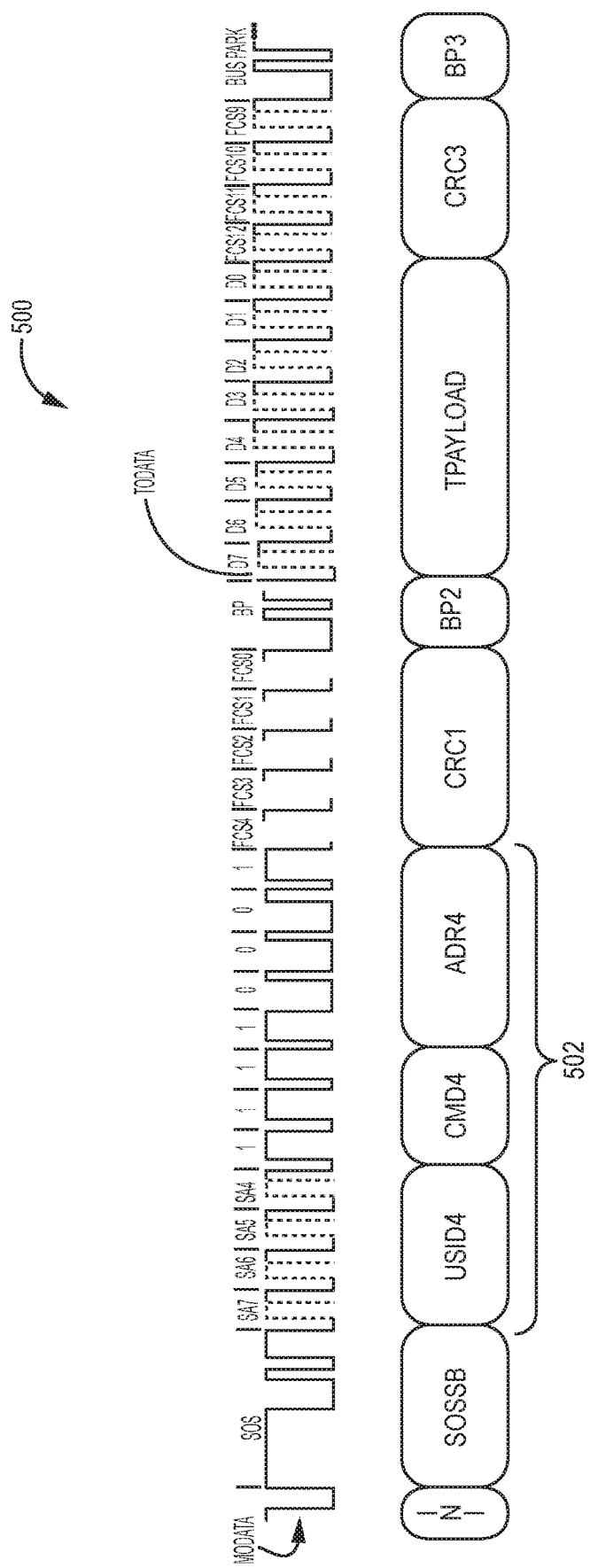

FIG. 10 is a data frame formatted in accordance with one wire bus protocol and implemented between the master bus controller shown in FIG. 3 and the translation bus controller shown in FIG. 4 so that so that a copy of the data segment for the cross over read bus operation is transmitted from the translation bus controller shown in FIG. 4 to the master bus controller shown in FIG. 3.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

With regard to the term "terminal," a terminal refers to any conductive feature in an electronic component for receiving signals, transmitting signals, and/or establishing a connection to another electronic component. For instance, a terminal may be one or more nodes, ports, conductive pads, pins, solder bumps, leads, pins, and/or the like.

When relative terminology, such as "approximately," "substantially," and the like are used in this disclosure, the relative terminology should be interpreted sensu lato but also in accordance to error tolerances dictated by performance parameters for a particular apparatus or method. These performance parameters may be described explicitly and/or implicitly by technical standard(s) relevant to an application that uses the particular apparatus or method to implement certain designed functions.

This disclosure describes systems and methods utilized to integrate different bus interface systems that operate in accordance with different bus protocols. Thus, by utilizing the systems and methods described herein, more universal bus interface systems can be created. While the specific systems and specific methods described in this disclosure relate to a bus interface system that includes a bus interface subsystem that operates in accordance with a one wire bus protocol, a bus interface subsystem that operates in accordance with a Mobile Industry Processor Interface (MIPI) radio frequency front end (RFFE) bus protocol, and a translation bus controller that allows communication between the bus interface subsystem that operates in accordance with the one wire bus protocol and the bus interface subsystem that operates in accordance with MIPI RFFE bus protocol, the concepts and techniques of the systems and methods described herein are applicable to other types of bus protocols. Thus, the methods and systems described herein are not limited to the one wire bus protocol and the MIPI RFFE bus protocol and have application to other types of bus interface systems as would be apparent to one of ordinary skill in the art in light of this disclosure.

Accordingly, embodiments of a bus interface system in accordance with this disclosure include a bus interface subsystem that operates in accordance with a first bus protocol, a bus interface subsystem that operates in accordance with a second bus protocol, and a translation bus controller that translates commands between the bus interface subsystem that operates in accordance with the first bus protocol and the bus interface system that operates in accordance with the second bus protocol. In the specific embodiments described in the Figures herein, the first bus protocol may be a one wire bus protocol, which is also a type of pulse width modulation (PWM) bus protocol, which is described in the aforementioned disclosures. The second bus protocol in the specific embodiments described herein is a multiwire bus protocol such as the MIPI RFFE bus protocol, where the MIPI RFFE bus protocol is a type of multiwire bus protocol.

The translation bus controller of the bus interface system is configured to implement cross over bus operations between a first bus controller in the bus interface subsystem that operates in accordance with the first bus protocol and a second bus controller in the bus interface system that operates in accordance with the second bus protocol. In this manner, the translation bus controller is configured to allow for integration between bus interface subsystems that operate in accordance with the first bus protocol and the second bus protocol. Accordingly, cross over write bus operations and cross over read bus operations may be implemented between the bus interface subsystems since the translation bus controller facilitates cross over bus operation.

Furthermore, like the slave bus controllers described in the aforementioned disclosures, the translation bus controller may include power conversion circuitry configured to convert an input data signal modulated in accordance with the first bus protocol from the first bus controller into a supply voltage that at least partially powers the translation bus controller. For example, the first bus controller may be a master bus controller of the bus interface subsystem, where the master bus controller operates in accordance with the one wire bus protocol (which again is an example of the first bus protocol). As such, the translation bus controller is easily integrated into the bus interface subsystem that operates in accordance with the one wire bus protocol since the master bus controller treats the translation bus controller simply as another slave bus controller in the bus interface subsystem that operates in accordance with the one wire bus protocol.

Figure 1:
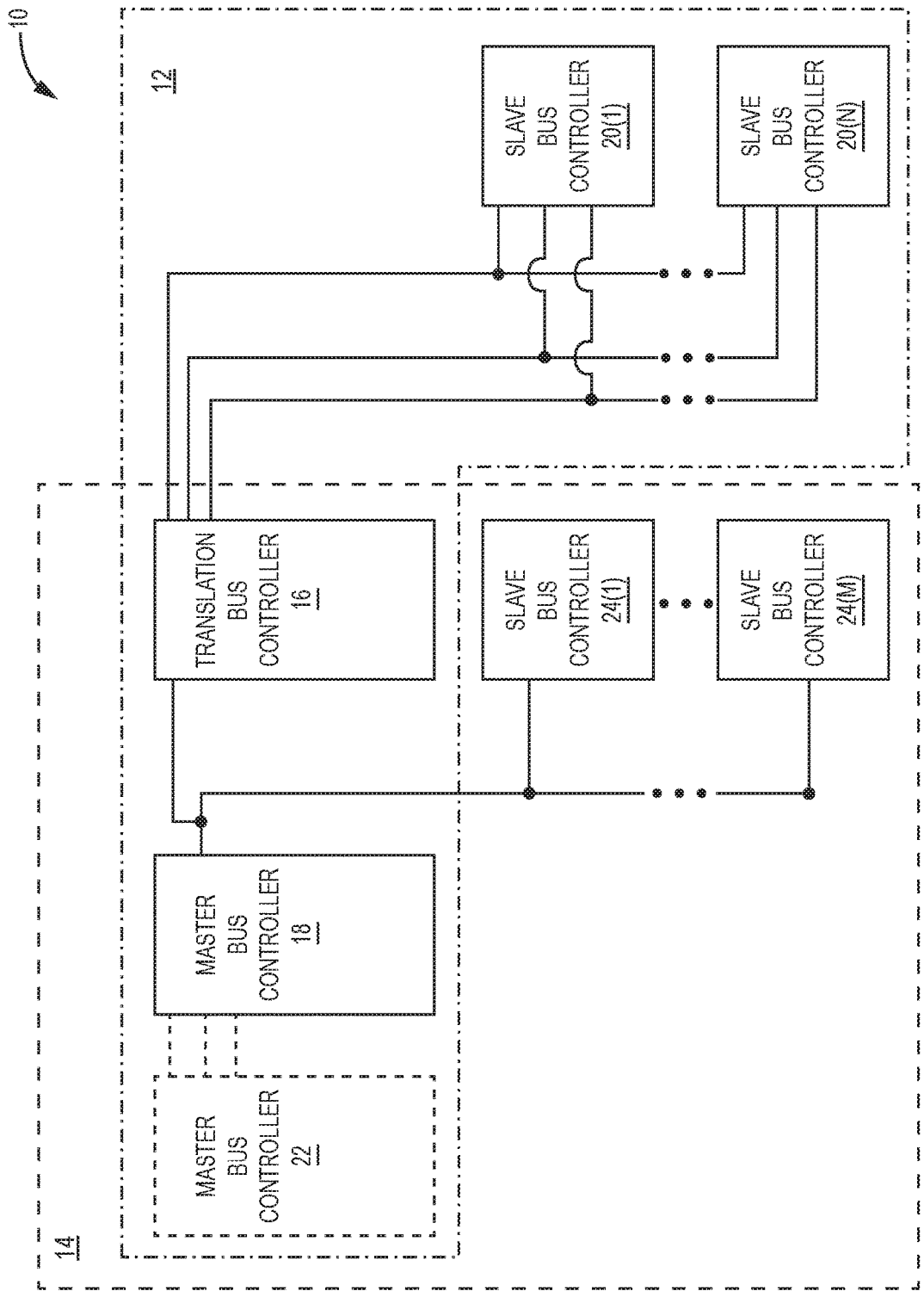

In this regard, FIG. 1 illustrates one embodiment of a bus interface system 10. The bus interface system 10 shown in FIG. 1 is a microbus system. As shown in FIG. 1, the bus interface system 10 is formed by a bus interface system 12 and a bus interface system 14. The bus interface system 12 and the bus interface system 14 within the bus interface system 10 are thus two distinct bus interface systems in that each operates in accordance with different bus protocols. In other words, the bus interface system 12 is a bus interface subsystem of the bus interface system 10 and the bus interface system 14 is another bus interface subsystem of the bus interface system 10.

The bus interface system 12 includes a translation bus controller 16, a master bus controller 18, and slave bus controllers (referred to generally or generically as slave bus controller 20 and specifically as slave bus controllers 20(1)-20(N)). As explained below, the bus interface system 12 may include a master bus controller 22. The bus interface system 12 is a multiline bus interface system. Thus, the bus interface system 12 operates in accordance with a bus protocol that requires at least one bus line to transmit power to each of the slave bus controllers 20 and at least one separate bus line is required for data transmission. In this embodiment, each of the slave bus controllers 20 in the bus interface system 12 requires two bus lines for data transmission, one bus line to transmit data and another bus line to synchronize the data demodulation of the data by the slave bus controllers 20. Different implementations of the bus interface system 12 may include any number of one or more of the slave bus controllers 20 such that N is an integer greater or equal to (1). In the specific example shown in FIG. 1, the bus interface system 12 includes multiple slave bus controllers 20(1)-20(N) and thus the integer number N greater than or equal to two (2). In this specific embodiment, the translation bus controller 16 and the slave bus controllers 20 of the bus interface system 12 operate in accordance with a with a bus protocol. The bus protocol is multiwire bus protocol, which in this specific embodiment, the bus protocol is a Mobile Industry Processor Interface (MIPI) radio frequency front end (RFFE) bus protocol and also a Pulse Amplitude Modulation (PAM) bus protocol.

With regard to the bus interface system 14, the bus interface system 14 includes the translation bus controller 16, the master bus controller 18, and slave bus controllers (referred to generally or generically as slave bus controller 24 and specifically as slave bus controllers 24(1)-24(M)). As explained below, the bus interface system 14 may also include the master bus controller 22. The bus interface system 14 should include at least one of the slave bus controllers 24 such that M is an integer greater or equal to (1). In this embodiment, the bus interface system 14 includes an integer number M of the slave bus controllers 24, where the integer M is greater than or equal to two (2). The bus interface system 14 is a universal one line bus interface system because each of the slave bus controllers 24 only requires one bus line for data and power transmission. The master bus controller 18, the translation bus controller 16, and the slave bus controllers 24 operate in accordance with a one wire bus protocol. In this specific embodiment, the bus protocol is a one wire bus protocol and a pulse width modulation (PWM) bus protocol as described in the aforementioned disclosures.

The master bus controller 18 operates in accordance with the one wire bus protocol. With respect to the bus interface system 14, the master bus controller 18 operates with and is coupled to the slave bus controller 24 in the same manner described in the aforementioned applications. Accordingly, write and read bus operations are performed between the master bus controller 18 and the slave bus controller 24 in the same manner described in the aforementioned applications. The translation bus controller 16 is treated similar to another slave bus controller 24 by the master bus controller 18, as explained in further detail below.

Although the master bus controller 18 operates in accordance with the one wire bus protocol, the master bus controller 18 is also the master bus controller of the bus interface system 12. To do this, the translation bus controller 16 is configured to translate transactional bits from the master bus controller 18 for cross over bus operations into translated data commands, as explained in further detail below. In this manner, the translation bus controller 16 allows for read and write bus operations to be requested by the master bus controller 18 for the slave bus controller 20 of the bus interface system 12 even though the master bus controller 18 operates in accordance with the one wire bus protocol of the bus interface system 14. More specifically, the translation bus controller 16 is configured to translate the transactional bits into a translated data command, which are communicated by the translation bus controller 16 to one or more of the slave bus controller 20 of the bus interface system 12. The bus operations performed using the translation bus controller 16 are referred to as cross over bus operations because these are bus operations between bus controllers operate in accordance with different bus protocols.

The master bus controller 18 and the slave bus controllers 24 of the bus interface system 14 thus operate in accordance with a with a bus protocol that is different than the bus protocol of the slave bus controllers 20 in the bus interface system 12. The translation bus controller 16 allows for cross over bus operations to be implemented between the slave bus controllers 20 of the bus interface system 12 and the master bus controller 18. Thus, for example, the translation bus controller 16 allows for a read bus operation to be implemented between the master bus controller 18 and any one of the slave bus controllers 20 of the bus interface system 12. Additionally, the translation bus controller 16 allows for a write bus operation to be implemented between the master bus controller 18 and any one of the slave bus controllers 20 of the bus interface system 12.

In one implementation, the master bus controller 22 is not provided in the bus interface system 10 and all data commands originate in the master bus controller 18. However, as described in the aforementioned disclosures, the master bus controller 18 may optionally operate as a bridge bus controller in that a master bus controller operating in accordance with the MIPI RFFE bus protocol may communicate data commands to the master bus controller 18 and the master bus controller 18 may then generate data commands formatted in accordance with the one wire bus protocol (also, the PWM bus protocol) to implement those data commands. For example, the master bus controller 22 may be provided in the bus interface system 12 and in the bus interface system 14 but operate in accordance with the MIPI RFFE bus protocol. At least some of the data commands may originate in the master bus controller 22 and the master bus controller 22 may communicate these data commands to the master bus controller 18 in accordance with the MIPI RFFE bus protocol. The master bus controller 18 may then operate as the bridge bus controller and then translate those data commands into data commands formatted in accordance with the one wire bus protocol. The data commands formatted in accordance with the one wire bus protocol would then be implemented by the master bus controller 18 and the slave bus controllers 20, 24 in the same manner as the data commands would be implemented if the master bus controller 22 were not included. Thus, while the master bus controller 18 operates as the master bus controller of both the bus interface system 12 and the bus interface system 14, the master bus controller 18 would be subservient to the master bus controller 22. Thus, the master bus controller 18 would be a slave of the master bus controller 22.

It should be noted then that while the bus controllers 16, 18, 20, 22, 24 are master, bridge, translation, or slave bus controllers with respect to the bus interface systems 12, 14, this does not mean that the bus controllers 16, 18, 20, 22, 24 are exclusively either master, bridge, translation, or slave bus controllers. For example, while the master bus controller 18 operates as the master bus controller of both the bus interface system 12 and the bus interface system 14, the master bus controller 18 would be a slave bus controller of the master bus controller 22. Furthermore, while the slave bus controllers 20, 24 in the specific embodiments discussed herein are exclusively slaves, in alternative embodiments, the slave bus controllers 20, 24 may be master/bridge bus controllers for other slave bus controllers (not shown) of other bus interface systems. These and other arrangements would be apparent to one of ordinary skill in the art in light of this disclosure.

FIG. 2 illustrates an embodiment of the master bus controller 18 and an embodiment of the translation bus controller 16 of the bus interface systems 12, 14. Furthermore, FIG. 2 illustrates an embodiment of one of the slave bus controllers 20 of the bus interface system 12. For instance in different examples of the bus interface system 10 shown in FIG. 1, any one of the slave bus controllers 20(1)-20(N), more than one of the slave bus controllers 20(1)-20(N), or every one of the slave bus controllers 20(1)-20(N) may be provided in the same manner as the slave bus controller 20 shown in FIG. 2. A bus line UTO is connected between the translation bus controller 16 and the master bus controller 18. The translation bus controller 16 is formed on an IC package 26, the slave bus controller 20 is formed on the IC package 28, and the master bus controller 18 is formed by an IC package 30.

The translation bus controller 16 includes bus communication circuitry 32-TM, power conversion circuitry 34-TM, and bus communication circuitry 36-TO. A bus line DTM, a bus line CTM, and a bus line PTM are each connected between the translation bus controller 16 and the slave bus controller 20. The bus communication circuitry 32-TM is configured to generate an input data signal TMDATA along the bus line DTM and encode sets of data pulses in the input data signal TMDATA in accordance with the MIPI RFFE bus protocol. The bus communication circuitry 32-TM of the translation bus controller 16 is further operable to receive an input data signal SMDATA along the bus line DTM from the slave bus controller 20 of the bus interface system 12 and decode the input data signal SMDATA, which are formatted in accordance with the MIPI RFFE bus protocol. To synchronize data transmission between the slave bus controller 20 and the translation bus controller 16, the bus communication circuitry 32-TM is configured to generate a clock signal TMCLK and transmit the clock signal TMCLK along the bus line CTM to the slave bus controller 20. The bus communication circuitry 32-TM is operable to receive a supply voltage VIS along the bus line PTM from the power circuitry 34-SM of the slave bus controller 20. The bus communication circuitry 32-TM of the translation bus controller 16 is powered by the supply voltage VIS. The power circuitry 34-SM is configured to generate the supply voltage VIS along the bus line PTM from the supply voltage VDM.

A bus line UTO is connected between the master bus controller 18 and the translation bus controller 16. The bus communication circuitry 36-TO of the translation bus controller 16 is operable to receive an input data signal MODATA along the bus line UTO from the master bus controller 18 and decode the input data signal MODATA, which is formatted in accordance with the one wire bus protocol (also, the PWM bus protocol). The bus communication circuitry 36-TO of the translation bus controller 16 is also configured to generate an input data signal TODATA along the bus line UTO and modulate the input data signal TODATA in accordance with the one wire bus protocol (also, the PWM bus protocol). The power conversion circuitry 34-TM of the translation bus controller 16 is also operable to receive the input data signal MODATA along the bus line UTO from the master bus controller 18. The power conversion circuitry 34-TM of the translation bus controller 16 is configured to convert the input data signal MODATA into a supply voltage VTO that powers the bus communication circuitry 36-TO.

The slave bus controller 20 of bus interface system 12 includes a bus communication circuitry 32-SM and power circuitry 34-SM. The bus communication circuitry 32-SM is operable to generate the input data signal SMDATA along the bus line DTM and is configured to modulate the input data signal SMDATA in accordance with the MIPI RFFE bus protocol. The bus communication circuitry 32-SM of the slave bus controller 20 is configured to modulate the input data signal SMDATA in accordance with the MIPI RFFE bus protocol to represent data frames, such as for example, data frames resulting from any of intra-bus read and write commands defined by the MIPI RFFE bus protocol wherein the intra-bus read and write commands are addressed either directly or indirectly to the slave bus controller 20. For data transmission with the translation bus controller 16, the bus communication circuitry 32-SM is configured to synchronize the input data signal SMDATA in accordance with the clock signal TMCLK transmitted from the translation bus controller 16 along the bus line CTM. The power circuitry 34-SM of the slave bus controller 20 is operable to receive a supply voltage VDM along a bus line PMM. The power circuitry 34-SM is configured to power the bus communication circuitry 32-SM using the supply voltage VDM.

The bus communication circuitry 32-SM of the slave bus controller 20 is further operable to receive the input data signal TMDATA from the translation bus controller 16. The bus communication circuitry 32-SM of the slave bus controller 20 is configured to decode the input data signal TMDATA, which is formatted in accordance with the MIPI RFFE bus protocol. The bus communication circuitry 32-SM of the slave bus controller 20 is configured synchronize the decoding of the input data signal TMDATA from the translation bus controller 16 in accordance with the clock signal TMCLK. The sets of data pulses represent command data frames of data commands defined by the MIPI RFFE bus protocol. The command data frames represented by the sets of data pulses may be for different types of write commands and different types read commands defined by the MIPI RFFE bus protocol.

The master bus controller 18 includes bus communication circuitry 32-MO, power circuitry 34-MO, and bus communication circuitry 36-MO. A bus line DTM, a bus line CIM, a bus line VIM, and a bus line PIM are each connected between the master bus controller 18 and the master bus controller 22 (shown in FIG. 1) when the master bus controller 22 is provided. The bus communication circuitry 32-MO is configured to receive an input data signal MMDATA along the bus line DIM from the master bus controller 22 (shown in FIG. 1) of the bus interface system 12 and decode the input data signal MMDATA, which is formatted in accordance with the MIPI RFFE bus protocol. To synchronize data transmission between the master bus controller 22 (shown in FIG. 1) and the master bus controller 18, the master bus controller 22 (shown in FIG. 1) is configured to generate a clock signal MMCLK and transmit the clock signal MMCLK along the bus line CIM to the bus communication circuitry 32-MO of the master bus controller 18. The bus communication circuitry 32-MO of the master bus controller 18 is configured to synchronize decoding the input data signal MMDATA in accordance with the clock signal MMCLK. The bus communication circuitry 32-MO is operable to receive a supply voltage VIO, which in this case is used as a control voltage VIO, along the bus line PIM from the master bus controller 22 (shown in FIG. 1). The power circuitry 34-MO of the master bus controller 18 is configured to receive a power source voltage VBAT along a bus line VIM. The power circuitry 34-MO is configured to generate powered by a supply voltage VS from the power source voltage VBAT. The power circuitry 34-MO is configured to set a supply voltage level of the supply voltage VS in accordance with a voltage level of the control voltage VIO. The bus communication circuitry 36-MO is configured to receive the supply voltage VS, which powers the bus communication circuitry 36-MO.

The data commands represented by the input data signal MMDATA are defined by the MIPI RFFE bus protocol and thus may be any type of write data commands and any type of read data commands that are defined by the MIPI RFFE bus protocol. In other words, the data commands are intra-bus data commands defined by the MIPI RFFE bus protocol for implementing MIPI RFFE data operations.

Referring again to the slave bus controller 20 shown in FIG. 2, the slave bus controller 20 includes a memory device 35 configured to store slave data 37. The slave data 37 includes data segments (referred to generically as elements "DW" and specifically as elements "DW1-DWS"). The memory device 35 is configured to assign memory addresses to locations of the data segments DW1-DWS within the slave data 37. Thus, each of the data segments is located within the slave data 37 at one of the memory addresses. Write commands and read commands (whether intra-bus or inter-bus) format the MIPI RFFE bus protocol request to write one or more of the data segments DW or request to read one or more of the data segments DW at the specified memory address(es).

The master bus controller 18 includes bus communication circuitry 32-MO, power circuitry 34-MO, and bus communication circuitry 36-MO. The bus communication circuitry 32-MO of the master bus controller 18 is operable to receive an input data signal MMDATA from the master bus controller 22 (shown in FIG. 1) if the master bus controller 22 is provided. The bus communication circuitry 32-MO of the master bus controller 18 is configured to decode the sets of data pulses in the input data signal MMDATA formatted in accordance with the MIPI RFFE bus protocol.

A bus line UMS connects the master bus controller 18 to the slave bus controllers 20. The bus communication circuitry 36-MO of the master bus controller 18 is operable to generate the input data signal MODATA along the bus line UMS and is configured to modulate the input data signal MODATA in accordance with the one wire bus protocol (also, the PWM bus protocol). In this embodiment, the bus line UTO is connected to the bus line UMS and thus, the bus communication circuitry 36-TO of the translation bus controller 16 is also operable to receive the input data signal MODATA from the master bus controller 18 along the bus line UTO. In turn, the bus communication circuitry 36-MO of master bus controller 18 is operable to receive the input data signal TODATA from the translation bus controller 16 along the bus line UTO and decode the input data signal TODATA formatted in accordance with the one wire bus protocol (also, the PWM bus protocol).

The bus communication circuitry 36-MO of master bus controller 18 is also operable to receive a different input data signal SODATA from each of the slave bus controllers 24(1)-24(M) in the bus interface system 14 (shown in FIG. 1) along the bus line UMS and decode the sets of data pulses formatted in accordance with the one wire bus protocol (also, the PWM bus protocol). Each of the slave bus controllers 24(1)-24(M) (shown in FIG. 1) is configured to format the data pulses within the respective input data signals SODATA in accordance with the one wire bus protocol (also, the PWM bus protocol). The bus communication circuitry 36-MO is also operable to receive the input data signal SODATA from each of the slave bus controllers 24(1)-24(M) (shown in FIG. 1) in the bus interface system 14 along the bus line UMS and decode the sets of data pulses formatted in accordance with the one wire bus protocol (also, the PWM bus protocol).

As previously mentioned, the bus communication circuitry 36-MO of the master bus controller 18 is configured to modulate the input data signal MODATA in accordance with the one wire bus protocol (also, the PWM bus protocol) and transmit the input data signal MODATA to the slave bus controllers 24(1)-24(M) (shown in FIG. 1). In this case, the data commands represented by the input data signal MODATA are defined by the one wire bus protocol (also, the PWM bus protocol) as intra-bus data commands and thus may be any type of write data commands and any type of read data commands that are defined by the one wire bus protocol (also, the PWM bus protocol) to be implemented between the master bus controller 18 and the slave bus controllers 24(1)-24(M) (shown in FIG. 1) within the bus interface system 14. The intra-bus data commands may be any of the write commands and read commands discussed in the aforementioned disclosures. In other words, the data commands are intra-bus data commands defined by the one wire bus protocol (also, the PWM bus protocol) for implementing one wire bus operations.

However, the translation bus controller 16 allows the bus interface system 10 to implement cross over bus operations between the master bus controller 18 and the slave bus controller 20. For example, the translation bus controller 16 allows the bus interface system 10 to implement a cross over write bus operation, where the master bus controller 18 writes to the slave bus controller 20 (which may be any of the slave bus controllers 20(1)-20(N) shown in FIG. 1) in the bus interface system 12. Additionally, the translation bus controller 16 allows the bus interface system 10 to implement a cross over read bus operation, where the master bus controller 18 reads from the slave bus controller 20 (which may be any of the slave bus controllers 20(1)-20(N) shown in FIG. 1) in the bus interface system 12.

To implement the cross over bus operations, the bus communication circuitry 36-MO of the master bus controller 18 is operable to generate the input data signal MODATA with sets of data pulses formatted in accordance to the one wire bus protocol (also, the PWM bus protocol). The sets of data pulses represent cross over commands defined by the one wire bus protocol (also, the PWM bus protocol). The bus communication circuitry 36-MO of the master bus controller 18 is configured to transmit the input data signal MODATA with the sets of data pulses that represent data commands to the bus communication circuitry 36-TO of the translation bus controller 16.

The bus communication circuitry 36-TO of the translation bus controller 16 is configured to decode the sets of data pulses of the input data signal MODATA that represent data commands defined by the one wire bus protocol (also, the PWM bus protocol) into decoded data commands. By decoding the sets of data pulses of the input data signal MODATA that represent data commands defined by the one wire bus protocol (also, the PWM bus protocol), the bus communication circuitry 36-TO of the translation bus controller 16 thus generates the decoded data commands which include decoded command fields, decoded slave identifiers, decoded memory addresses, decoded payloads (if applicable), and decoded error codes from the sets of data pulses of the input data signal MODATA.

Since the decoded data commands are directed towards one or more of the slave bus controllers 20(1)-20(N) (shown in FIG. 1) within the bus interface system 12, the bus communication circuitry 36-TO of the translation bus controller 16 is configured to transfer the decoded data commands to the bus communication circuitry 32-TM. The bus communication circuitry 32-TM of the translation bus controller 16 is configured to translate the decoded data commands into data commands defined by the MIPI RFFE bus protocol. The bus communication circuitry 32-TM of the translation bus controller 16 is then operable to generate the input data signal TMDATA. The bus communication circuitry 32-TM of the translation bus controller 16 is configured to encode the input data signal TMDATA with sets of data pulses formatted in accordance with the MIPI RFFE bus protocol. The sets of data pulses within the input data signal TMDATA represents the cross over commands defined by the MIPI RFFE bus protocol. The bus communication circuitry 32-TM of the translation bus controller 16 is also configured to transmit the input data signal TMDATA to the slave bus controller 20 (which may be any one of the slave bus controllers 20(1)-20(N) shown in FIG. 1).

The bus communication circuitry 32-SM of the slave bus controller 20 is configured to decode the input data signal TMDATA into decoded data commands defined by the MIPI RFFE bus protocol, which in this case is also the multiwire bus protocol and the PAM bus protocol. When the decoded data commands are directed directly or indirectly to the slave bus controller 20, the bus communication circuitry 32-SM is configured to translate the decoded data commands from the bus communication circuitry 36-TO into data commands defined by the MIPI RFFE bus protocol. In contrast, the data commands represented by an input data signal MMDATA from the master bus controller 22 (shown in FIG. 1) defined by the MIPI RFFE bus protocol are intra-bus data commands and thus may be any type of write data commands and any type of read data commands that are defined by the MIPI RFFE bus protocol.

The bus communication circuitry 32-SM is configured to encode the sets of data pulses within the input data signal SMDATA in accordance with data frames defined by the MIPI RFFE bus protocol, such as for example, data frames for cross over read commands defined by the MIPI RFFE bus protocol wherein the cross over read commands are addressed either directly or indirectly to the slave bus controller 20. The bus communication circuitry 32-SM is configured to transmit the input data signal SMDATA to the bus communication circuitry 32-TM of the translation bus controller 16. The bus communication circuitry 32-TM of the translation bus controller 16 is configured to decode the sets of data pulses of the input data signal SMDATA in accordance with the MIPI RFFE bus protocol into decoded bus commands. The power circuitry 34-SM is operable to receive the supply voltage VDM along the bus line PMM from the master bus controller 22. The power circuitry 34-SM is configured to generate the supply voltage VIS from the supply voltage VDM and transmit the supply voltage VIS along the bus line PMM to the bus communication circuitry 32-TM of the translation bus controller 16.

The bus communication circuitry 36-TO modulates the input data signal TODATA in accordance with the one wire bus protocol (also, the PWM bus protocol). The set of data pulses represent a data frame, which is a copy of the decoded data frame and thus the data frame is formatted in accordance with the one wire bus protocol (also, the PWM bus protocol). The bus communication circuitry 36-TO transmits the input data signal TODATA to the bus communication circuitry 36-MO of the master bus controller 18. The bus communication circuitry 36-MO of the master bus controller 18 decodes the set of data pulses within the input data signal TODATA. Since the set of data pulses within the input data signal TODATA represent the data frame, the bus communication circuitry 36-MO decodes the set of data pulses within the input data signal TODATA into a decoded data frame. As such, the master bus controller 18 reads the decoded data frame, which is ultimately a copy of the data frame from the slave bus controller 20 in the bus interface system 12.

If the master bus controller 22 (shown in FIG. 1) is provided, the master bus controller 22 (shown in FIG. 1) is configured to generate the input data signal MMDATA along the bus line DIM. The master bus controller 22 (shown in FIG. 1) is also configured to modulate the input data signal MMDATA such that the input data signal MMDATA represents data commands in accordance with the MIPI RFFE bus protocol, as described in the aforementioned disclosures. The master bus controller 22 (shown in FIG. 1) is further configured to generate the clock signal MMCLK along the bus line CIM, wherein the input data signal MMDATA is synchronized in accordance with the clock signal MMCLK.

FIG. 3 illustrates an embodiment of the master bus controller 18 shown in FIG. 1 and in FIG. 2. In FIG. 3, the master bus controller 18 includes a MIPI RFFE state machine 38, a data modulator 40, an oscillator calibration circuit 42, a ring oscillator 44, and a bidirectional buffer 46. The MIPI RFFE state machine 38 generates a digital output 48. The ring oscillator 44 generates an oscillator signal 50 and the oscillator calibration circuit 42 generates a control output 52, as explained in further detail below. The master bus controller 18 also includes a (First In First Out) FIFO memory buffer 54, a memory device 56 that is configured to store slave data images 57, the data demodulator 58 that includes payload registers 60, a shadow register circuit 62 that includes shadow registers 64, and a voltage regulation circuit 66. The voltage regulation circuit 66 operates as described in the aforementioned disclosures.

The MIPI RFFE state machine 38 is an embodiment of the bus communication circuitry 32-MO shown in FIG. 2. The voltage regulation circuit 66 is an embodiment of the power circuitry 34-MO shown in FIG. 2. The data modulator 40, the oscillator calibration circuit 42, the shadow register circuit 62, the bidirectional buffer 46, and the data demodulator 58 is an embodiment of the bus communication circuitry 36-MO. In this embodiment, the oscillator calibration circuit 42 is provided in the data modulator 40.

With regards to the embodiment of the bus communication circuitry 32-MO shown in FIG. 3, the bus communication circuitry 32-MO is the MIPI RFFE state machine 38. The MIPI RFFE state machine 38 is operable to receive a first bus input, which in this example is the data input signal MMDATA formatted in accordance with the MIPI RFFE bus protocol. The data input signal MMDATA is received along the bus line DIM from the master bus controller 22 (shown in FIG. 1). The data input signal MMDATA represents a data frame of a data command that is formatted with the MIPI RFFE bus protocol of the bus interface system 12 (shown in FIG. 1). The data frame thus includes a bus address and a payload formatted in accordance with the MIPI RFFE bus protocol. To synchronize data transmission between the master bus controller 18 and the master bus controller 22 (shown in FIG. 1), the master bus controller 18 also receives the system clock signal MMCLK on the bus line CIM. Furthermore, the master bus controller 18 receives a supply voltage VIO from the master bus controller 22 (shown in FIG. 1) along the bus line VIM, as the control voltage VIO. Finally, the master bus controller 18 receives a power source voltage VBAT along a bus line PIM. The MIPI RFFE state machine 38 is configured to extract the bus address and the payload from the data frame of the input data signal MMDATA and generate the digital output 48 that transfers the bus address and the payload to the data modulator 40.

With regards to the embodiment of the power circuitry 34-MO, the power circuitry 34-MO is provided as the voltage regulation circuit 66. The voltage regulation circuit 66 is provided in the same manner as described in the aforementioned applications. Accordingly, the voltage regulation circuit 66 is configured to generate the supply voltage VS from the power source voltage VBAT and control the supply voltage VS in accordance with the control voltage VIO. The supply voltage VS is used to power to the master bus controller 18. Furthermore, the voltage regulation circuit 66 operates with the data modulator 40 so that the data modulator 40 generates the input data signal MODATA so as to power the slave bus controllers 24(1)-24(M) (shown in FIG. 1) of the bus interface system 14 (shown in FIG. 1) as described in the aforementioned applications.

With regards to the embodiment of the bus communication circuitry 36-MO, the data modulator 40 is configured to obtain the bus address and payload extracted from the data input signal MMDATA and provide the bus address and payload to a data frame formatted in accordance with the one wire bus protocol (also, the PWM bus protocol). In this manner, the master bus controller 22 (shown in FIG. 1) is operable to communicate with the master bus controller 18.

The data modulator 40 is synchronized using the ring oscillator 44, which in this example is a digitally controlled oscillator (DCO). The ring oscillator 44 is configured to generate an oscillator signal 50. The ring oscillator 44 is desirable because generally these types of components are inexpensive to manufacture. The oscillator calibration circuit 42 is configured to calibrate the ring oscillator 44 based on the system clock signal MMCLK. In this embodiment, the MIPI RFFE state machine 38 is configured to generate a calibration clock signal MMCLK' by dividing down the system clock signal MMCLK. The oscillator calibration circuit 42 is operable to receive the calibration clock signal MMCLK' and generate a control output 52 that synchronizes the oscillator signal 50 in accordance with the calibration clock signal MMCLK'.

The data modulator 40 is operable to receive the oscillator signal 50 and is operable to generate the input data signal MODATA such that the data pulses of the input data signal MODATA are synchronized by the oscillator signal 50. Since the oscillator signal 50 was synchronized based on the system clock signal MMCLK (e.g., in this embodiment, in accordance with the calibration clock signal MMCLK' generated from the system clock signal MMCLK), the timing accuracy of the oscillator signal 50 is maintained. As shown in FIG. 3, the bidirectional buffer 46 has an input terminal 68A that receives the MODATA signal and an output terminal 68B that provides the input data signal MODATA to the bus line UMS and the bus line UTO. The output terminal 68B is coupled to the bus line UMS, which is connected to the slave bus controllers 24(1)-24(M) (shown in FIG. 1). Again, the bus line UTO is connected to the bus line UMS and thus output terminal 68B is also connected to the bus line UTO, which is connected to the translation bus controller 16 (shown in FIG. 1).

The bidirectional buffer 46 also includes an input terminal 68C that is operable to receive an enable signal MEN. When the enable signal MEN is in an activated state, the bidirectional buffer 46 is configured to transmit the input data signal MODATA along the bus line UMS and the bus line UTO. Otherwise, when the enable signal MEN is in a deactivation state, the bidirectional buffer 46 does not transmit the input data signal MODATA along the bus line UMS and the bus line UTO but rather allows the master bus controller 18 to receive input data signals SODATA from the slave bus controllers 24(1)-24(M) (shown in FIG. 1) connected to the bus line UMS and receive input data signal TODATA from translation bus controller 16 (shown in FIG. 1 and FIG. 2) connected to the bus line UTO. The enabling signal MEN may be generated by the data modulator 40 and may activate the bidirectional buffer 46 when the slave bus controllers 24(1)-24(M) (shown in FIG. 1) and the translation bus controller 16 (shown in FIG. 1 and in FIG. 2) are not pulling down the bus line UMS and the bus line UTO.

The master bus controller 18 is configured to generate and store slave data images (referred to generically as elements 57 and specifically as elements 57W-57Z). The slave data images 57 approximately replicate slave data stored in memory devices of the slave bus controllers 20(1)-20(N) (shown in FIG. 1) of the bus interface system 12 (shown in FIG. 1) and slave bus controllers 24(1)-24(M) (shown in FIG. 1). More specifically, the slave data image 57W is an approximate replica of the slave data stored in the memory of the slave bus controller 20(1) (shown in FIG. 1) of the bus interface system 12 (shown in FIG. 1). The slave data image 57X is an approximate replica of the slave data stored in the memory of the slave bus controller 20(N) (shown in FIG. 1) of the bus interface system 12 (shown in FIG. 1). The slave data image 57Y is an approximate replica of the slave data stored in the memory of the slave bus controller 24(1) (shown in FIG. 1) of the bus interface system 14 (shown in FIG. 1). The slave data image 57Z is an approximate replica of the slave data stored in the memory of the slave bus controller 24(M) (shown in FIG. 1) of the bus interface system 14 (shown in FIG. 1). The operation of the master bus controller 18 with respect to the slave data images 57Y, 57Z is the same as the operations described in the aforementioned disclosures. The operation of the master bus controller 18 with respect to the slave data images 57W, 57X are explained in further detail below.

Of course, the slave data images 57 may not be exact replicas. Errors in copying may occur regardless of error checking, which may result in slight differences. Not all updates to slave data (e.g., the slave data) may be provided to update the slave data images 57 and in any case cannot be provided instantaneously to the slave data images 57 in the memory device 56 of the master bus controller 18. Acceptable differences between the slave data images 57 and slave data should be determined in accordance with acceptable error tolerances implicitly or explicitly defined by technical standards relevant to a particular application of the bus interface system 10 (shown in FIG. 1).

The memory device 56 of the master bus controller 18 is configured so that memory addresses of each of the slave data images 57 correspond to memory addresses storing corresponding slave data in memory devices of the slave bus controllers 20(1)-20(N) (shown in FIG. 1) of the bus interface system 12 (shown in FIG. 1) and the slave bus controllers 24(1)-24(M) (shown in FIG. 1) and so that memory addresses of each of the slave data images 57 correspond to memory addresses storing corresponding slave data in memory devices of the slave bus controllers 24(1)-24(M) (shown in FIG. 1) of the bus interface system 14 (shown in FIG. 1). More specifically, the memory device 56 of the master bus controller 18 is configured so that memory addresses storing the slave data image 57W correspond to the memory addresses storing the slave data in the memory of the slave bus controller 20(1) (shown in FIG. 1) and so that memory addresses storing the slave data image 57Y correspond to the memory addresses storing the slave data in the memory of the slave bus controller 24(1) (shown in FIG. 1). The memory device 56 of the master bus controller 18 is configured so that memory addresses storing the slave data image 57X correspond to the memory addresses storing the slave data in the memory of the slave bus controller 20(N) (shown in FIG. 1) and so that memory addresses storing the slave data image 57Z correspond to the memory addresses storing the slave data in the memory of the slave bus controller 24(M) (shown in FIG. 1). In this manner, the master bus controller 18 can simply read the slave data images 57 rather than send read command(s)/cross over data commands every time that it needs to perform operations based on the slave data. Rather, the master bus controller 18 can perform the operation by simply looking up data segments within the slave data image 57 with memory addresses corresponding to the memory addresses of the memory with the relevant data segments.

In one embodiment, the master bus controller 18 may request transmission of slave data from the slave bus controllers 20(1)-20(N) (shown in FIG. 1) of the bus interface system 12 (shown in FIG. 1) and slave bus controllers 24(1)-24(M) (shown in FIG. 1) at start up in order to generate the slave data images 57. For instance, the master bus controller 18 may request transmission of slave data from the slave bus controllers 20(1)-20(N) (shown in FIG. 1) of the bus interface system 12 (shown in FIG. 1) and slave bus controllers 24(1)-24(M) (shown in FIG. 1) of the bus interface system 14 (shown in FIG. 1) at start up in order to generate the slave data images 57.

The data modulator 40 is configured to modulate the input data signal MODATA so that the input data signal MODATA represents the data commands in accordance with the one wire bus protocol (also the PWM bus protocol). More specifically, the data modulator 40 is configured to generate a set of data pulses to represent the data command in accordance with along the bus line UTO that represent the data commands with the one wire bus protocol (also the PWM bus protocol). These data pulses are organized into data frames or subframes within the data frames, as explained in further in detail below. It should be noted furthermore that the data modulator 40 is configured to start the data frames with an initial low voltage pulse. The initial low pulse is the first pulse of a data frame since a voltage along the bus lines UTO, UMS is held in a high voltage state whenever there are no communications between the master bus controller 18 and the translation and slave bus controllers 16, 24. Afterwards, the master bus controller 18 is configured to generate a sequence (subset) of data pulses in accordance with a start of sequence (SOS) pulse pattern to indicate that the data frame has started, as described in the aforementioned disclosures.

In FIG. 3, the data modulator 40 includes an error coding circuit ECCM, which is used for error coding as explained in the aforementioned applications. The error coding circuit ECCM is discussed further detail. The slave bus controllers 24(1)-24(M) (shown in FIG. 1) are each coupled to the bus line UMS and thus each of slave bus controllers 24(1)-24(M) (shown in FIG. 1) receives the input data signal MODATA. In this embodiment, no other bus line is provided in the bus interface system 14 (shown in FIG. 1 and FIG. 2) to connect the master bus controller 18 and the slave bus controllers 24(1)-24(M) (shown in FIG. 1). The translation bus controller 16 (shown in FIG. 1 and FIG. 2) is coupled to the bus line UTO and thus the translation bus controller 16 (shown in in FIGS. 1 and 2) also receives the input data signal MODATA (shown in FIG. 2) but along the bus line UTO. In this embodiment, no other bus line is provided by the bus interface system 10 or the translation bus controller 16 to connect the master bus controller 18 and the translation bus controller 16 (shown in FIG. 1 and FIG. 2).

As shown in FIG. 3 and described in the aforementioned applications, the bus communication circuitry 36-MO further includes the data demodulator 58 that is coupled to the bus line UMS. The data demodulator 58 may receive the input data signal SODATA modulated in accordance to the one wire bus protocol (also, the PWM bus protocol) along the bus line UMS from the slave bus controllers 24(1)-24(M) (shown in FIG. 1) and may receive the input data signal TODATA modulated in accordance to the one wire bus protocol (also, the PWM bus protocol) along the bus line UTO from the translation bus controller 16. With respect to the input data signal SODATA, the slave bus controllers 24(1)-24(M) (shown in FIG. 1) are each configured to modulate an input data signal (which in this example is shown generically as the input data signal SODATA but where each of the slave bus controllers 24(1)-24(M) would generate its own input data signal SODATA) in accordance with the one wire bus protocol (also, the PWM bus protocol) to represent a data segment requested by the master bus controller 18 and thereby implement a read command, as described in the aforementioned applications. With respect to the input data signal TODATA, the translation bus controller 16 modulates the input data signal TODATA in accordance with the one wire bus protocol (also, the PWM bus protocol) so that the input data signal TODATA represents a data segment requested by the master bus controller 18 to implement cross over read bus operations, as described below. The data demodulator 58 of the master bus controller 18 is configured to decode the input data signal SODATA from the slave bus controllers 24(1)-24(M) (shown in FIG. 1) in accordance with the one wire bus protocol (also, the PWM bus protocol). The data demodulator 58 of the master bus controller 18 includes the payload registers 60. The payload registers 60 are configured to store decoded data segments in the input data signal SODATA within the payload registers 60 as explained in further detail below. The data demodulator 58 also includes an error detection circuit EDCM configured to check for transmission errors in the data bits stored in the payload registers 60. The function of the error detection circuit EDCM operates as described in the aforementioned applications.

Furthermore, the data demodulator 58 is coupled to the bus line UTO. The data demodulator 58 may receive the input data signal TODATA with data pulses formatted in accordance to the one wire bus protocol (also, the PWM bus protocol) along the bus line UTO from the translation bus controller 16 (shown in FIG. 2). With the input data signal TODATA, the translation bus controller 16 (shown in FIG. 2) can send a data segment to the master bus controller 18 to implement a cross over read bus operation, as explained in further detail below. The data demodulator 58 of the master bus controller 18 is configured to decode the set of data pulses within the input data signal TODATA from the translation bus controller 16 in accordance with the one wire bus protocol (also, the PWM bus protocol). The payload registers 60 are configured to store data bits decoded as a result of the data pulses in the input data signal TODATA within the payload registers 60 as explained in further detail below. The error detection circuit EDCM of the data demodulator 58 is also configured to check for transmission errors in the data bits stored in the payload registers 60. The function of the error detection circuit EDCM is explained in further detail below. The master bus controller 18 shown in FIG. 3 also includes a shadow register circuit 62 that includes shadow registers 64. The functionality of the shadow register circuit 62 is the same as the shadow register circuits and shadow registers of the slave bus controllers in the aforementioned disclosures wherein the functionality of the shadow register circuit 62 and the shadow registers 64 is explained in further detail below.

Since the bus interface system 12 (shown in FIG. 1) may be faster than the data rate provided by the bus interface system 14 (shown in FIG. 2), a First In First Out (FIFO) memory buffer 54 is provided to store data commands (referred to generically as elements COM and specifically as data command COM0 or read command COM0, data command COM1 or write command COM1, data command COM2 or group write command COM2, data command COM3 or read command COM3, a data command COM4 or a write command COM4, a data command COM5 or cross over write command COM5, a data command COM6 or cross over write command COM6, a data command COM7 or cross over read command COM7 and data command COMN or write command COMN). Each of the data commands COM may be stored as bits within the FIFO memory buffer 54. Each of the data commands COM are formatted data frames organized in accordance with the one wire bus protocol (also, the PWM bus protocol) and thus the data commands COM are not in a format which can be interpreted by bus controllers in another type of bus interface systems such as the master bus controller 22 (shown in FIG. 1) and the slave bus controllers 20 (shown in FIG. 1 and FIG. 2) of the bus interface system 12 (shown in FIG. 1).

Each of the data commands COM includes a command field (referred to generically as elements CB and specifically as elements "CB0-CBN"). Each of the command fields CB may include a set of transactional bits describing a requested bus operation of the corresponding data command COM. For example, each of the command fields CB may include a command identifier subfield with a command identifier, a bus controller identifier subfield with a bus controller identifier, and an address subfield with a memory address. The command identifier of the command identifier subfield indicates a particular type of bus operation being requested by the data command COM. For example, the different types of read commands or write commands can be identified by the command identifier subfield of the command field CB. The bus controller identifier of the bus controller subfield identifies a bus controller (e.g., the slave bus controller 24 (shown in FIG. 1), the translation bus controller 16 or bus controllers that are to implement the bus operation identified by the command identifier subfield. The memory address in the memory address subfield identifies a memory location of the slave bus controller (e.g., one of the slave bus controllers 24 (shown in FIG. 1)) or the translation bus controller 16 (shown in FIG. 1 and FIG. 2) relevant to the bus operation. The command fields CB may or may not include other transactional fields with other types of transactional bits depending on the types of data commands COM that are to be implemented by an application of the bus interface system 14 (shown in FIG. 1 and FIG. 2).

Each of the data commands COM0, COM3, and COM7 is a read command (generically or generally as read commands "COMR") and thus do not include a payload segment. The data command COM0 stored in the FIFO memory buffer 54 is a read command that is provided as a command field CB0. The data command COM0 is an intra-bus read command and thus has transactional bits where the master bus controller 18 request to read a data segment stored within one of the slave bus controllers 24 (shown in FIG. 1) of the bus interface system 14 (shown in FIGS. 1 and 2). The data command COM3 in the FIFO memory buffer 54 is another read command that is provided as the command field CB3. The data command COM3 is also an intra-bus read command and thus has transactional bits where the master bus controller 18 request to read a data segment stored within one of the slave bus controllers 24 (shown in FIG. 1) of the bus interface system 14 (shown in FIGS. 1 and 2). The data command COM7 in the FIFO memory buffer 54 is a cross over read command that is provided as the command field CB7.

Each of the data commands COM1, COM2, COM4, COM5, COM6, and COMN is a write command (generically or generally as write commands "COMW"). Each of the data commands COM1, COM2, COM4, COM5, COM6, and COMN include the payload segments MPB1, MPB2, MPB4, MPB5, MPB6, MPBN (referred to generically as elements "MPB"). The data command COM1 stored in the FIFO memory buffer 54 is a write command. The data command COM1 includes the command field CB1, which is a set of transactional data bits for the individual intra-bus write command and the payload segment MPB1, which is a set of payload bits for the individual intra-bus write command. The data command COM1 is an individual intra-bus write command where a particular one of the slave bus controllers 24(1)-24(M) (shown in FIG. 1) in the bus interface system 14 (shown in FIG. 1) is to write a copy of the payload segment MPB1 into one of its memory addresses. The data command COM2 in the FIFO memory buffer 54 is an intra-bus group write command. The data command COM2 includes the command field CB2, which is a set of transactional data bits for the intra-bus group write command. The data command COM2 in the FIFO memory buffer 54 also includes a payload segment MPB2, which is a set of payload bits for the intra-bus group write command. For the intra-bus group write command, more than one of the slave bus controllers 24(1)-24(M) (shown in FIG. 1) in the bus interface system 14 (shown in FIG. 1) is to write a copy of the payload segment MPB2 into one of its memory addresses. The group write commands may broadcast write commands or subgroup write commands.

The data command COM4, and the data command COM5, the data command COM6, and the data command COM7 are each a cross over data commands. The data command COM4, and the data command COM5, the data command COM6 are each a cross over data commands. The data command COM7 is a cross over read command. With regards to the data command COM4, the data command COM4 includes the command field CB4, which is a set of transactional data bits for the cross over write command and the payload segment MPB4, which is a set of payload bits for the cross over write command. The data command COM4 is formatted in accordance with the one wire bus protocol (also, the PWM bus protocol) to request that a cross over write bus operation be implemented by a slave bus controller 20, as explained below. The data command COM5 is a cross over write command but is related to a cross over read bus operation as explained below. The data command COM5 includes the command field CB5, which is a set of transactional data bits for the cross over write command and the payload segment MPB5, which is a set of payload bits for the cross over write command. The data command COM6 is a cross over write command. The data command COM6 is a cross over write command but is related to the same cross over read bus operation as explained below. The data command COM6 includes the command field CB6, which is a set of transactional data bits for the cross over write command and the payload segment MPB6, which is a set of payload bits for the cross over write command. The data command COM7 includes the command field CB7, which is a set of transactional data bits for the cross over read command. As explained below, the data command COM7 is related to the same cross over read bus operation as the data commands COM5, COM6.

Each of the data commands COM0, COM1, COM2, COM3, and COMN are thus each intra-bus data commands implemented in accordance with the one wire bus protocol (also, the PWM bus protocol). The intra-bus operations of the master bus controller 18 and the slave bus controllers 24(1)-24(M) (shown in FIG. 1) in the bus interface system 14 (shown in FIGS. 1 and 2) related with the data commands COM0, COM1, COM2, COM3, and COMN are provided as described in the aforementioned disclosures and are not discussed any further here.

However, the data commands COM4, COM5, COM6, and COM7 are cross over data commands where the master bus controller 18 (shown in FIG. 1 and FIG. 2) are requesting bus operations related with cross over bus operations that are to be performed with one of the slave bus controllers 20(1)-20(N) (shown in FIG. 1) in the bus interface system 12 (shown in FIG. 1 and FIG. 2). The cross over data commands may be used to perform cross over bus operations described herein with any one of the slave bus controllers 20(1)-20(N) (shown in FIG. 1) in the bus interface system 12 (shown in FIG. 1 and FIG. 2). For the sake of simplicity however, the cross over data commands are described below with respect to the slave bus controller 20 shown in FIG. 2. Again however, the slave bus controller 20 in FIG. 2 can be any one of the slave bus controllers 20(1)-20(N) (shown in FIG. 1).

In particular, the data command COM4 is a cross over write command for a cross over write bus operation where a copy of the payload segment MB4 is written into memory by the slave bus controller 20 (shown in FIG. 2). On the other hand, the data commands COM5, COM6, and COM7 are for the same cross over read bus operation where the master bus controller 18 is requesting to read a data segment in the memory device 35 of the slave bus controller 20 (shown in FIG. 2). Thus, even though the data commands COM5, COM6 are cross over write commands while the data command COM6 is a cross over read command, the write command COM5, the write command COM6, and the read command COM7 are all involved in the same cross over read operation.

Note that the cross over data commands are each formatted in accordance with the one wire bus protocol (also the PMW bus protocol). Furthermore, the data modulator 40 of the master bus controller 18 is configured to generate sets of data pulses representing the cross over data commands where the data pulses are formatted in accordance with the one wire bus protocol (also, the PWM bus protocol). Therefore, the translation bus controller 16 (shown in FIG. 1 and FIG. 2) is provided to translate the cross over data commands into intra-bus data commands that are formatted in accordance with the MIPI RFFE bus protocol.

Referring now to FIG. 4, FIG. 4 illustrates an embodiment of the translation bus controller 16 (shown in FIG. 1 and FIG. 2). The translation bus controller 16 (shown in FIG. 1 and FIG. 2) is formed in the IC package 26. In this embodiment, the translation bus controller 16 (shown in FIG. 1 and FIG. 2) has an embodiment of the bus communication circuitry 36-TO that includes a data demodulator 70 and a data modulator 72. The translation bus controller 16 (shown in FIG. 1 and FIG. 2) also includes the bus communication circuitry 32-TM and the power conversion circuitry 34-TM. The power conversion circuitry 34-TM may be provided in the same manner as the power conversion circuitry of the slave bus controllers 24 as described in the aforementioned applications.

With regards to the data demodulator 70 of the bus communication circuitry 36-TO, the data demodulator 70 of the translation bus controller 16 includes a decoder 74. The decoder 74 is configured to decode the data pulses of the input data signal MODATA from the master bus controller 18 in accordance with the one wire bus protocol (also, the PWM bus protocol) as described in the aforementioned disclosures. It should be noted furthermore that the data demodulator 70 of the translation bus controller 16 (shown in FIG. 1 and FIG. 2) and the decoder 74 may also be configured to recognize a sequence of data pulses within the input data signal MODATA provided in accordance with the SOS pulse pattern at the beginning of a data frame, as described in the aforementioned disclosures. Furthermore, the decoder 74 can also be calibrated as described in the aforementioned disclosures.

As shown in FIG. 4, the data demodulator 70 of the translation bus controller 16 (shown in FIG. 1 and FIG. 2) includes data frame registers 76 operable to receive the memory input signal 78 from the decoder 74. In this manner, the data frame registers 76 store the data bits decoded by the decoder 74 as a result of the data pulses within the input data signal MODATA from the master bus controller 18. The data demodulator 70 includes an error detection circuit EDCT. The error detection circuit EDCT is configured to check for transmission errors in the data bits stored in the data frame registers 76. The function of the error detection circuit EDCT is explained in further detail below.

With regards to the data modulator 72 of the bus communication circuitry 36-TO, the data modulator 72 is operably associated with the memory device 80 of the translation bus controller 16 (shown in FIG. 1 and FIG. 2). The memory device 80 is configured to store translator data 81, which in this embodiment includes data segments (referred to generically or collectively as data segments TW and specifically as data segments TW1-TWM). The data modulator 72 of the translation bus controller 16 (shown in FIG. 1 and FIG. 2) is operable to generate the input data signal TODATA along the bus line UTO in accordance with the one wire bus protocol (also, the PWM bus protocol). The data pulses are transmitted by the translation bus controller 16 (shown in FIG. 1 and FIG. 2) to the master bus controller 18 along the bus line UTO, as explained in further detail below. It should be noted that the input data signal MODATA is not being provided by the master bus controller 18 during the transmission of the input data signal TODATA by the translation bus controller 16 (shown in FIG. 1 and FIG. 2). The data modulator 72 includes an error detection circuit ECCT that is configured to generate an error code. The function of the error detection circuit ECCT is explained in further detail below.

Referring now to FIG. 2, FIG. 3, FIG. 4, and FIG. 5, FIG. 5 illustrates one embodiment of a data frame 100 (also referred to as a cross over write data frame 100) utilized by the bus interface system 10 shown in FIG. 2 to implement the cross over write command COM4. The master bus controller 18 is configured to modulate the input data signal MODATA such that the input data signal MODATA represents a write command COM4 in accordance with the one wire bus protocol (also, the PWM bus protocol). More specifically, the master bus controller 18 is configured to generate a set of data pulses within the input data signal MODATA to represent the data command COM4. The cross over write data frame 100 describes the organization of data pulses generated along the bus line UTO with the input data signal MODATA by the master bus controller 18 shown in FIG. 3 and received by the translation bus controller 16 shown in FIG. 4 in order to implement the cross over write command COM4 with the bus interface system 10 shown in FIG. 2.

To modulate the input data signal MODATA so that the input data signal MODATA represents the cross over write command COM4, the data modulator 40 in the bus communication circuitry 36-MO is operable to receive the digital output 48 representing the cross over write command COM4 from the FIFO memory buffer 54. The cross over write data frame 100 describes an organization of data pulses generated by the master bus controller 18 along the bus line UTO within the input data signal MODATA to transmit the cross over write commands COM4 to the translation bus controller 16. In this embodiment, the data modulator 40 of the master bus controller 18 begins the cross over write data frame 100 by generating an initial low pulse and a sequence of data pulses within the input data signal MODATA along the bus line UTO in accordance with a start of sequence (SOS) pulse pattern. This sequence of data pulses is generated during an SOS subframe SOSSB at the beginning of the cross over write data frame 100. The master bus controller 18 is configured to transmit this sequence of data pulses along the bus line UTO during the SOS subframe SOSSB, which is at the beginning of the cross over write data frame 100. The sequence of data pulses includes a calibration data pulse.

The translation bus controller 16 is operable to receive the input data signal MODATA along the bus line UTO from the master bus controller 18. More specifically, a decoder 74 in the data demodulator 70 of the bus communication circuitry 36-TO is configured to receive the input data signal MODATA along the bus line UTO from the master bus controller 18. A decoder 74 in the data demodulator 70 of the translation bus controller 16 is configured to recognize that the sequence of data pulses transmitted along the bus line UTO by the data modulator 40 of the master bus controller 18 during the SOS subframe SOSSB has been provided in accordance with the SOS pulse pattern. In this manner, the decoder 74 of the data demodulator 70 of the translation bus controller 16 can detect when the master bus controller 18 has started the cross over write data frame 100. The decoder 74 of the data demodulator 70 of the translation bus controller 16 is further configured to be calibrated in accordance with the calibration data pulse in response to recognizing that the sequence of data pulses has been provided in accordance with the SOS pulse pattern. As such, the decoder 74 of the data demodulator 70 is configured to clear the data frame registers 76 in response to recognizing that the sequence of data pulses transmitted along the bus line UTO by the data modulator 40 of the master bus controller 18 has been provided in accordance with the SOS pulse pattern.

After the SOS subframe SOSSB, the cross over write data frame 100 includes the command field subframe 102. The data modulator 40 of the master bus controller 18 is configured to provide a subset of the data pulses within the input data signal MODATA representing the command field CB4 of the cross over write command COM4 during the command field subframe 102. The command field subframe 102 includes the bus controller identifier subframe USID1, the command identifier subframe CMD1, and the address subframe ADR1 of the cross over write command COM4. During the bus controller identifier subframe USID1, the data modulator 40 of the master bus controller 18 is configured to provide the subset of the data pulses along the bus line UTO within the input data signal MODATA to represent the bus controller identifier in the command field CB4 of the cross over write command COM4.

The bus controller identifier subframe USID1 includes a subset of data pulses that represent a subset of transactional bits named SA3-SA0 in accordance to the one wire bus protocol (which is also the PWM bus protocol). The bus controller identifier represented during the bus controller identifier subframe USID1 identifies the bus controller that the cross over write command COM4 is directed to towards within the bus interface system 12. In this example, the bits named SA3-SA0 identify the slave bus controller 20 shown in FIGS. 2 and 4, which may be any particular one of the slave bus controllers 20(1)-20(N) shown in FIG. 1. Thus, the bus controller identifier is in a bus controller identifier subfield of the command field CB4 includes the bits SA3-SA0 that identify the slave bus controller 20, and thus the subset of data pulses transmitted during the bus controller identifier subframe USID1 represent a bus controller identifier of the slave bus controller 20 in accordance to the one wire bus protocol (which is also the PWM bus protocol).

During the command identifier subframe CMD1 within the command field subframe 102, the command identifier subframe CMD1 includes a subset of data pulses that represents the command identifier in a command identifier subfield of the command field CB4 in accordance to the one wire bus protocol (which is also the PWM bus protocol). In this case, the command identifier subframe CMD1 represents the command identifier of bits "011." The command identifier of bits "011" identifies the type of command as a non-extended write command in the one wire bus protocol (also, the PWM bus protocol) of the bus interface system 14. It should be noted that in alternative embodiments, the cross over write command COM4 may be an extended write command and thus the command identifier would be of bits identifying an extended write command. With respect to the cross over write data frame 100, the subset of the data pulses generated by the input data signal MODATA during the command identifier subframe CMD1 represents the command identifier in the command subfield of bits "011" identifying the type of command as a non-extended write command. The data modulator 40 of the master bus controller 18 is configured to generate the subset of the data pulses within the input data signal MODATA along the bus line UTO to represent the command identifier in command identifier subfield of the command field CB4 of the cross over write command COM4.

With respect to the cross over write data frame 100, the data modulator 40 of the master bus controller 18 is configured to generate a subset of the data pulses during an address field subframe ADR1 representing a memory address in an address subfield of the command field CB4. In this case, the memory address in the address subfield of the command field CB4 that identifies a memory location of the memory device 35 in the slave bus controller 20 for the cross over write bus operation. The memory address includes the bits A4-A1. The data modulator 40 of the master bus controller 18 is configured to generate the subset of the data pulses during the address field subframe ADR1 within the input data signal MODATA along the bus line UTO so that the subset of the data pulses represent the memory address in the address subfield of the bits the bits A4-A1 in the command field CB4 of the cross over write command COM4.

Figure 5:
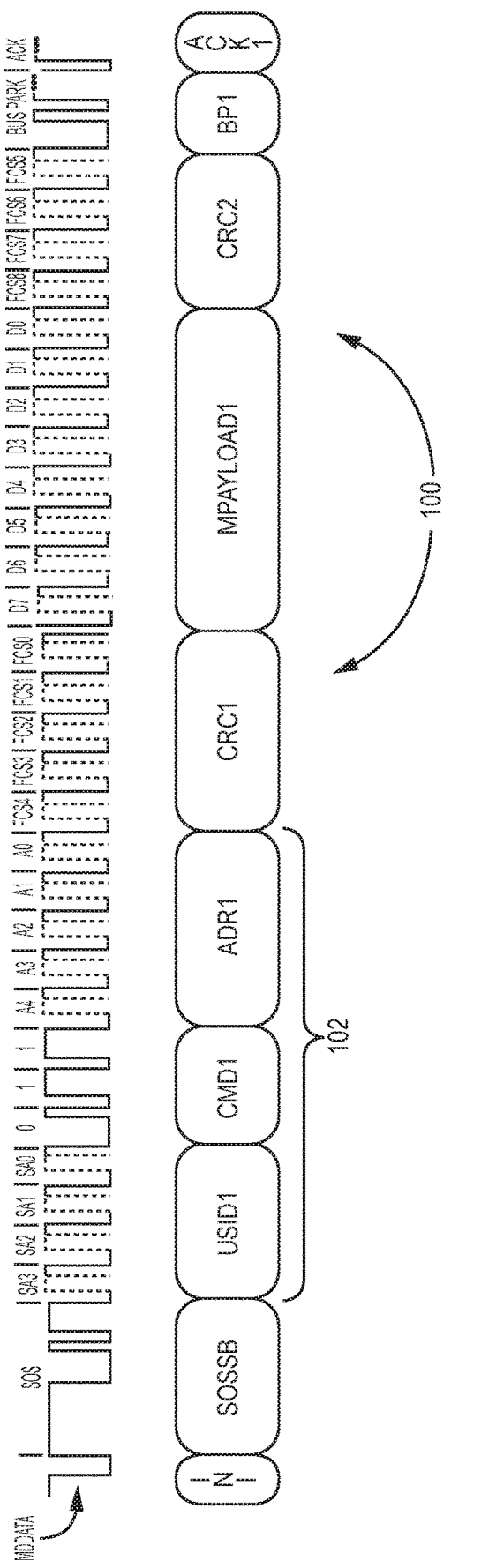
FIG. 5 is a data frame formatted in accordance with one wire bus protocol and implemented between the master bus controller shown in FIG. 3 and the translation bus controller shown in FIG. 4 so that a cross over write bus operation is implemented.

Next, the data frame 100 shown in FIG. 5 then includes an error code subframe CRC1. With regards to the cross over write commands COM4, the error coding circuit ECCM shown in FIG. 3 within the data modulator 40 of the master bus controller 18 is configured to generate the error code CRCA based on the command field CB4 of the cross over write commands COM4. For example, with regards to the cross over write command COM4, the error coding circuit ECCM of the data modulator 40 is configured to generate the error code CRCA based on the command field CB4. The error code CRCA includes the bits FCS4-FCS0. In this embodiment, the error coding circuit ECCM is a cyclic redundancy code generator and the error code CRCA is a cyclic redundancy code. The error coding circuit ECCM is thus configured to implement a cyclic redundancy code algorithm on the command field CB4 in order to generate the error code CRCA. Alternatively, the error coding circuit ECCM may be any type of suitable coding circuit such as a parity code generator and the error code CRCA may include one or more parity bits. During the error code subframe CRC1, the data modulator 40 of the master bus controller 18 is configured to generate a subset of data pulses along the bus line UTO within the input data signal MODATA representing the error code CRCA and thus representing the bits FCS4-FCS0.

With respect to the bus communication circuitry 36-TO of the translation bus controller 16 shown in FIG. 4, the bus communication circuitry 36-TO is configured to decode the set of data pulses representing the write command COM4 into a decoded write command (which is going to be a decoded command field DCB and a decoded payload segment DMPB, as explained below). Thus, the decoded write command is formatted in accordance with the one wire bus protocol (also, the PWM bus protocol) to request that the same write bus operation of the data command COM4 be implemented by the slave bus controller 20. In this embodiment, the decoder 74 of the data demodulator 70 in the bus communication circuitry 36-TO of the translation bus controller 16 is operable decode the set of data pulses in the data frame 100 shown in FIG. 5. In FIG. 5, the set of data pulses in the data frame 100 are formatted in accordance with the one wire bus protocol described in the aforementioned disclosures. The one wire bus protocol is also a PWM bus protocol, as explained in the aforementioned disclosures. In this example, the data pulses that represent bits in the data frame 100 are logic "1" if the data pulse has a duty cycle greater than 50% during a time slot and logic "0" if the data pulse has a duty cycle less 50% during the time slot. No clock signal is needed since synchronization is provided by the low to high and high to low edges of the data pulses, as explained in the aforementioned applications. Furthermore, the bus communication circuitry 36-TO is powered by the supply voltage VTO, which was generated by the power conversion circuitry 34-TM, as explained above.

The decoder 74 in the data demodulator 70 of the bus communication circuitry 36-TO in the translation bus controller 16 is provided to decode the set of data pulses in the data frame 100 shown in FIG. 5. The decoder 74 is operable to receive the set of data pulses in the input data signal MODATA that were transmitted by the during the command field subframe 102 shown in FIG. 5. The decoder 74 of the data demodulator 70 is configured to decode this set of data into a decoded command field DCB in accordance with the one wire bus protocol (also, the PWM bus protocol). The decoded command field DCB is stored within the data frame registers 76.

Given that the decoder 74 of the data demodulator 70 of the translation bus controller 16 is operable to receive the set of data pulses in the input data signal MODATA that were transmitted by the during the command field subframe 102 shown in FIG. 5, the decoder 74 of the data demodulator 70 of the translation bus controller 16 is therefore operable to receive the subset of the data pulses within the input data signal MODATA that were transmitted during the command field subframe 102, which itself includes subsets of the data pulses during the subframes USID1, CMD1, ADR1. In response to the subset of data pulses input data signal MODATA that were transmitted during the command field subframe 102, the bus communication circuitry 36-MO is configured to determine that the decoded data command is a non-extended write command and a cross over write command to the slave bus controller 20 of the bus interface system 12 shown in FIG. 1.

The decoder 74 of the data demodulator 70 of the translation bus controller 16 is also operable to receive the set of data pulses within the input data signal MODATA that were transmitted during the error code frame CRC1. As such, the decoder 74 of the data demodulator 70 in the translation bus controller 16 is configured to decode the set of data pulses representing the error code CRCA into the decoded error code DCRCA in accordance with the one wire bus protocol (also, the PWM bus protocol). The decoded error code DCRCA is also stored within the data frame registers 76. Additionally, the error detection circuit EDCT of the data demodulator 70 in the translation bus controller 16 is configured to generate the error code CRCTA based on the decoded command field DCB provided from the data frame registers 76. For example, with regards to the cross over write command COM4, the error detection circuit EDCT of the data demodulator 70 in the translation bus controller 16 is configured to generate the error code CRCTA based on the decoded command field DCB that was decoded from the set of data pulses representing the set of data pulses in the input data signal MODATA representing the command field CB4 of the cross over write command COM4.

The error detection circuit EDCT is then configured to perform an error check on the decoded command field DCB by comparing the decoded error code DCRCA with the error code CRCTA. More specifically, the error detection circuit EDCT is then configured to compare the decoded error code DCRCA with the error code CRCTA. By comparing the decoded error code DCRCA with the error code CRCTA, the error detection circuit EDCT of the data demodulator 70 in the translation bus controller 16 detects whether there is an error in the decoded command field DCB. For example, when the decoded error code DCRCA and the error code CRCTA match (or have a specified relationship to one another), then no error is detected in the decoded command field DCB. As such, the error check is passed by the decoded command field DCB. However, when the decoded error code DCRCA and the error code CRCTA do not match (or do not have the specified relationship to one another) then an error is detected. As such, the decoded command field DCB fails the error check. For example, for the cross over write command COM4 (which is one of the cross over write commands COM4), the error detection circuit EDCT of the data demodulator 70 in the translation bus controller 16 is configured to generate the error code CRCTA based on the decoded command field DCB, which should be a copy of the command field CB4 of the cross over write command COM4. When the error code DCRCA and the error code CRCTA do not match, the decoded command field DCB fails the error check. In this manner, the error detection circuit EDCT is configured to detect whether the set of data pulses representing the command field CB4 were decoded appropriately.

When the error detection circuit EDCT detects an error in the decoded command field DCB and the error check has failed, the translation bus controller 16 aborts the cross over write command COM4. When no error is detected in the decoded command field DCB and the error check is passed, then the decoded command field DCB and the command field CB4 of the cross over write command COM4 match. As such, the decoded command field DCB will include a decoded bus controller identifier in a decoded address subfield that is a copy of the bus controller identifier in the bus controller subfield of the command field CB4 represented during the bus controller identifier subframe USID1. The decoded command field DCB will include a decoded command identifier in a decoded command identifier subfield that is a copy of the command identifier in the command identifier subfield of the command field CB4 represented during the command identifier subframe CMD1. Thus, in this example, the decoded command identifier requests the cross over write bus operation. The decoded command field DCB will also include a decoded memory address that is a copy of the memory address of the address subfield of the command field CB4 represented during the address subframe ADR1. When the decoded bus controller identifier subfield in the decoded command field DCB does not identify the translation bus controller 16 or any of the slave bus controllers (i.e., the slave bus controller 20(1)-20(N) shown in FIG. 1) in the bus interface system 12, the translation bus controller 16 ignores the remainder of the cross over write data frame 100. However, when the decoded bus controller identifier subfield in the decoded command field DCB does identify the translation bus controller 16, the translation bus controller 16 prepares for a payload segment MPB4 from the master bus controller 18 to be written to the memory address identified by the decoded address field of the decoded command field DCB.

When the error detection circuit EDCT detects an error in the decoded command field DCB and the error check has failed, the translation bus controller 16 aborts the cross over write command COM4. When no error is detected in the decoded command field DCB and the error check is passed, then the decoded command field DCB and the command field CB4 of the write command COM4 match. As such, the decoded command field DCB will include a decoded bus controller identifier subfield that is a copy of the bus controller identifier subfield of the command field CB4 represented during the bus controller identifier subframe USID1. The decoded command field DCB will include a decoded command identifier subfield that is a copy of the command identifier subfield of the command field CB4 represented during the command identifier subframe CMD1. Thus, in this example, the decoded command identifier subfield requests a write bus operation, which is a bus suboperation of the cross over write bus operation. The decoded command field DCB will also include a decoded address subfield that is a copy of the address subfield of the command field CB4 represented during the address subframe ADR1.

When the decoded bus controller identifier subfield in the decoded command field DCB does not identify the one of the slave bus controllers 20(1)-20(N) (shown in FIG. 1) but either identifies one of the slave bus controllers 24 (shown in FIG. 1) of the bus interface system 14 or has an error, the translation bus controller 16 ignores the remainder of the write data frame 100. In this implementation, the cross over write command COM4 for the cross over write bus operation, the bus identifier subfield represented during the bus controller identifier subframe USID1 will not identify the translation bus controller 16 (unless there is an error) but rather any one of the slave bus controllers 20(1)-20(N) (shown in FIG. 1) for which the cross over write command COM4 is requesting the cross over write bus operation. With regards to FIGS. 2 and 4 and the explanation of FIG. 5, it is presumed that the address subfield of the cross over write command COM4 identifies the slave bus controller 20 of the bus interface system 12. When the bus controller identifier subfield represented during the bus controller identifier subframe USID1 does identify one of the slave bus controllers 20(1)-20(N) shown in FIG. 1 (which for the sake of explanation is presumed to be the slave bus controller 20 shown in FIG. 2 and FIG. 4), the translation bus controller 16 prepares for the payload segment MPB4 from the master bus controller 18 to be written to the memory address identified by the decoded address field of the decoded command field DCB.

As shown in FIG. 5, after the error code subframe CRC1, the write data frame 100 has a master payload subframe MPAYLOAD1. During the master payload subframe MPAYLOAD1, the master bus controller 18 is configured to generate a subset of data pulses along the bus line UTO within the input data signal MODATA representing the payload segment MPB4 of the cross over write command COM4. More specifically, the data modulator 40 of the master bus controller 18 is configured to generate a set of data pulses along the bus line UTO within the input data signal MODATA representing the payload segment MPB4 of the cross over write command COM4. The payload segment MPB4 (shown in FIG. 3) of the cross over write command COM4 includes the bits D7-D0. The data demodulator 70 of the translation bus controller 16 is operable to receive the subset of data pulses within the input data signal MODATA that were transmitted during the master payload subframe MPAYLOAD1, which represents the bits D7-D0. In this example, the decoder 74 in the data demodulator 70 of the translation bus controller 16 is configured to decode the set of data pulses into a decoded payload segment DMPB. The data frame registers 76 are configured to store the decoded payload segment DMPB.

For the cross over write command COM4 being communicated during the write data frame 100, the error coding circuit ECCM shown in FIG. 3 within the data modulator 40 of the master bus controller 18 is configured to generate an error code CRCC based on the payload segment MPB4 of the cross over write command COM4. To generate the error code CRCC, the error coding circuit ECCM within the data modulator 40 of the master bus controller 18 is configured to implement an error check algorithm on the payload segment MPB4. In this embodiment, the error code CRCC is a CRC since the error coding algorithm implemented by the error coding circuit ECCM is the CRC algorithm discussed above. The CRCC includes the bits FCS8-FCS5. However, alternative embodiments of the error coding circuit ECCM may be any suitable type of error coding generator capable of allowing the bus interface system 14 to maintain bus errors within error tolerances applicable to a particular application of the bus interface system 14. Therefore, alternative the error code CRCC may be any type of error code generated by such error coding generators, such as a parity code generator.

With regards to the cross over write command COM4, the error coding circuit ECCM of the data modulator 40 is configured to generate the error code CRCC based on the payload segment MPB4 and thus based on the cross over write command COM4. Thus, the error coding circuit ECCM shown in FIG. 3 is configured to implement the CRC algorithm on the payload segment MPB4 in order to generate the error code CRCC. The CRCC includes the bits FCS8-FCS5.

Next, the data frame 100 shown in FIG. 5 includes an error code subframe CRC2. During the error code subframe CRC2, the data modulator 40 of the master bus controller 18 is configured to generate a set of data pulses in the input data signal MODATA along the bus line UTO representing the error code CRCC in accordance with the one wire bus protocol (also, the PWM bus protocol). With regards to the translation bus controller 16, the decoder 74 in the data demodulator 70 of the translation bus controller 16 is operable to receive the set of data pulses within the input data signal MODATA that were transmitted during the error code frame CRC2. As such, the decoder 74 of the data demodulator 70 in the translation bus controller 16 is configured to decode the set of data pulses representing the error code CRCC into the decoded error code DCRCC in accordance with the one wire bus protocol (also, the PWM bus protocol). The decoded error code DCRCC is also stored within the data frame registers 76. Additionally, the error detection circuit EDCT of the data demodulator 70 in the translation bus controller 16 is configured to generate the error code CRCTC based on the decoded payload segment DMPB provided from the data frame registers 76. For example, with regards to the cross over write command COM4, the error detection circuit EDCT of the data demodulator 70 in the translation bus controller 16 is configured to generate the error code CRCTC based on the decoded payload segment DMPB that was decoded from the set of data pulses transmitted during the error code frame CRC2. More specifically, the error detection circuit EDCT of the data demodulator 70 implements the CRC algorithm on the decoded payload segment DMPB to generate the error code CRCTC. In this embodiment, the error code CRCTC is a CRC. However, alternative embodiments of the error coding circuit EDCT may be provided as any suitable type of error coding generator capable of allowing the bus interface system 14 to maintain bus errors within error tolerances applicable to a particular application of the bus interface system 14. Therefore, in alternative embodiments, the error code CRCTC may be any type of error code generated by such error coding generators, such as a parity code. As such, the error detection circuit EDCT is configured to detect whether the set of data pulses representing the payload segment MPB4 of the cross over write command COM4 were decoded appropriately by the translation bus controller 16.

The error detection circuit EDCT is then configured to perform an error check on the decoded payload segment DMPB by comparing the decoded error code DCRCC with the error code CRCTC. More specifically, the error detection circuit EDCT is configured to compare the decoded error code DCRCC with the error code CRCTC. By comparing the decoded error code DCRCC with the error code CRCTC, the error detection circuit EDCT of the data demodulator 70 in the translation bus controller 16 detects whether there is an error in the decoded payload segment DMPB. For example, when the decoded error code DCRCC and the error code CRCTC match (or have a specified relationship to one another), then no error is detected in the decoded payload segment DMPB. As such, the error check is passed by the decoded payload segment DMPB. However, when the decoded error code DCRCC and the error code CRCTC do not match (or do not the specified relationship to one another) then an error is detected. As such, the decoded payload segment DMPB fails the error check.

Referring again to FIGS. 3, 4, and 5, after the error code subframe CRC2, the write data frame 100 includes a bus park subframe BP1. During a bus park subframe BP1, the data modulator 40 of the master bus controller 18 transfers control of the bus line UTO to the translation bus controller 16. The data modulator 40 is configured to generate the enable signal MEN so that the bidirectional buffer 46 allows the translation bus controller 16 to communicate along the bus line UTO.

The write data frame 100 shown in FIG. 5 then includes an acknowledgement subframe ACK1. The translation bus controller 16 shown in FIG. 3 includes an acknowledge generator 88 configured to generate an acknowledgement signal ACK along the bus line UTO within the acknowledgement subframe ACK1. In response to the decoded payload segment DMPB passing the error check, the acknowledge generator 88 of the translation bus controller 16 is configured to generate the acknowledgement signal ACK along the bus line UTO so that the acknowledgement signal ACK indicates that the decoded payload segment DMPB passed the error check.

In the embodiment shown in FIG. 3, when no error is detected in the decoded payload segment DMPB and the error check is passed, the error detection circuit EDCT is configured to generate an error status signal 90 so that the error status signal 90 indicates that the decoded payload segment DMPB passed the error check. The acknowledge generator 88 of the translation bus controller 16 is operable to receive the error status signal 90 from the error detection circuit EDCT. In the embodiment shown in FIG. 3, the acknowledge generator 88 is configured to generate an acknowledgement pulse along the bus line within the acknowledgement signal ACK in response to the error status signal 90 indicating that the decoded payload segment DMPB passed the error check.

The shadow register circuit 62 of the master bus controller 18 is coupled to the bus line UTO and is operable to receive the acknowledgement signal ACK during the acknowledgement subframe ACK1. In response to the acknowledgement signal ACK indicating that the decoded payload segment DMPB passed the error check, the master bus controller 18 is configured to store the payload segment MPB4 of the data command COM4 in the memory device 56. More specifically, the shadow register circuit 62 is configured to pass the payload segment MPB4 stored within the shadow registers 64 to the memory device 56. The memory device 56 is configured to store the payload segment MPB4 within the slave data image 57 that is a replica of the slave data 37 of the memory device 35 in the slave bus controller 20 at the memory address identified by the address subfield of the command field CB4. In this embodiment, the shadow register circuit 62 is configured to pass the payload segment MPB4 to the memory device 56 in response to receiving the acknowledgement pulse along the bus line UTO during the acknowledgement subframe ACK1. The acknowledgement pulse provided by the acknowledgement signal ACK is a trigger pulse. The shadow register circuit 62 is triggered to pass the cross over write command COM4 (which includes the payload segment MPB4) to the memory device 56 in response to receiving the acknowledgement pulse along the bus line UTO during the acknowledgement subframe ACK1.

Since the memory addresses of the memory device 56 that stores the slave data image 57 (i.e., the particular one of the slave data images 57W-73Z shown in FIG. 3 that is a replica of the slave data 37 in the slave bus controller 20 (shown in FIG. 2) also corresponds to the memory addresses of the memory device 56 that store the slave data 37 in the slave bus controller 20, the payload segment MPB4 is also stored at the memory address of the slave data image 57 that corresponds to the decoded address subfield of the decoded command field DCB. Accordingly, the slave data image 57 that is a replica of the slave data 37 of the memory device 56 in the slave bus controller 20 is updated at the relevant memory address. Furthermore, the master bus controller 18 does not need to use another read command to obtain the slave data 37 at the corresponding memory address of the memory device 56 of the slave bus controller 20. Rather, the slave data image 57 that is a replica of the slave data 37 of the memory device 56 in the slave bus controller 20 includes an accurate copy within the slave data image 57 for the memory device 56 of the slave bus controller 20.

In response to the decoded payload segment DMPB failing the error check, the acknowledge generator 88 of the translation bus controller 16 is configured to not generate the acknowledgement signal ACK along the bus line UTO so that the acknowledgement signal ACK indicates that the decoded payload segment DMPB failed the error check. In the embodiment shown in FIG. 3, when the decoded payload segment DMPB fails the error check, the error detection circuit EDCT is configured to generate the error status signal 90 so that the error status signal 90 indicates that the decoded payload segment DMPB failed the error check. The acknowledge generator 88 shown in FIG. 3 is configured so as not to provide the acknowledgement pulse along the bus line UTO during the acknowledge subframe ACK1 when the error status signal 90 indicates that the decoded payload segment DMPB failed the error check. When the master bus controller 18 does not receive the acknowledge pulse and thus the acknowledgement signal ACK indicates that the decoded payload segment DMPB failed the error check, the master bus controller 18 may either retry communicating the cross over write command COM4 during a subsequent data frame, implement the next data command COM, or shut down the translation bus controller 16.

In response to no error being detected in the decoded payload segment DMPB and the error check is passed, the bus communication circuitry 36-TO is configured to pass the decoded command field DCM and the decoded payload segment DMPB as the decoded data command to the bus communication circuitry 32-TM of the translation bus controller 16. Since both error checks were passed and no error being detected in the decoded command field DCM and in the decoded payload segment DMPB, the decoded command field DCM and the decoded payload segment DMPB (shown in FIG. 4) are together a decoded write command that is a copy of the cross over write command COM4. As discussed above, the decoded command field DCM includes a copy of the bits SA3-SA0, a copy of the bits "011," and a copy of the bits A4-A0. The decoded payload segment DMPB includes a copy of the bits D7-D0.

The bus communication circuitry 32-TM is operable to receive the decoded write command (which is a copy of the cross over write command COM4) from the bus communication circuitry 36-TO. The write command COM4 is formatted in accordance with the one wire bus protocol (also, the PWM bus protocol) to request that a write bus operation be implemented by the slave bus controller 20. Accordingly, the decoded data command provided as the decoded command field DCM and the decoded payload segment DMPB is also formatted in accordance with the one wire bus protocol (also, the PWM bus protocol) to request that the same write bus operation. Due to operational differences resulting from the MIPI RFFE bus protocol of the bus interface system 12 and the one wire bus protocol of the bus interface system 14, the decoded data command provided as the decoded command field DCM and the decoded payload segment DMPB cannot simply be implemented by the slave bus controller 20. Thus, the bus communication circuitry 32-TM of the translation bus controller 16 is configured to translate the decoded write command into the translated data command CTT formatted in accordance with the MIPI RFFE bus protocol. The translated data command CTT is a translation of the cross over write command COM4. Accordingly, the translated write command CTT requests that the write bus operation of the write command COM4 but the translated write command CTT is formatted in accordance with the MIPI RFFE bus protocol (also, the multiwire bus protocol and the PAM bus protocol)

More specifically, the bus communication circuitry 32-TM of the translation bus controller 16 is configured to translate the decoded command field DCB into a command field formatted in accordance with the MIPI RFFE bus protocol (which is a multiwire bus protocol). As such, the bus communication circuitry 32-TM of the translation bus controller 16 is configured to translate the decoded bus controller identifier having the copy of the bits SA3-SA0 into a bus controller identifier that includes the bits named USID[3]-USID[0] (shown in FIG. 6), which identifies the slave bus controller 20 according to the MIPI RFFE bus protocol of the bus interface system 12. The bus communication circuitry 32-TM of the translation bus controller 16 is configured to translate the decoded command identifier having the copy of the bits the "011" into a command identifier "010" (shown in FIG. 6) which identifies the data command CTT, as a non-extended write command in accordance with the MIPI RFFE bus protocol. It should be noted that in alternative embodiments, the data command CTT may be an extended write command and thus the command identifier would be of bits identifying an extended write command. The bus communication circuitry 32-TM of the translation bus controller 16 is configured to translate the address field with bits A4-A0 into a memory address identifier that includes bits named C[4]-C[0] (shown in FIG. 6). The memory address identifier is provided in accordance with the MIPI RFFE bus protocol. For example, the bus interface system 12 and the bus interface system 14 may use different memory schemes to identify the same memory location (e.g., different virtual memory, address offset, and/or different physical address memory schemes. The bits USID[3]-USID[0], the bits "010," and the bits C[4]-C[0] are formatted in accordance with the MIPI RFFE bus protocol). Thus, the bits C[4]-C[0] identify the same memory location as the bits A4-A0 but in accordance with the memory scheme of the bus interface system 12. Alternative embodiments of the of the bus communication circuitry 36-TO may not translate but rather directly copy some of these field into the command field of the translated data command CTT is these are consistent and compatible with the operations of the bus interface system 12.

Figure 6:
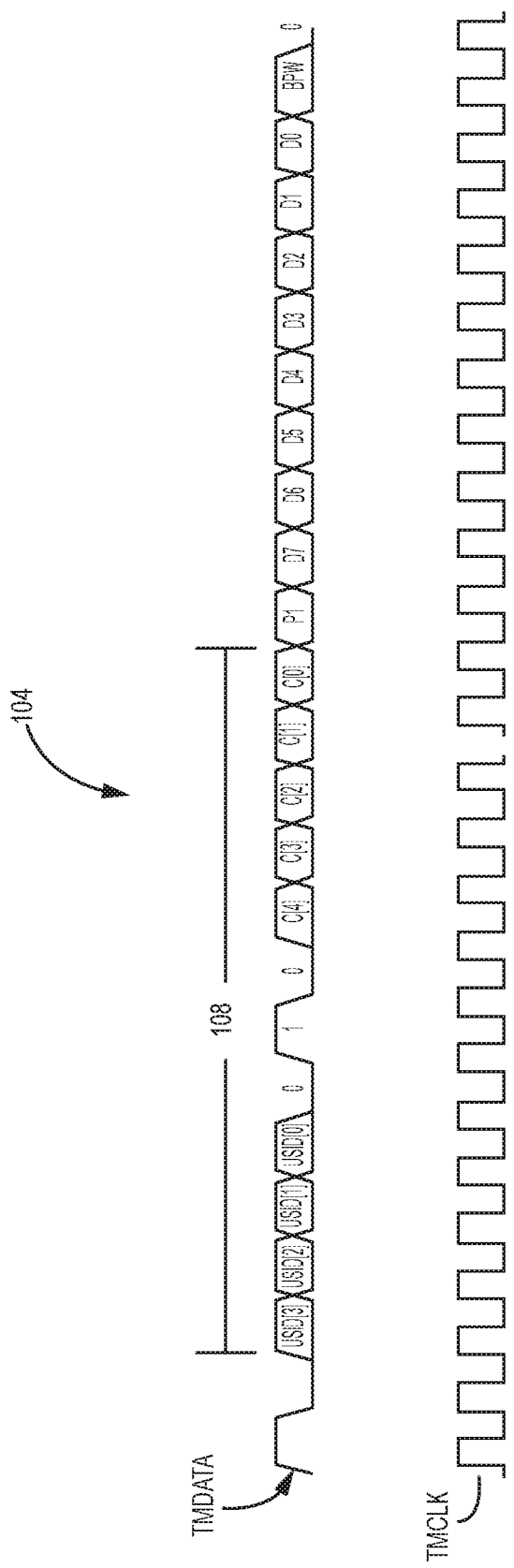
FIG. 6 is a data frame formatted in accordance with the MIPI RFFE bus protocol and implemented between the translation bus controller shown in FIG. 4 and the slave bus controller shown in FIG. 2 so that the cross over write bus operation is implemented.

In this example, the copy of the decoded payload segment DMPB having the bits D7-D0 is directly copied as the payload segment of the translated data command CTT. Thus, the payload segment of the translated data command CTT also includes a copy of the bit D7-D0 (as shown in FIG. 6). However, if there are differences in how the slave bus controller 20 and the master bus controller 18 represent the same information, alternative embodiments of the bus communication circuitry 32-TM are configured to translate the decoded payload segment DCM into the payload segment of the translated data command CTT in order to represent the same information. The translated data command CTT is stored in a data register 103 of the bus communication circuitry 32-TM. As such, the translated data command CTT is a translated write command and the translation bus controller 16 is configured to translate the decoded write command (which is provided as the decoded command field DCM and the decoded payload segment DMPB) into the translated data command CTT formatted in accordance with the MIPI RFFE bus protocol (which is the multiwire bus protocol) to request that a copy of the payload segment be written to the memory location in the memory device 35 of the slave bus controller 20.

With regard to the bus communication circuitry 32-TM, FIG. 6 illustrates a data frame 104 (also referred to as a translated write data frame 104). The bus communication circuitry 32-TM of the translation bus controller 16 is configured to provide the input data signal TMDATA such that the input data signal TMDATA represents a translated write command CTT in accordance with a MIPI RFFE bus protocol (also, the multiwire bus protocol and the PAM bus protocol). After translation, the bus communication circuitry 32-TM implements the data frame 104 by generating the input data signal TMDATA in accordance with the data frame 104. The clock signal CTM is generated along the bus line CTM by the FRO 106 to synchronize the operation of the bus communication circuitry 32-SM of the slave bus controller 20 in accordance with the data frame 104. Again, the input data signal TMDATA is transmitted along the bus line DTM and received by the bus communication circuitry 32-SM of the slave bus controller 20. The input data signal TMDATA is transmitted along the bus line CTM and received by the bus communication circuitry 32-SM of the slave bus controller 20.

The data frame 104 shown in FIG. 6 is formatted in accordance with the MIPI RFFE bus protocol of the bus interface system 12. To provide the input data signal TMDATA such that the input data signal TMDATA represents the translated data command CTT, the bus communication circuitry 32-TM of the translation bus controller 16 is configured to generate a set of data pulses (shown by the data frame 104 in FIG. 6) within the input data signal TMDATA such that the set of data pulses represent the translated data command CTT. The set of data pulses of the data frame 104 are formatted in accordance with the MIPI RFFE bus protocol. Since the MIPI RFFE bus protocol is a PAM bus protocol, the data pulses are formatted in accordance to a pulse amplitude modulation scheme where the input data signal TMDATA is high during a clock period of the clock signal TMCLK to represent a logical "1" during that clock cycle and the input data signal TMDATA is low during a clock cycle to represent a logical "0."

The bus communication circuitry 32-TM of the translation bus controller 16 includes a free running oscillator (FRO) 106. The FRO 106 is configured to generate the clock signal TMCLK along the bus line CTM. The bus communication circuitry 32-TM ensures that the set of data pulses in the data frame 104 are synchronized with the clock signal TMCLK. The slave bus controller 20 is operable to receive the input data signal TMDATA along the bus line DTM and the clock signal CTM. The bus communication circuitry 32-SM of the slave bus controller 20 is to receive the clock signal TMCLK along the bus line CTM from the bus communication circuitry 32-TM of the translation bus controller 16.

The bus communication circuitry 32-SM of the slave bus controller 20 is operable to receive the input data signal TMDATA along the bus line DTM from the bus communication circuitry 32-TM of the translation bus controller 16 and to receive the clock signal TMCLK along the bus line CTM from the bus communication circuitry 32-TM of the translation bus controller 16. The slave bus controller 20 is configured to implement the write bus operation in response to receiving the input data signal TMDATA representing the translated write command CTT. In this example, the input data signal TMDATA represents the translated data command CTT with the set of data pulses in the data frame 104 shown in FIG. 6.

Due to the PAM bus protocol, the bus communication circuitry 32-SM of the slave bus controller 20 cannot simply synchronize decoding based on the edges of the data pulses, since consecutive pulses representing the same bit value will not be separated by a pulse edge. Instead, the bus communication circuitry 32-SM of the slave bus controller 20 is configured to synchronize decoding the input data signal TMDATA in accordance with the clock signal TMCLK. The clock signal TMCLK runs from the end of the command field subframe 102 shown in FIG. 5 until the data frame 104 shown in FIG. 6 is completed. When there is no data frame being transmitted, the FRO 106 is disabled by the bus communication circuitry 32-TM to conserve power.

The first subset of data pulses of the data frame 104 are provided to meet a sequence start condition (SSC), which is defined by the MIPI RFFE bus protocol. The bus communication circuitry 32-SM of the slave bus controller 20 is configured to recognize that the first subset of data pulses within the input bus signal TMDATA comply with the SSC. In this manner, the bus communication circuitry 32-SM of the slave bus controller 20 is configured to detect that the master bus controller 18 has started the cross over write data frame 104. The second subset of data pulses in the data frame 104 includes data pulses represent the bits USID[3]-USID[0], which is the bus controller identifier of the translated data command CTT. The bits USID[3] to USID[0] were translated by the bus communication circuitry 32-TM from the bits SA3-SA0. The bits USID[3] to USID[0] identify the slave bus controller 20 but in this case do it in accordance with the MIPI RFFE bus protocol of the bus interface system 12. The third subset of the data pulses in the data frame 104 is the command identifier and includes the subset of data pulses representing the bits "010," which identify the cross over write command in accordance with the MIPI RFFE bus protocol and are a translation of the bits in the command identifier "011" shown in FIG. 5. The fourth subset of data pulses in the data frame is an address subframe that identifies the memory location in the memory device 35 to be written to. In this case, the address subframe includes the subset of the data pulses that represent the address field with the bits C[4]-C[0] in accordance with the MIPI RFFE bus protocol, which are translated by the bus communication circuitry 32-TM from the bits A4-A0. The second subset of the data pulses, the third subset of the data pulses and the fourth subset of the data pulse together are thus a subset of data pulses that represent the command field of the translated data command CTT. Accordingly, the subset of data pulses that represent the command field of the translated data command CTT are provided during a command field subframe 108 of the data frame 104. The bus communication circuitry 32-SM of the slave bus controller 20 is configured to decode the subset of the data pulses representing the command field of the translated data command CTT and generate a decoded command field, which is stored in data registers 110 as the decoded command field of a decoded data command DCTT in the data registers 110.

The data frame 104 then includes a pulse that represents a parity bit P1. The bus communication circuitry 32-TM of the translation bus controller 16 generates the parity bit P1 from the translated data command CTT. The bus communication circuitry 32-SM of the slave bus controller 20 is also configured to decode the data pulse representing the parity P1 into a decoded parity bit PD, which is also stored in the data registers 112.

Next, the data frame 104 shown in FIG. 6 also includes a subset of data pulses that represent the payload segment of the data command CTT with a copy of the bits D0-D7, which are a copy of the bits D0-D7 shown in FIG. 5. The bus communication circuitry 32-SM of the slave bus controller 20 is configured to decode the subset of data pulses that represent the payload segment of the data command CTT into a decoded payload segment, which is also stored in the data registers 112 as the decoded payload segment of the decoded data command DCTT. Thus, the decoded command field and the decoded payload segment make up the decoded data command DCTT. In this manner, the bus communication circuitry 32-SM of the slave bus controller 20 is configured to decode the set of data pulses in the data frame 104 into the decoded data command DCTT.

The bus communication circuitry 32-SM of the slave bus controller 20 is then configured to perform an error check by determining if the decoded parity bit PD and the parity bit PT match. In this example, the error check is a parity check. The bus communication circuitry 32-SM of the slave bus controller 20 is configured to generate a parity bit PT from the decoded data command DCTT. If the parity bit PT and the parity bit PD do not match, the bus communication circuitry 32-SM of the slave bus controller 20 is configured to perform error operations in accordance with the MIPI RFFE bus protocol (e.g., request that the data frame 104 be sent again). If the parity bit PT and the parity bit PD do match, then the data command CTT and the data command DCTT match. Thus, the decoded data command DCTT is a copy of the data command CTT. As such and just like the data command CTT, the decoded data command DCTT is formatted in accordance with the MIPI RFFE bus protocol (which is the multiwire bus protocol) to request that the decoded payload segment of the decoded data command DCTT (which is a copy of the payload segment of the data command CTT and is thus also a copy of the payload segment MPB4) be written to the memory location in the memory device 35 of the slave bus controller 20. The memory location is indicated by the decoded memory address of the decoded data command, which includes a copy of the bits C[4]-C[1].

Since the decoded data command DCTT also includes the decoded bus controller identifier (which has a copy of the bits USID[0]-USID[1]), the bus communication circuitry 32-SM is configured knows that the decoded data command is for the slave bus controller 20. The bus communication circuitry 32-SM is then configured to store the bits D0-D7 within the memory device 35 as one of the data segments DW0-DWS. The one of the data segments DW0-DWS will be a copy of the bits D0-D7 is the one of the data segments DW0-DWS at the memory location of the memory device 35 indicated by the decoded address field indicated by the copy of the bits C[4]-C[0]. Next, there is a subset of data pulses for implementing a bus park BPW. This indicates an end of the data frame 104. In response to the bus park BPW, the bus communication circuitry 32-TM of the translation bus controller is configured to disable the FRO 106 and stop generating the clock signal TMCLK since the subset of data pulses during the bus park BPW indicates the end to the data frame 104 and the cross over write bus operation.

The bus interface system 10 also can perform a cross over read bus operation so that the master bus controller 18 can read a data segment stored in memory by any of the slave bus controllers 20(1)-20(N). A particular implementation of the cross-over read bus operation is described in FIGS. 7-10 and explained with reference to FIG. 2 and the embodiments of the master bus controller 18 shown in FIGS. 2 and 3, the translation bus controller 16 shown in FIGS. 2 and 4, and the slave bus controller 20 shown in FIG. 2 (where the slave bus controller 20 may be any one of the slave bus controllers 20(1)-20(N) shown in FIG. 1).

To perform the cross over read bus operation, the master bus controller 18 is configured to modulate the input data signal MODATA along the bus line UTO so that the input data signal MODATA represents transactional bits for the cross over read bus operation in accordance with the one wire bus protocol (which is also the PWM bus protocol). The transactional bits describe transactional information related to the cross over bus operation to be performed. Thus, the transactional bits are formatted in accordance with the one wire bus protocol (which is also the PWM bus protocol) to identify a first memory location and to identify a slave bus controller (which in this example is the slave bus controller 20) for the cross over read bus operation. In one type of implementation, a set of one or more cross over write commands are used to communicate the transactional bits for the cross over read bus operation. The set of one or more data commands include a set of one or more payload segments, wherein the set of one or more payload segments include the transactional bits for the cross over read bus operation.

Accordingly, the master bus controller 18 is configured to modulate the input data signal MODATA to represent the transactional bits by being configured to modulate the input data signal MODATA along the bus line UTO to represent the set of one or more cross-over write commands that include the set of one or more payload segments in accordance with the one wire bus protocol (which is also the PWM bus protocol).

In the particular example of the cross over read bus operation described herein, the set of one or more cross over write commands is a set of two cross over write commands, which are the cross over write command COM5 and the cross-over write command COM6. The set of one or more payload segments is a set of two payload segments, which are the payload segment MPB5 and the payload segment MPB6. The payload segment MPB5 and the payload segment MPB6 include the transactional bits for the cross over read bus operation, as explained in further detail below. FIG. 7 and FIG. 8 illustrate data frames where the master bus controller 18 modulates the input data signal MODATA to represent the cross over write commands COM5, COM6 including the payload segments MPB5, MPB6 with the transactional bits, as explained in further detail below. In this embodiment, the transactional bits include a bus controller identifier that identifies the slave bus controller 20 for the cross over read bus operation and a memory address that identifies the memory location of the slave bus controller 20 for the cross over read bus operation. Thus, each of the cross over write commands COM5, COM6 is utilized to communicate a different subfield of the transactional bits for the cross over read bus operation.

In other implementations, the set of one more cross over write commands for a cross over read bus operation may include a single cross over write command having a single payload segment that includes all of the transactional bits and thus all the different subfields for the cross over read bus operation. Other implementations may have transactional bits with fields in addition to the bus controller identifier and the memory address, depending on what information is required by the translation bus controller 16 to implement the cross over read bus operation. This fields of the transactional bits may be included in the payload segment (e.g., the payload segment MPB5 or the payload segment MPB6) of one of the cross over write commands with other fields of the transactional bits. Alternatively, the set of cross over write commands for the cross over read bus operation may have a cross over write command for every field of the transactional bits so that the payload segment of each cross over write command includes a different field of the transactional bits. Thus, if the transactional bits included more fields of the transactional bits in addition to the bus controller identifier and the memory address, the set of cross over write commands COM5, COM6 for the cross over bus operation would include an additional cross over write command for each field of the transactional bits.

The translation bus controller 16 is configured to decode the input data signal MODATA transmitted along the bus line UTO that represents the transactional bits into decoded transactional bits. The translation bus controller 16 includes a set of one or more operational data registers, which in this embodiment includes an operational data register TRBI and an operational data register TRAD. So long as there is no error, the decoded transactional bits are a copy of the transactional bits. The translation bus controller 16 is then configured to translate the decoded transactional bits into a translated read command in response to storing the decoded transactional bits in the set of one or more data registers, as explained in further detail below. The translated read command is formatted in accordance with the MIPI RFFE bus protocol (which is one type of multiwire bus protocol and is also the PAM bus protocol) so as to request to read the memory location of the slave bus controller 20, which were identified by the transactional bits and thus also the decoded transactional bits. As such, the slave bus controller 20 is configured to implement the translated read command. The translation bus controller 16 is configured to modulate the input data signal TMDATA along the bus line DTM so that the input data signal TMDATA represents the translated read command in accordance with the MIPI RFFE bus protocol (which is one type of multiwire bus protocol and is also the PAM bus protocol) and to transmit the input data signal TMDATA to the slave bus controller 20.

The slave bus controller 20 is configured to decode the input data signal TMDATA along the bus line DTM that represents the translated read command into a decoded translated read command. So long as there is no error, the decoded translated read command is a copy of the translated read command. In response to the decoded translated read command, the slave bus controller 20 is configured to read the data segment DW stored at the memory location indicated by the decoded translated read command, and thus also the memory location indicated by the transactional bits. The slave bus controller 20 is configured to modulate the input data signal SMDATA so that the input data signal SMDATA represents the data segment in accordance with the MIPI RFFE bus protocol (which is one type of multiwire bus protocol and is also the PAM bus protocol) and transmit the input data signal SMDATA to the translation bus controller 16. FIG. 9 illustrates a data frame in which the input data signal TMDATA is modulated to represent the translated read command and the input data signal SMDATA represents the data segment requested by the translated read command, which is explained in further detail below.

The translation bus controller 16 is configured to decode the input data signal SMDATA along the bus line DTM that represents the data segment into a decoded data segment. So long as there is no error, the data segment is a copy of the decoded data segment. The translation bus controller 16 is configured to store the decoded data segment in the set of operational data registers. In the particular implementation discussed herein, the cross over read command COM7 requests to read the decoded data segment from the operational registers. The master bus controller 18 is configured to modulate the input data signal MODATA such that the input data signal MODATA represents the cross over read command COM7 in accordance with the one wire bus protocol (which is also the PWM bus protocol), which is transmitted along the bus line UTO to the translation bus controller 16. The translation bus controller 16 is configured to decode the input data signal MODATA that represents the cross over read command COM7 into a decoded read command. So long as there is no error, the decoded read command is a copy of the cross over read command COM7. The translation bus controller 16 is configured to read the decoded data segment stored in the set of operational data registers indicated by the decoded read command and thus also the cross over read command COM7.

The translation bus controller 16 is then configured to modulate the input data signal TODATA in accordance with the one wire bus protocol (which is also the PWM bus protocol) so that the input data signal TODATA represents the decoded data segment, which is transmitted along the bus line UTO to the master bus controller 18. The master bus controller 18 is configured to decode the input data signal TODATA representing the decoded data segment into a second decoded data segment. So long as there is no error, the second decoded data segment is a copy of the decoded data segment, and thus also a copy of the data segment stored at the memory location of the slave bus controller 20 indicated by the transactional bits for the cross over read bus operation. The master bus controller 18 is then configured to store the second decoded data segment in a slave image 57 for the slave bus controller 20 and thus maintain an accurate copy of the slave data stored by the memory device 35 of the slave bus controller 20. FIG. 10 illustrates an exemplary data frame illustrating the input data signal MODATA modulated by the master bus controller 18 to represent the cross over read command COM7 and the input data signal TODATA modulated by the translation bus controller 16 to represent the decoded data segment in accordance with the one wire bus protocol (which is also the PWM bus protocol), and is explained in further detail below.

Referring now to FIG. 2, FIG. 3, FIG. 4, and FIG. 7, FIG. 7 illustrates one embodiment of a data frame 200 (also referred to as a cross over write data frame 200) utilized by the bus interface system 10 shown in FIG. 2 to implement the cross over write command COM5. The master bus controller 18 is configured to modulate the input data signal MODATA with a set of data pulses such that the set of data pulses within the input data signal MODATA represents the cross over write command COM5 in accordance with the one wire bus protocol (which is also the PWM bus protocol). The cross over write data frame 200 describes the organization of the set of data pulses within the input data signal MODATA that represent the cross over write command COM5. The master bus controller 18 is configured to transmit input data signal MODATA to the translation bus controller 16 that represent the cross over write command COM5 and the translation bus controller 16 is operable to receive the input data signal MODATA that represents the cross over write command COM5 along the bus line UTO.

To modulate the input data signal MODATA so that the input data signal MODATA represents the cross over write command COM5, the data modulator 40 in the bus communication circuitry 36-MO of the master bus controller 18 is operable to receive the digital output 48 with the cross over write command COM5 from a (First In First Out) FIFO memory buffer 54. In this embodiment, the data modulator 40 in the bus communication circuitry 36-MO of the master bus controller 18 begins the cross over write data frame 200 by generating an initial low pulse and a sequence of data pulses within the input data signal MODATA along the bus line UTO in accordance with a start of sequence (SOS) pulse pattern. This sequence of data pulses is provided during the SOS subframe SOSSB at the beginning of the cross over write data frame 200. The master bus controller 18 is configured to transmit this sequence of data pulses along the bus line UTO during the SOS subframe SOSSB, which is at the beginning of the cross over write data frame 200. The sequence of data pulses includes a calibration data pulse.

The decoder 74 of the data demodulator 70 in the bus communication circuitry 36-TO of the translation bus controller 16 is configured to recognize that the sequence of data pulses transmitted along the bus line UTO has been provided in accordance with the SOS pulse pattern. In this manner, the decoder 74 of the data demodulator 70 of the translation bus controller 16 can detect when the master bus controller 18 has started the cross over write data frame 200. The decoder 74 of the data demodulator 70 of the translation bus controller 16 is further configured to be calibrated in accordance with the calibration data pulse in response to recognizing that the sequence of data pulses has been provided in accordance with the SOS pulse pattern. As such, the decoder 74 of the data demodulator 70 is configured to clear the data frame registers 76 in response to recognizing that the sequence of data pulses transmitted along the bus line UTO by the data modulator 40 of the master bus controller 18 has been provided in accordance with the SOS pulse pattern.

After the SOS subframe SOSSB, the cross over write data frame 200 includes the command field subframe 202. The data modulator 40 of the master bus controller 18 is configured to provide a subset of the data pulses within the input data signal MODATA representing the command field CB5 of the cross over write command COM5 during the command field subframe 202. The command field subframe 202 includes the bus controller identifier subframe USID2, the command identifier subframe CMD2, and the address subframe ADR2 of the cross over write command COM5. During the bus controller identifier subframe USID2, the data modulator 40 of the master bus controller 18 is configured to provide the subset of the data pulses along the bus line UTO within the input data signal MODATA to represent the bus controller identifier in the command field CB5 of the cross over write command COM5.

The bus controller identifier subframe USID2 includes a subset of data pulses that represent a subset of transactional bits named SA7-SA4 in accordance to the one wire bus protocol (which is also the PWM bus protocol). The bus controller identifier represented during the bus controller identifier subframe USID2 identifies the bus controller that the cross over write command COM5 is directed to towards. In this example, the transactional bits named SA7-SA4 identify the translation bus controller 16 shown in FIGS. 2 and 4. Thus, the bus controller identifier is in a bus controller identifier subfield of the command field CB5 includes the bits SA7-SA4 that identify the translation bus controller 16, and thus the subset of data pulses transmitted during the bus controller identifier subframe USID2 represent a bus controller identifier of the translation bus controller 16 in accordance to the one wire bus protocol (which is also the PWM bus protocol).

During the command identifier subframe CMD2 within the command field subframe 202, the command identifier subframe CMD2 includes a subset of data pulses that represents the command identifier in a command identifier subfield of the command field CB5 in accordance to the one wire bus protocol (which is also the PWM bus protocol). In this case, the command identifier subframe CMD2 represents the command identifier of bits "011." The command identifier of bits "011" identify the type of command as a non-extended write command in the one wire bus protocol (also, the PWM bus protocol) of the bus interface system 14. With respect to the cross over write data frame 200, the subset of the data pulses generated by the input data signal MODATA during the command identifier subframe CMD2 represents the command identifier in the command subfield of transactional bits "011" identifying the type of command as a non-extended write command. The data modulator 40 of the master bus controller 18 is configured to generate the subset of the data pulses within the input data signal MODATA along the bus line UTO to represent the command identifier in command identifier subfield of the command field CB5 of the cross over write command COM5.

With respect to the cross over write data frame 200, the data modulator 40 of the master bus controller 18 is configured to generate a subset of the data pulses during an address field subframe ADR2 representing a memory address in an address subfield of the command field CB5. In this case, the memory address in the address subfield of the command field CB5 that identifies the operational data register TRBI. The memory address includes the transactional bits "01111," where the memory address of the operational data register in hexadecimal notation is (0X0F). The data modulator 40 of the master bus controller 18 is configured to generate the subset of the data pulses during the address field subframe ADR2 within the input data signal MODATA along the bus line UTO so that the subset of the data pulses represent the memory address in the memory address field of the transactional bits "01111" in the command field CB5 of the cross over write command COM5. In this manner, the data modulator 40 in the bus communication system 36-MO of the master bus controller 18 is configured to generate a set of the data pulses representing the command field CB5 of the cross over write command COM5 in accordance with the one wire bus protocol (which is also the PWM bus protocol). The command filed CB5 of the cross over write command COM5 thus requests that the translation bus controller 16 write the payload segment MPB5 to the operational data register TRBI. Note that the transactional bits in the command field CB5 are not for the cross over read bus operation but rather are transactional bits for the write bus operation described by the command field CB5 of the cross over write command COM5.

With regards to the cross over write command COM5, the error coding circuit ECCM shown in FIG. 3 within the data modulator 40 in the bus communication circuitry 36-MO of the master bus controller 18 is configured to generate the error code CRCA based on the command field CB5 of one of the cross over write commands COM5. For example, with regards to the cross over write command COM5, the error coding circuit ECCM of the data modulator 40 is configured to generate the error code CRCA based on the command field CB5. The error code CRCA thus includes the bits FCS4-FCS0. The error coding circuit ECCM is thus configured to implement a cyclic redundancy code algorithm on the command field CB5 in order to generate the error code CRCA. Alternatively, the error coding circuit ECCM may be any type of suitable coding circuit such as a parity code generator, and the error code CRCA may include one or more parity bits.

The decoder 74 of the data demodulator 70 in the bus communication circuitry 36-TO of the translation bus controller 16 (shown in FIG. 4) is operable to receive the subset of data pulses in the input data signal MODATA that represent the command field CB5, which were transmitted during the command field subframe 202. The decoder 74 of the data demodulator 70 is configured to decode this subset of data pulses within the input data signal MODATA that represent the command field CB5 into the decoded command field DCB in accordance with the PWM bus protocol. The decoded command field DCB is stored within the data frame registers 76.

Next, the cross over write data frame 200 also includes the error code subframe CRC1 shown in FIG. 7. During the error code subframe CRC1, the data modulator 40 in the bus communication circuitry 36-MO of the master bus controller 18 is configured to generate a subset of data pulses along the bus line UTO within the input data signal MODATA representing the error code CRCA, which were transmitted by the data modulator 40 in the bus communication circuitry 36-MO of the master bus controller 18 along the bus line UTO to the translation bus controller 16.

Additionally, the decoder 74 of the data demodulator 70 in the bus communication circuitry 36-TO of the translation bus controller 16 is operable to receive the subset of data pulses within the input data signal MODATA that were transmitted during the error code subframe CRC1, which represent the error code CRCA. As such, the decoder 74 of the data demodulator 70 in the bus communication circuitry 36-TO is configured to decode the set of data pulses representing the error code CRCA into the decoded error code DCRCA in accordance with the PWM bus protocol. The decoded error code DCRCA is also stored within the data frame registers 76. Additionally, the error detection circuit EDCT (shown in FIG. 4) of the data demodulator 70 in the bus communication circuitry 36-TO of the translation bus controller 16 is configured to generate the error code CRCTA based on the decoded command field DCB provided from the data frame registers 76. For example, with regards to the cross over write command COM5, the error detection circuit EDCT of the data demodulator 70 in the translation bus controller 16 is configured to generate the error code CRCTA based on the decoded command field DCB.

The error detection circuit EDCT is then configured to perform an error check on the decoded command field DCB by comparing the decoded error code DCRCA with the error code CRCTA. More specifically, the error detection circuit EDCT is then configured to compare the decoded error code DCRCA with the error code CRCTA. By comparing the decoded error code DCRCA with the error code CRCTA, the error detection circuit EDCT of the data demodulator 70 in the translation bus controller 16 detects whether there is an error in the decoded command field DCB. For example, when the decoded error code DCRCA and the error code CRCTA match (or have a specified relationship to one another), then no error is detected in the decoded command field DCB. As such, the error check is passed by the decoded command field DCB. However, when the decoded error code DCRCA and the error code CRCTA do not match (or do not have the specified relationship to one another) then an error is detected. As such, the decoded command field DCB fails the error check. For example, for the cross over write command COM5 (which is one of the cross over write commands, the error detection circuit EDCT of the data demodulator 70 in the translation bus controller 16 is configured to generate the error code CRCTA based on the decoded command field DCB, which should be a copy of the command field CB5 of the cross over write command COM5. When the error code DCRCA and the error code CRCTA do not match, the decoded command field DCB fails the error check. In this manner, the error detection circuit EDCT is configured to detect whether there was an error in the decoded command field DCB.

When the error detection circuit EDCT detects an error in the decoded command field DCB and the error check has failed, the translation bus controller 16 aborts the cross over write command COM5. When no error is detected in the decoded command field DCB and the error check is passed, then the decoded command field DCB and the command field CB5 of the cross over write command COM5 match. Thus, the decoded command field DCB is a copy of the command field CB5. As such, the decoded command field DCB will include a decoded bus identifier subfield that is a copy of the bus identifier subfield of the command field CB5 represented during the bus identifier subframe USID2 and thus a copy of the bits SA7-SA4. The decoded command field DCB will include a decoded command identifier subfield that is a copy of the command identifier subfield of the command field CB5 represented during the command identifier subframe CMD2 and a copy of the bits "011". Thus, in this example, the decoded command identifier subfield requests a write bus operation, which is a bus suboperation of the cross over read bus operation. The decoded command field DCB will also include a decoded address subfield that is a copy of the address subfield of the command field CB5 represented during the address subframe ADR2, and thus also a copy of the bits "01111". Accordingly, the decoded command field DCB requests that a copy of the payload segment MPB5 be stored in the operational data register TRBI. Accordingly, the translation bus controller 16 prepares for the payload segment MPB5 from the master bus controller 18 to be written to the memory location identified by the decoded address field of the decoded command field DCB, which is the operational data register TRBI.

As shown in FIG. 7, after the error code subframe CRC1, the cross over write data frame 200 has a master payload subframe MPAYLOAD2. During the master payload subframe MPAYLOAD2, the master bus controller 18 is configured to modulate the input data signal MODATA with a set of data pulses representing the payload segment MPB5 of the cross over write command COM5. More specifically, the data modulator 40 in the bus communication circuitry 36-MO of the master bus controller 18 is configured to generate a set of data pulses along the bus line UTO within the input data signal MODATA representing the payload segment MPB5 of the cross over write command COM5. The payload segment MPB5 of the cross over write command includes some filler bits "0000" and a bus identifier subfield having the bus controller identifier that identifies the slave bus controller 20 for the cross over read operation. Thus, in this example, the bus controller identifier includes the bits SA3-SA0, which specifically identify the slave bus controller 20. It should be noted that in alternative embodiments, the bus controller identifier may identify the slave bus controller 20 shown in FIG. 2 along with one or more other slave bus controllers (e.g., the slave bus controllers 20(1)-20(N)) in the bus interface system 12. Referring again to FIG. 7, the bus controller identifier (i.e., the bits SA3-SA0) are a subset of the transactional bits for the cross over read bus operation, which are formatted in accordance with the one wire bus protocol (which is also the PWM bus protocol). Accordingly, the data modulator 40 in the bus communication circuitry 36-MO of the master bus controller 18 is configured to transmit the set of data pulses representing the payload segment MPB5 (and thus also representing the bus controller identifier for the cross over read bus operation) to the translation bus controller 16 along the bus line UTO.

The decoder 74 of the data demodulator 70 in the bus communication circuitry 36-TO of the translation bus controller 16 (shown in FIG. 4) of the translation bus controller 16 is operable to receive the set of data pulses representing the payload segment MPB5 (and thus also representing the bus controller identifier for the cross over read bus operation) that were transmitted along the bus line UTO during the master payload subframe MPAYLOAD2. The decoder 74 in the data demodulator 70 of the translation bus controller 16 is configured to decode the set of data pulses into a decoded payload segment DMPB. The data frame registers 76 are configured to store the decoded payload segment DMPB.

For the cross over write command COM5 being communicated during the cross over write data frame 200, the error coding circuit ECCM shown in FIG. 3 within the data modulator 40 in the bus communication circuitry 36-MO of the master bus controller 18 is configured to generate an error code CRCC based on the payload segment MPB5 of the cross over write command COM5. To generate the error code CRCC, the error coding circuit ECCM within the data modulator 40 of the master bus controller 18 is configured to implement the error check algorithm on the payload segment MPB5. In this embodiment, the error code CRCC is a CRC since the error coding algorithm implemented by the error coding circuit ECCM is the CRC algorithm discussed above. With regards to the cross over write command COM5, the error coding circuit ECCM of the data modulator 40 is configured to generate the error code CRCC based on the payload segment MPB5 and thus based on the cross over write command COM5. Thus, the error coding circuit ECCM shown in FIG. 3 is configured to implement the CRC algorithm on the payload segment MPB5 in order to generate the error code CRCC. The CRCC includes the bits FCS8-FCS5.

Next, the cross over write data frame 200 shown in FIG. 7 includes an error code subframe CRC4. During the error code subframe CRC4, the data modulator 40 in the bus communication circuitry 36-MO of the master bus controller 18 is configured to generate a set of data pulses in the input data signal MODATA along the bus line UTO representing the error code CRCC in accordance with the one wire bus protocol (which is also the PWM bus protocol) and transmit the input data signal MODATA to the translation bus controller 16. The decoder 74 of the data demodulator 70 in the bus communication circuitry 36-TO of the translation bus controller 16 is operable to receive this set of data pulses within the input data signal MODATA that were transmitted during the error code subframe CRC4 along the bus line UTO. As such, the decoder 74 of the data demodulator 70 in the bus communication circuitry 36-TO of the translation bus controller 16 is configured to decode the set of data pulses representing the error code subframe CRC4 into the decoded error code DCRCC in accordance with the one wire bus protocol (which is also the PWM bus protocol). The decoded error code DCRCC is also stored within the data frame registers 76. Additionally, the error detection circuit EDCT of the data demodulator 70 in the translation bus controller 16 is configured to generate the error code CRCTC based on the decoded payload segment DMPB provided from the data frame registers 76.

For example, with regards to the cross over write command COM5, the error detection circuit EDCT of the data demodulator 70 in the translation bus controller 16 is configured to generate the error code CRCTC based on the decoded payload segment DMPB that was decoded from the set of data pulses transmitted during the error code subframe CRC4. More specifically, the error detection circuit EDCT of the data demodulator 70 implements the CRC algorithm on the decoded payload segment DMPB to generate the error code CRCTC, which is a CRC in this embodiment.

The error detection circuit EDCT is then configured to perform an error check on the decoded payload segment DMPB by comparing the decoded error code DCRCC with the error code CRCTC. More specifically, the error detection circuit EDCT is configured to compare the decoded error code DCRCC with the error code CRCTC. By comparing the decoded error code DCRCC with the error code CRCTC, the error detection circuit EDCT of the data demodulator 70 in the translation bus controller 16 detects whether there is an error in the decoded payload segment DMPB. For example, when the decoded error code DCRCC and the error code CRCTC match (or have a specified relationship to one another), then no error is detected in the decoded payload segment DMPB. As such, the error check is passed by the decoded payload segment DMPB. However, when the decoded error code DCRCC and the error code CRCTC do not match (or do not have the specified relationship to one another) then an error is detected. As such, the decoded payload segment DMPB fails the error check.

When no error is detected in the decoded payload segment DMPB and the error check is passed, the decoded payload segment DMPB and the payload segment MPB5 match and thus, the decoded payload segment DMPB is a copy of the payload segment MPB5. As such, the decoded payload segment DMPB includes a decoded bus controller identifier that is a copy of the bus controller identifier for the cross over read bus operation. The decoded bus controller identifier thus identifies the slave bus controller 20 for the cross over read bus operation and includes a copy of the bits SA3-SA0. In response to the decoded command field DCB (which requests the write to the operational data register TRBI), the data demodulator 70 of the bus communication circuitry 36-TO in the translation bus controller 16 is configured to store the decoded payload segment DMPB in the operational data register TRBI as the data segment DRA. The decoded payload segment DMPB includes the decoded bus controller identifier (having a copy of the bits SA3-SA0) and thus the data segment DRA stored by the operational data register TRBI also includes the decoded bus controller identifier (having a copy of the bits SA3-SA0). In this manner, the data demodulator 70 of the bus communication circuitry 36-TO in the translation bus controller 16 is configured to store the decoded bus controller identifier that identifies the slave bus controller 20 for the cross over read bus operation in the operational data register TRBI.

Referring again to FIGS. 3, 4, and 7, after the error code subframe CRC2, the cross over write data frame 200 includes the bus park subframe BP1. During a bus park subframe BP4, the data modulator 40 of the master bus controller 18 transfers control of the bus line UTO to the translation bus controller 16.

The cross over write data frame 200 shown in FIG. 7 then includes an acknowledgement subframe ACK2. The translation bus controller 16 shown in FIG. 3 includes an acknowledge generator 88 configured to generate an acknowledgement signal ACK along the bus line UTO within the acknowledgement subframe ACK2. In response to the decoded payload segment DMPB passing the error check, the acknowledge generator 88 of the translation bus controller 16 is configured to generate the acknowledgment signal ACK along the bus line UTO so that the acknowledgement signal ACK indicates that the decoded payload segment DMPB passed the error check.

In the embodiment shown in FIG. 3, when no error is detected in the decoded payload segment DMPB and the error check is passed, the error detection circuit EDCT is configured to generate the error status signal 90 so that the error status signal 90 indicates that the decoded payload segment DMPB passed the error check. The acknowledge generator 88 of the translation bus controller 16 is configured to receive the error status signal 90 from the error detection circuit EDCT. In the embodiment shown in FIG. 3, the acknowledge generator 88 is configured to generate an acknowledgement pulse along the bus line UTO within the acknowledgement signal ACK of the command field CB5 in response to the error status signal 90 indicating that the decoded payload segment DMPB passed the error check. The shadow register circuit 62 of the master bus controller 18 is coupled to the bus line UTO and is configured to receive the acknowledgement signal ACK during the acknowledgement subframe ACK2.

In response to the acknowledgment signal ACK indicating that the decoded payload segment DMPB passed the error check, the master bus controller 18 is configured to store the payload segment MPB5 of the cross over write command COM5 in the memory device 56. More specifically, the shadow register circuit 62 is configured to pass the payload segment MPB5 stored within the shadow registers 64 to the memory device 56. The memory device 56 is configured to store the payload segment MPB5 within the slave data image 57 that is a replica of the slave data 37 of the memory device 35 in the slave bus controller 20 at the memory address identified by the address subfield of the command field CB5. In this embodiment, the shadow register circuit 62 is configured to pass the payload segment MPB5 to the memory device 56 in response to receiving the acknowledgement pulse along the bus line UTO during the acknowledgement subframe ACK2. The acknowledgement pulse provided by the acknowledgement signal ACK is a trigger pulse. The shadow register circuit 62 is triggered to pass the cross over write command COM5 (which includes the payload segment MPB5) to the memory device 56 in response to receiving the acknowledgement pulse along the bus line UTO during the acknowledgement subframe ACK2. When the decoded payload segment DMPB passes the error check, the master bus controller 18 prepares to communicate the data command COM6 to the translation bus controller 16, as explained below.

In response to the decoded payload segment DMPB failing the error check, the acknowledge generator 88 of the translation bus controller 16 is configured to not generate the acknowledgment signal ACK along the bus line UTO so that the acknowledgement signal ACK indicates that the decoded payload segment DMPB failed the error check. In the embodiment shown in FIG. 3, when the decoded payload segment DMPB fails the error check, the error detection circuit EDCT is configured to generate the error status signal 90 so that the error status signal 90 indicates that the decoded payload segment DMPB failed the error check. The acknowledge generator 88 shown in FIG. 3 is configured so as not to provide the acknowledgement pulse along the bus line UTO during the acknowledgement subframe ACK2 when the error status signal 90 indicates that the decoded payload segment DMPB failed the error check. When the master bus controller 18 does not receive the acknowledgement pulse and thus the acknowledgement signal ACK indicates that the decoded payload segment DMPB failed the error check, the master bus controller 18 may either retry communicating the cross over write command COM5 during a subsequent data frame or shut down the translation bus controller 16.

Referring now to FIG. 2, FIG. 3, FIG. 4, and FIG. 8, FIG. 8 illustrates one embodiment of a data frame 300 (also referred to as a cross over write data frame 300) utilized by the bus interface system 10 shown in FIG. 2 to implement the cross over write command COM6. The master bus controller 18 is configured to modulate the input data signal MODATA with a set of data pulses such that the set of data pulses within the input data signal MODATA represents the cross over write command COM6 in accordance with the one wire bus protocol (which is also the PWM bus protocol). The cross over write data frame 300 describes the organization of the set of data pulses within the input data signal MODATA that represent the cross over write command COM6. The master bus controller 18 is configured to transmit and the translation bus controller 16 is operable to receive the input data signal MODATA that represents the cross over write command COM6 along the bus line UTO.

To modulate the input data signal MODATA so that the input data signal MODATA represents the cross over write command COM6, the data modulator 40 in the bus communication circuitry 36-MO of the master bus controller 18 is operable to receive the digital output 48 with the cross over write command COM6 from the FIFO memory buffer 54. In this embodiment, the data modulator 40 in the bus communication circuitry 36-MO of the master bus controller 18 begins the cross over write data frame 300 by generating an initial low pulse and a sequence of data pulses within the input data signal MODATA along the bus line UTO in accordance with the SOS pulse pattern. This sequence of data pulses is provided during the SOS subframe SOSSB at the beginning of the cross over write data frame 300. The master bus controller 18 is configured to transmit this sequence of data pulses along the bus line UTO during the SOS subframe SOSSB, which is at the beginning of the cross over write data frame 300. The sequence of data pulses includes a calibration data pulse.

The decoder 74 of the data demodulator 70 in the bus communication circuitry 36-TO of the translation bus controller 16 is configured to recognize that the sequence of data pulses transmitted along the bus line UTO has been provided in accordance with the SOS pulse pattern. In this manner, the decoder 74 of the data demodulator 70 of the translation bus controller 16 can detect when the master bus controller 18 has started the cross over write data frame 300. The decoder 74 of the data demodulator 70 of the translation bus controller 16 is further configured to be calibrated in accordance with the calibration data pulse in response to recognizing that the sequence of data pulses has been provided in accordance with the SOS pulse pattern. As such, the decoder 74 of the data demodulator 70 is configured to clear the data frame registers 76 in response to recognizing that the sequence of data pulses transmitted along the bus line UTO by the data modulator 40 of the master bus controller 18 has been provided in accordance with the SOS pulse pattern.

After the SOS subframe SOSSB, the cross over write data frame 300 includes the command field subframe 302. The data modulator 40 of the master bus controller 18 is configured to provide a subset of the data pulses within the input data signal MODATA representing the command field CB6 of the cross over write command COM6 during the command field subframe 302. The command field subframe 302 includes the bus controller identifier subframe USID3, the command identifier subframe CMD3, and the address subframe ADR3 of the cross over write command COM6. During the bus controller identifier subframe USID3, the data modulator 40 of the master bus controller 18 is configured to provide the subset of the data pulses along the bus line UTO within the input data signal MODATA to represent the bus controller identifier in the command field CB6 of the cross over write command COM6.

The bus controller identifier subframe USID3 includes a subset of data pulses that represent the subset of transactional bits SA7-SA4 in accordance to the one wire bus protocol (which is also the PWM bus protocol). The bus controller identifier represented during the bus controller identifier subframe USID3 identifies the bus controller that the cross over write command COM6 is directed to towards. In this example, the transactional bits named SA7-SA4 identify the translation bus controller 16 shown in FIGS. 2 and 4. Thus, the bus controller identifier is in a bus controller identifier subfield of the command field CB6 includes the bits SA7-SA4 that identify the translation bus controller 16, and thus the subset of data pulses transmitted during the bus controller identifier subframe USID3 represent a bus controller identifier of the translation bus controller 16 in accordance to the one wire bus protocol (which is also the PWM bus protocol).

During the command identifier subframe CMD3 within the command field subframe 302, the command identifier subframe CMD3 includes a subset of data pulses that represents the command identifier in a command identifier subfield of the command field CB6 in accordance to the one wire bus protocol (which is also the PWM bus protocol). In this case, the command identifier subframe CMD3 represents the command identifier of bits "011." The command identifier of bits "011" identifies the type of command as a non-extended write command in the one wire bus protocol (also, the PWM bus protocol) of the bus interface system 14.

With respect to the cross over write data frame 300, the subset of the data pulses generated by the input data signal MODATA during the command identifier subframe CMD3 represents the command identifier in the command subfield of transactional bits "011" identifying the type of command as a non-extended write command. The data modulator 40 in the bus communication system 36-MO of the master bus controller 18 is configured to generate the subset of the data pulses within the input data signal MODATA along the bus line UTO to represent the command identifier in command identifier subfield of the command field CB6 of the cross over write command COME.

With respect to the cross over write data frame 300, the data modulator 40 of the master bus controller 18 is configured to generate a subset of the data pulses during an address field subframe ADR3 representing a memory address in an address subfield of the command field CB6. In this case, the memory address in the address subfield of the command field CB6 that identifies the operational data register TRBA. The memory address includes the transactional bits "10001," where the memory address of the operational data register in hexadecimal notation is (0X11). The data modulator 40 of the master bus controller 18 is configured to generate the subset of the data pulses during the address field subframe ADR3 within the input data signal MODATA along the bus line UTO so that the subset of the data pulses represent the memory address in the memory address field of the transactional bits "10001" in the command field CB6 of the cross over write command COM6. In this manner, the data modulator 40 in the bus communication system 36-MO of the master bus controller 18 is configured to generate a set of the data pulses representing the command field CB6 of the cross over write command COM6 in accordance with the one wire bus protocol (which is also the PWM bus protocol). The command filed CB6 of the cross over write command COM6 thus requests that the translation bus controller 16 write the payload segment MPB6 to the operational data register TRBA. Note that the transactional bits in the command field CB6 are not for the cross over read bus operation but rather are transactional bits for the write bus operation described by the command field CB6 of the cross over write command COM6.

With regards to the cross over write command COM6, the error coding circuit ECCM shown in FIG. 3 within the data modulator 40 in the bus communication circuitry 36-MO of the master bus controller 18 is configured to generate the error code CRCA based on the command field CB6 of one of the cross over write commands COM6. For example, with regards to the cross over write command COM6, the error coding circuit ECCM of the data modulator 40 is configured to generate the error code CRCA based on the command field CB6. The error code CRCA thus includes the bits FCS4-FCS0. The error coding circuit ECCM is thus configured to implement a cyclic redundancy code algorithm on the command field CB6 in order to generate the error code CRCA. Alternatively, the error coding circuit ECCM may be any type of suitable coding circuit such as a parity code generator, and the error code CRCA may include one or more parity bits.

The decoder 74 of the data demodulator 70 in the bus communication circuitry 36-TO of the translation bus controller 16 (shown in FIG. 4) is operable to receive the subset of data pulses in the input data signal MODATA that represent the command field CB6, which were transmitted during the command field subframe 302. The decoder 74 of the data demodulator 70 is configured to decode this subset of data pulses within the input data signal MODATA that represent the command field CB6 into the decoded command field DCB in accordance with the PWM bus protocol. The decoded command field DCB is stored within the data frame registers 76.

Next, the cross over write data frame 300 also includes the error code subframe CRC1 shown in FIG. 8. During the error code subframe CRC1, the data modulator 40 in the bus communication circuitry 36-MO of the master bus controller 18 is configured to generate a subset of data pulses along the bus line UTO within the input data signal MODATA representing the error code CRCA, which were transmitted by the data modulator 40 in the bus communication circuitry 36-MO of the master bus controller 18 along the bus line UTO to the translation bus controller 16.

Additionally, the decoder 74 of the data demodulator 70 in the bus communication circuitry 36-TO of the translation bus controller 16 is operable to receive the subset of data pulses within the input data signal MODATA that were transmitted during the error code subframe CRC1, which represent the error code CRCA. As such, the decoder 74 of the data demodulator 70 in the bus communication circuitry 36-TO is configured to decode the set of data pulses representing the error code CRCA into the decoded error code DCRCA in accordance with the PWM bus protocol. The decoded error code DCRCA is also stored within the data frame registers 76. Additionally, the error detection circuit EDCT (shown in FIG. 4) of the data demodulator 70 in the bus communication circuitry 36-TO of the translation bus controller 16 is configured to generate the error code CRCTA based on the decoded command field DCB provided from the data frame registers 76. For example, with regards to the cross over write command COME, the error detection circuit EDCT of the data demodulator 70 in the translation bus controller 16 is configured to generate the error code CRCTA based on the decoded command field DCB.

The error detection circuit EDCT is then configured to perform an error check on the decoded command field DCB by comparing the decoded error code DCRCA with the error code CRCTA. More specifically, the error detection circuit EDCT is then configured to compare the decoded error code DCRCA with the error code CRCTA. By comparing the decoded error code DCRCA with the error code CRCTA, the error detection circuit EDCT of the data demodulator 70 in the translation bus controller 16 detects whether there is an error in the decoded command field DCB. For example, when the decoded error code DCRCA and the error code CRCTA match (or have a specified relationship to one another), then no error is detected in the decoded command field DCB. As such, the error check is passed by the decoded command field DCB. However, when the decoded error code DCRCA and the error code CRCTA do not match (or do not have the specified relationship to one another) then an error is detected. As such, the decoded command field DCB fails the error check. For example, for the cross over write command COM6 (which is one of the cross over write commands), the error detection circuit EDCT of the data demodulator 70 in the translation bus controller 16 is configured to generate the error code CRCTA based on the decoded command field DCB, which should be a copy of the command field CB6 of the cross over write command COM6. When the error code DCRCA and the error code CRCTA do not match, the decoded command field DCB fails the error check. In this manner, the error detection circuit EDCT is configured to detect whether there was an error in the decoded command field DCB.

When the error detection circuit EDCT detects an error in the decoded command field DCB and the error check has failed, the translation bus controller 16 aborts the cross over write command COM6. When no error is detected in the decoded command field DCB and the error check is passed, then the decoded command field DCB and the command field CB6 of the cross over write command COM6 match. Thus the command field DCB is a copy of the command field CB6. As such, the decoded command field DCB will include a decoded bus identifier subfield that is a copy of the bus identifier subfield of the command field CB6 represented during the bus identifier subframe USID3 and thus a copy of the bits SA7-SA4. The decoded command field DCB will include a decoded command identifier subfield that is a copy of the command identifier subfield of the command field CB6 represented during the command identifier subframe CMD3 and a copy of the bits "011". Thus, in this example, the decoded command identifier subfield requests a write bus operation, which is a bus suboperation of the cross-over read bus operation. The decoded command field DCB will also include a decoded address subfield that is a copy of the address subfield of the command field CB6 represented during the address subframe ADR3, and thus also a copy of the bits "10001". Accordingly, the decoded command field DCB requests that a copy of the payload segment MPB6 be stored in the operational data register TRAD. Accordingly, the translation bus controller 16 prepares for the payload segment MPB6 from the master bus controller 18 to be written to the memory location identified by the decoded address field of the decoded command field DCB, which is the operational data register TRAD.

As shown in FIG. 8, after the error code subframe CRC1, the cross over write data frame 300 has a master payload subframe MPAYLOAD3. During the master payload subframe MPAYLOAD3, the master bus controller 18 is configured to modulate the input data signal MODATA with a set of data pulses representing the payload segment MPB6 of the cross over write command COM6. More specifically, the data modulator 40 in the bus communication circuitry 36-MO of the master bus controller 18 is configured to generate a set of data pulses along the bus line UTO within the input data signal MODATA representing the payload segment MPB6 of the cross over write command COM6. The payload segment MPB6 of the cross over write command COM6 includes some filler bits "0000" and a bus identifier subfield having the memory address that identifies the memory location in the memory device 35 of slave bus controller 20 for the cross over read operation. Thus, in this example, the memory address includes bits A4-A0, which identify the memory location in the memory device 35 for the cross over read operation. Thus, the memory address (i.e., the bits A4-A0) are a subset of the transactional bits for the cross over read bus operation, which are formatted in accordance with the one wire bus protocol (which is also the PWM bus protocol). Accordingly, the data modulator 40 in the bus communication circuitry 36-MO of the master bus controller 18 is configured to transmit the set of data pulses representing the payload segment MPB6 (and thus also representing the memory address for the cross over read bus operation) to the translation bus controller 16 along the bus line UTO.

The decoder 74 of the data demodulator 70 in the bus communication circuitry 36-TO of the translation bus controller 16 (shown in FIG. 4) of the translation bus controller 16 is operable to receive the set of data pulses representing the payload segment MPB6 (and thus also representing the memory address for the cross over read bus operation) that were transmitted along the bus line UTO during the master payload subframe MPAYLOAD3. The decoder 74 in the data demodulator 70 of the translation bus controller 16 is configured to decode the set of data pulses into a decoded payload segment DMPB. The data frame registers 76 are configured to store the decoded payload segment DMPB.

For the cross over write command COM6 being communicated during the write data frame 300, the error coding circuit ECCM shown in FIG. 3 within the data modulator 40 in the bus communication circuitry 36-MO of the master bus controller 18 is configured to generate an error code CRCC based on the payload segment MPB6 of the cross over write command COM6. To generate the error code CRCC, the error coding circuit ECCM within the data modulator 40 of the master bus controller 18 is configured to implement the error check algorithm on the payload segment MPB6. In this embodiment, the error code CRCC is a CRC since the error coding algorithm implemented by the error coding circuit ECCM is the CRC algorithm discussed above. With regards to the cross over write command COM6, the error coding circuit ECCM of the data modulator 40 is configured to generate the error code CRCC based on the payload segment MPB6 and thus based on the cross over write command COM6. The CRCC includes the bits FCS8-FCS5. Thus, the error coding circuit ECCM shown in FIG. 3 is configured to implement the CRC algorithm on the payload segment MPB6 in order to generate the error code CRCC. The CRCC includes the bits FCS8-FCS5.

Next, the cross over write data frame 300 shown in FIG. 8 includes an error code subframe CRC2. During the error code subframe CRC2, the data modulator 40 in the bus communication circuitry 36-MO of the master bus controller 18 is configured to generate a set of data pulses in the input data signal MODATA along the bus line UTO representing the error code CRCC in accordance with the one wire bus protocol (which is also the PWM bus protocol) and transmit the input data signal MODATA to the translation bus controller 16. The decoder 74 of the data demodulator 70 in the bus communication circuitry 36-TO of the translation bus controller 16 is operable to receive this set of data pulses within the input data signal MODATA that were transmitted during the error code subframe CRC2 along the bus line UTO. As such, the decoder 74 of the data demodulator 70 in the bus communication circuitry 36-TO of the translation bus controller 16 is configured to decode the set of data pulses representing the error code subframe CRC2 into the decoded error code DCRCC in accordance with the one wire bus protocol (which is also the PWM bus protocol). The decoded error code DCRCC is also stored within the data frame registers 76. Additionally, the error detection circuit EDCT of the data demodulator 70 in the translation bus controller 16 is configured to generate the error code CRCTC based on the decoded payload segment DMPB provided from the data frame registers 76.

For example, with regards to the cross over write command COME, the error detection circuit EDCT of the data demodulator 70 in the translation bus controller 16 is configured to generate the error code CRCTC based on the decoded payload segment DMPB that was decoded from the set of data pulses transmitted during the error code subframe CRC2. More specifically, the error detection circuit EDCT of the data demodulator 70 implements the CRC algorithm on the decoded payload segment DMPB to generate the error code CRCTC, which is a CRC in this embodiment.

The error detection circuit EDCT is then configured to perform an error check on the decoded payload segment DMPB by comparing the decoded error code DCRCC with the error code CRCTC. More specifically, the error detection circuit EDCT is configured to compare the decoded error code DCRCC with the error code CRCTC. By comparing the decoded error code DCRCC with the error code CRCTC, the error detection circuit EDCT of the data demodulator 70 in the translation bus controller 16 detects whether there is an error in the decoded payload segment DMPB. For example, when the decoded error code DCRCC and the error code CRCTC match (or have a specified relationship to one another), then no error is detected in the decoded payload segment DMPB. As such, the error check is passed by the decoded payload segment DMPB. However, when the decoded error code DCRCC and the error code CRCTC do not match (or do have not the specified relationship to one another) then an error is detected. As such, the decoded payload segment DMPB fails the error check.

When no error is detected in the decoded payload segment DMPB and the error check is passed, the decoded payload segment DMPB and the payload segment MPB6 match and thus the decoded payload segment DMPB is a copy of the payload segment MPB6. As such, the decoded payload segment DMPB includes a decoded memory address that is a copy of the memory address for the cross over read bus operation. The decoded memory address thus identifies the memory location of the memory device 35 of the slave bus controller 20 for the cross over read bus operation and thus includes a copy of the bits A4-A0. In response to the decoded command field DCB (which requests the write to the operational data register TRAD), the data demodulator 70 of the bus communication circuitry 36-TO in the translation bus controller 16 is configured to store the decoded payload segment DMPB in the operational data register TRAD, as the data segment DRA. The decoded payload segment DMPB includes the decoded memory address (having a copy of the bit A4-A0) and thus the data segment DRAB stored by the operational data register TRAD also includes the decoded memory address (having a copy of the bit A4-A0). In this manner, the data demodulator 70 of the bus communication circuitry 36-TO in the translation bus controller 16 is configured to store the decoded memory address that identifies the slave bus controller 20 for the cross over read bus operation in the operational data register TRAD.

Referring again to FIGS. 3, 4, and 8, after the error code subframe CRC2, the write data frame 300 includes the bus park subframe BP1. During a bus park subframe BP1, the data modulator 40 of the master bus controller 18 transfers control of the bus line UTO to the translation bus controller 16.

The cross over write data frame 300 shown in FIG. 8 then includes the acknowledgement subframe ACK1. The translation bus controller 16 shown in FIG. 3 includes an acknowledge generator 88 configured to generate an acknowledgement signal ACK along the bus line UTO within the acknowledgement subframe ACK1. In response to the decoded payload segment DMPB passing the error check, the acknowledge generator 88 of the translation bus controller 16 is configured to generate the acknowledgment signal ACK along the bus line UTO so that the acknowledgement signal ACK indicates that the decoded payload segment DMPB passed the error check.

In the embodiment shown in FIG. 3, when no error is detected in the decoded payload segment DMPB and the error check is passed, the error detection circuit EDCT is configured to generate the error status signal 90 so that the error status signal 90 indicates that the decoded payload segment DMPB passed the error check. The acknowledge generator 88 of the translation bus controller 16 is configured to receive the error status signal 90 from the error detection circuit EDCT. In the embodiment shown in FIG. 3, the acknowledge generator 88 is configured to generate an acknowledgement pulse along the bus line UTO within the acknowledgement signal ACK in the command field CB6 in response to the error status signal 90 indicating that the decoded payload segment DMPB passed the error check. The shadow register circuit 62 of the master bus controller 18 is coupled to the bus line UTO and is configured to receive the acknowledgement signal ACK during the acknowledgement subframe ACK1.

In response to the acknowledgment signal ACK indicating that the decoded payload segment DMPB passed the error check, the master bus controller 18 is configured to store the payload segment MPB6 of the data command COM6 in the memory device 56. More specifically, the shadow register circuit 62 is configured to pass the payload segment MPB6 stored within the shadow registers 64 to the memory device 56. The memory device 56 is configured to store the payload segment MPB6 within the slave data image 57 that is a replica of the slave data 37 of the memory device 35 in the slave bus controller 20 at the memory address identified by the address subfield of the command field CB6. In this embodiment, the shadow register circuit 62 is configured to pass the payload segment MPB6 to the memory device 56 in response to receiving the acknowledgement pulse along the bus line UTO during the acknowledgement subframe ACK1. The acknowledgement pulse provided by the acknowledgement signal ACK is a trigger pulse. The shadow register circuit 62 is triggered to pass the cross over write command COM6 (which includes the payload segment MPB6) to the memory device 56 in response to receiving the acknowledgement pulse along the bus line UTO during the acknowledgement subframe ACK1. When the decoded payload segment DMPB passes the error check, the master bus controller 18 prepares to communicate the data command COM7 to the translation bus controller 16, as explained below.

In response to the decoded payload segment DMPB failing the error check, the acknowledge generator 88 of the translation bus controller 16 is configured to not generate the acknowledgment signal ACK along the bus line UTO so that the acknowledgement signal ACK indicates that the decoded payload segment DMPB failed the error check. In the embodiment shown in FIG. 3, when the decoded payload segment DMPB fails the error check, the error detection circuit EDCT is configured to generate the error status signal 90 so that the error status signal 90 indicates that the decoded payload segment DMPB failed the error check. The acknowledge generator 88 shown in FIG. 3 is configured so as not to provide the acknowledgement pulse along the bus line UTO during the acknowledgement subframe ACK1 when the error status signal 90 indicates that the decoded payload segment DMPB failed the error check. When the master bus controller 18 does not receive the acknowledgement pulse and thus the acknowledgement signal ACK indicates that the decoded payload segment DMPB failed the error check, the master bus controller 18 may either retry communicating the cross over write command COM6 during a subsequent data frame, implement the next data command COM, or shut down the translation bus controller 16.

Thus, the set of one or more cross over write commands for the cross over read operation include a set of one or more command fields that request that the set of one or more payload segments be written to the set of one or more operational registers and a set of one or more payload segments that include the transactional bits for the cross over read bus operation. In the specific implementation described herein with respect to FIGS. 7 and 8, the set of cross over write commands COM5, COM6 for the cross over read bus operation include the command fields CB5, CB6. The command field CB5 requests that the translation bus controller 16 write the payload segment MPB5 with the bus controller identifier (which are a field of the transactional bits) to the operational data register TRBI. The command field CB6 requests that the translation bus controller 16 write the payload segment MPB6 with the memory address (which are another field of the transactional bits) to the operational data register TRAD. As explained above with respect to FIGS. 7 and 8, this results in the translation bus controller 16 generating the decoded bus controller identifier (which is a copy of the bus controller identifier for the cross over read operation) and the decoded memory address (which is a copy of the memory address for the cross over read bus operation). The decoded bus controller identifier and the decoded memory address are the decoded transactional bits with respect to the specific implementation discussed in FIGS. 7 and 8. Since the command field CB5 requests that the translation bus controller 16 write the payload segment MPB5 with the bus controller identifier to the operational data register TRBI and the command field CB6 requests that the translation bus controller 16 write the payload segment MPB6 with the memory address (which are another field of the transactional bits) to the operational data register TRAD, the data demodulator 70 in the bus communication circuitry 36-TO of the translation bus controller 16 is configured to store the decoded bus controller identifier is in the operational data register TRBI as the data segment DRB and to store the decoded memory address in the operational data register TRAB, as the data segment DRA. In this manner, the translation bus controller 16 is configured to write the decoded transactional bits to the operational data registers TRBI, TRAB. Note that in alternative implementations both the decoded bus controller identifier and the decoded memory address may be stored in a single operational data register. Also, if alternative implementation uses additional cross over commands with additional payload segments with additional fields of the transactional bits for the cross over read bus operation, the additional decoded fields may be stored in additional operational data registers. Alternatively, the additional decoded fields may be stored in the operational data register TRBI with the decoded bus controller identifier and/or in the operational data register TRAD with the decoded memory address. Furthermore, in alternative implementations that only use one cross over write command with one payload segment to transmit the transactional bits for the cross over read bus operation, the decoded transactional bits may all be stored in a single operational data register or the decoded fields of the decoded transactional bits may be stored in different operational data registers. What particular arrangement is used depends on the application, technological requirements, and design preferences for a particular microbus application.

Thus, the set of one or more cross over write commands for the cross over read operation include a set of one or more command fields that request that the set of one or more payload segments be written to the set of one or more operational registers and a set of one or more payload segments that include the transactional bits for the cross over read bus operation. In the specific implementation described herein with respect to FIGS. 7 and 8, the set of cross over write commands COM5, COM6 for the cross over read bus operation include the command fields CB5, CB6. The command field CB5 requests that the translation bus controller 16 write the payload segment MPB5 with the bus controller identifier (which is a field of the transactional bits) to the operational data register TRBI. The command field CB6 requests that the translation bus controller 16 write the payload segment MPB6 with the memory address (which is another field of the transactional bits) to the operational data register TRAD. As explained above with respect to FIGS. 7 and 8, this results in the translation bus controller 16 generating the decoded bus controller identifier (which is a copy of the bus controller identifier for the cross over read operation) and the decoded memory address (which is a copy of the memory address for the cross over read bus operation). The decoded bus controller identifier and the decoded memory address are the decoded transactional bits with respect to the specific implementation discussed in FIGS. 7 and 8. Since the command field CB5 requests that the translation bus controller 16 write the payload segment MPB5 with the bus controller identifier to the operational data register TRBI and the command field CB6 requests that the translation bus controller 16 write the payload segment MPB6 with the memory address (which are another field of the transactional bits) to the operational data register TRAD, the data demodulator 70 in the bus communication circuitry 36-TO of the translation bus controller 16 is configured to store the decoded bus controller identifier is in the operational data register TRBI as the data segment DRB and to store the decoded memory address in the operational data register TRAB, as the data segment DRA. In this manner, the translation bus controller 16 is configured to write the decoded transactional bits to the operational data registers TRBI, TRAB. Note that in alternative implementations both the decoded bus controller identifier and the decoded memory address may be stored in a single operational data register. Also, if alternative implementation uses additional cross over commands with additional payload segments with additional fields of the transactional bits for the cross over read bus operation, the additional decoded fields may be stored in additional operational data registers. Alternatively, the additional decoded fields may be stored in the operational data register TRBI with the decoded bus controller identifier and/or in the operational data register TRAD with the decoded memory address. Furthermore, in alternative implementations that only use one cross over write command with one payload segment to transmit the transactional bits for the cross over read bus operation, the decoded transactional bits may all be stored in a single operational data register or the decoded fields of the decoded transactional bits may be stored in different operational data registers. What particular arrangement is used depends on the application, technological requirements, and design preferences for a particular microbus application.

The translation bus controller 16 is configured to translate the decoded transactional bits into a translated read command. In the specific implementation discussed herein, the translation bus controller 16 is configured to translate the decoded transactional bits into a translated read command in response to the decoded payload segment of the payload segment MPB5 being stored in the operational data register TRBI (as the data segment DRB) and the decoded payload segment of the payload segment MPB6 being stored in the operational data register TRAD (as the data segment DRA). Once the decoded payload segment of the payload segment MPB5 is stored in the operational data register TRBI and the decoded payload segment of the payload segment MPB6 is stored in the operational data register TRAD, the operational data registers TRBI, TRAB are configured to pass the data segments DRB, DRA with the decoded transactional bits to the bus communication circuitry 32-TM of the translation bus controller 16.

The bus communication circuitry 32-TM is operable to receive the data segments DRB, DRA with the decoded transactional bits from the operational data registers TRBI, TRAD. More specifically, the bus communication circuitry 32-TM is operable to receive the data segment DRB and thus the decoded bus controller identifier from the data register TRBI. The bus communication circuitry 32-TM is operable to receive the data segment DRA and thus the decoded memory address from the data register TRAB. The decoded bus controller identifier and the decoded memory address are each formatted in accordance with the one wire bus protocol (also, the PWM bus protocol).

Due to operational differences resulting from the MIPI RFFE bus protocol of the bus interface system 12 and the one wire bus protocol of the bus interface system 14, the decoded transactional bits cannot simply be used by the slave bus controller 20 to implement a bus operation. Thus, the bus communication circuitry 32-TM of the translation bus controller 16 is configured to translate the decoded transactional bits into the translated data command CTT formatted in accordance with the MIPI RFFE bus protocol. The translated data command CTT is a translation of the transactional bits provided in the payload segments MPB5, MPB6 by the cross over write commands COM5, COM6 is a translated read command in this case. Accordingly, the translated data command CTT is formatted in accordance with the MIPI RFFE bus protocol so as to request that the slave bus controller 20 identified by the decoded bus controller identifier read the memory location identified by the decoded memory address.

More specifically, the bus communication circuitry 32-TM of the translation bus controller 16 is configured to translate the decoded transactional bits into a command field of the translated read command formatted in accordance with the MIPI RFFE bus protocol (which is a multiwire bus protocol). As such, the bus communication circuitry 32-TM of the translation bus controller 16 is configured to translate the decoded bus controller identifier having the copy of the bits SA3-SA0 into a bus controller identifier that includes the bits USID[3]-USID[0] (shown in FIG. 9), which identifies the slave bus controller 20 according to the MIPI RFFE bus protocol of the bus interface system 12. Since the bus communication circuitry 32-TM received the decoded transactional bits from the operational data registers TRBI, TRAD, the bus communication circuitry 32-TM of the translation bus controller 16 automatically provides the command identifier "011" (shown in FIG. 9) into the command field of the translated read command CTT and thus the translated read command CTT is non-extended read command in accordance with the MIPI RFFE bus protocol. The bus communication circuitry 32-TM of the translation bus controller 16 is configured to translate the decoded memory address with a copy of the bits A4-A0 into a memory address identifier that includes the bits named C[4]-C[0] (shown in FIG. 9). The memory address identifier is provided in accordance with the MIPI RFFE bus protocol. For example, the bus interface system 12 and the bus interface system 14 may use different memory schemes to identify the same memory location (e.g., different virtual memory, address offset, and/or different physical address memory schemes. The bits USID[3]-USID[0], the bits "011," and the bits C[4]-C[0] are formatted in accordance with the MIPI RFFE bus protocol). Thus, the bits C[4]-C[0] identify the same memory location as the bits A4-A0 but in accordance with the memory scheme of the bus interface system 12. Alternative embodiments of the of the bus communication circuitry 36-TO may not translate but rather directly copy some of these field into the command field of the translated data command CTT is these are consistent and compatible with the operations of the bus interface system 12. In alternative embodiments with additional decoded fields of transactional bits, the decoded fields are also placed within the command field of the translated read command CTT.

The translated data command CTT is stored in the data register 103 of the bus communication circuitry 32-TM. As such, the translated data command CTT is a translated read command and the translation bus controller 16 is configured to translate the decoded write command (which is provided as the decoded bus controller identifier and the decoded memory address) into the translated data command CTT formatted in accordance with the MIPI RFFE bus protocol (which is the multiwire bus protocol) to request to read the data segment DW at the memory location in the memory device 35 of the slave bus controller 20 which are indicated by the memory address and bus controller identifier of the translated data command CTT.

With regard to the bus communication circuitry 32-TM, FIG. 9 illustrates a data frame 400 (also referred to as a translated read data frame 400). The bus communication circuitry 32-TM of the translation bus controller 16 is configured to provide the input data signal TMDATA such that the input data signal TMDATA represents a translated write command CTT in accordance with a MIPI RFFE bus protocol (also, the multiwire bus protocol and the PAM bus protocol). After translation, the bus communication circuitry 32-TM implements the data frame 400 by generating the input data signal TMDATA in accordance with the data frame 400. The clock signal CTM is generated along the bus line CTM by the FRO 106 to synchronize the operation of the bus communication circuitry 32-SM of the slave bus controller 20 in accordance with the data frame 400. Again, the input data signal TMDATA is transmitted along the bus line DTM and received by the bus communication circuitry 32-SM of the slave bus controller 20. The input data signal TMDATA is transmitted along the bus line CTM and received by the bus communication circuitry 32-SM of the slave bus controller 20.

The data frame 400 shown in FIG. 9 is formatted in accordance with the MIPI RFFE bus protocol of the bus interface system 12. To provide the input data signal TMDATA such that the input data signal TMDATA represents the translated data command CTT, the bus communication circuitry 32-TM of the translation bus controller 16 is configured to generate a set of data pulses (shown by the data frame 400 in FIG. 9) within the input data signal TMDATA such that the set of data pulses represent the translated data command CTT. The set of data pulses of the data frame 400 are formatted in accordance with the MIPI RFFE bus protocol. Since the MIPI RFFE bus protocol is a PAM bus protocol, the data pulses are formatted in accordance to a pulse amplitude modulation scheme where the input data signal TMDATA is high during a clock period of the clock signal TMCLK to represent a logical "1" during that clock cycle and the input data signal TMDATA is low during a clock cycle to represent a logical "0."

The FRO 106 is configured to generate the clock signal TMCLK along the bus line CTM. The bus communication circuitry 32-TM ensures that the set of data pulses in the data frame 400 are synchronized with the clock signal TMCLK. The slave bus controller 20 is operable to receive the input data signal TMDATA along the bus line DTM and the clock signal CTM. The bus communication circuitry 32-SM of the slave bus controller 20 is to receive the clock signal TMCLK along the bus line CTM from the bus communication circuitry 32-TM of the translation bus controller 16.

The bus communication circuitry 32-SM of the slave bus controller 20 is operable to receive the input data signal TMDATA along the bus line DTM from the bus communication circuitry 32-TM of the translation bus controller 16 and to receive the clock signal TMCLK along the bus line CTM from the bus communication circuitry 32-TM of the translation bus controller 16. The slave bus controller 20 is configured to implement the write bus operation in response to receiving the input data signal TMDATA representing the translated write command CTT. In this example, the input data signal TMDATA represents the translated data command CTT with the set of data pulses in the data frame 400 shown in FIG. 9.

Due to the PAM bus protocol, the bus communication circuitry 32-SM of the slave bus controller 20 cannot simply synchronize decoding based on the edges of the data pulses, since consecutive pulses representing the same bit value will not be separated by a pulse edge. Instead, the bus communication circuitry 32-SM of the slave bus controller 20 is configured to synchronize decoding the input data signal TMDATA in accordance with the clock signal TMCLK. The clock signal TMCLK runs until the data frame 400 shown in FIG. 9 is completed. When there is no data frame being transmitted, the FRO 106 is disabled by the bus communication circuitry 32-TM to conserve power.

The first subset of data pulses of the data frame 400 (also known as the translated read data frame 400) are provided to meet the sequence start condition SSC, which is defined by the MIPI RFFE bus protocol. The bus communication circuitry 32-SM of the slave bus controller 20 is configured to recognize that the first subset of data pulses within the input bus signal TMDATA comply with the SSC. In this manner, the bus communication circuitry 32-SM of the slave bus controller 20 is configured to detect that the master bus controller 18 has started the translated read data frame 400. The second subset of data pulses in the data frame 400 includes data pulses represent the bits USID[3]-USID[0], which is the bus controller identifier of the translated data command CTT. The bits USID[3] to USID[0] were translated by the bus communication circuitry 32-TM from the bits SA3-SA0. The bits USID[3] to USID[0] identify the slave bus controller 20 but in this case do it in accordance with the MIPI RFFE bus protocol of the bus interface system 12. The third subset of the data pulses in the data frame 400 is the command identifier and includes the subset of data pulses representing the bits "011," which identify a non-extended read command in accordance with the MIPI RFFE bus protocol. It should be noted that in alternative embodiments, the data command CTT may be an extended read command and thus the command identifier would identify an extended read command. Referring again to FIG. 9, the fourth subset of data pulses in the data frame is an address subframe with the memory address from the translated read command CTT that identifies the memory location in the memory device 35 to be read from. In this case, the address subframe includes the subset of the data pulses that represent the bits C[4]-C[0] in accordance with the MIPI RFFE bus protocol, which were translated by the bus communication circuitry 32-TM from the bits A4-A0. The second subset of the data pulses, the third subset of the data pulses and the fourth subset of the data pulse together are thus a subset of data pulses that represent the command field of the translated data command CTT. Accordingly, the subset of data pulses that represent the command field of the translated data command CTT are provided during a command field subframe 402 of the data frame 400.

The bus communication circuitry 32-SM of the slave bus controller 20 is configured to decode the subset of the data pulses representing the command field of the translated data command CTT and generate a decoded data command DCTT, which is stored in the data registers 110 as the decoded command field, which is the decoded data command DCTT in the data registers 110.

The data frame 400 then includes a pulse that represents a parity bit P1. The bus communication circuitry 32-TM of the translation bus controller 16 generates the parity bit P1 from the translated data command CTT. As shown by the data frame 400 shown in FIG. 9, the bus communication circuitry 32-TM of the translation bus controller 16 then generates a pulse that represents the parity bit P1. The bus communication circuitry 32-TM of the translation bus controller 16 generates the parity bit P1 from the translated data command CTT. The bus communication circuitry 32-SM of the slave bus controller 20 is also operable to receive the pulse that represents the parity bit P1. The bus communication circuitry 32-SM of the slave bus controller 20 is configured to decode the pulse representing the parity P1 into the decoded parity bit PD, which is stored in the data registers 112. The bus communication circuitry 32-SM of the slave bus controller 20 is also configured to generate the parity bit PT from the decoded data command DCTT. The parity bit PT is also stored in the data registers 112. When the parity bit PT and the parity bit PD do not match, there is an error in the decoded data command DCTT and thus the data command DCTT and the translated data command CTT do not match. Thus, the bus communication circuitry 32-SM of the slave bus controller 20 may request a retransmission of the translated data command CTT. If the parity bit PT and the parity bit PD do match, then the translated data command CTT and the data command DCTT match. As such, the decoded data command DCTT includes a decoded bus controller identifier, which is a copy of the bus controller identifier of the translated data command CTT. Thus, the decoded data command DCTT includes a copy of the bits USID[3]-USID[0]. The decoded data command DCTT includes a decoded command identifier, which is a copy of the command identifier of the translated data command CTT. Thus, the decoded data command DCTT includes a copy of the bits "011." The decoded data command DCTT includes a decoded memory address, which is a copy of the memory address of the translated data command CTT. Thus, the decoded data command DCTT includes a copy of the bits C[4]-C[0]. The bus communication circuitry 32-SM is then configured to read one of the data segments DW0-DWS at the memory location of the memory device 35 indicated by the decoded read command of the decoded translated data command DCTT which is indicated by the decoded memory address and the copy of the bits C[4]-C[0]. As such, the data segment DW at the memory location indicated by the decoded memory address includes the bits D7-D0. The bus communication circuitry 32-SM of the slave bus controller 20 is configured to modulate the input data signal SMDATA so as to represent the data segment DW (which was read from the memory location by the slave bus controller 20 indicated by the decoded memory address of the decoded translated read command DCTT) in accordance with the MIPI RFFE bus protocol. More specifically, the bus communication circuitry 32-SM is configure to generate and transmit a set of data pulses that represent the data segment DW in accordance with the MIPI RFFE bus protocol (which is also the PAM bus protocol) along the bus line DTM to the translation bus controller, which is shown in FIG. 9.

The bus communication circuitry 32-TM of the translation bus controller 16 is configured to receive the input data signal SMDATA with the set of data pulses representing the data segment DW (which was read from the memory location by the slave bus controller 20 indicated by the decoded memory address of the decoded translated read command DCTT) from the slave bus controller 20 along the bus line DTM. The bus communication circuitry 32-TM is configured to decode the data segment DW into a decoded data segment, DDW. The decoded data segment DDW is stored in data registers 120 of the bus communication circuitry 32-TM.

As shown in FIG. 9, the bus communication circuitry 32-SM is then configured to generate and transmit a pulse that represents the parity bit PT along the bus line DTM to the translation bus controller 16. The bus communication circuitry 32-SM is configured to again generate the parity bit PT. However, in this case, the bus communication circuitry 32-SM is configured to generate the parity bit PT from the data segment DW (which was read from the memory location by the slave bus controller 20 indicated by the decoded memory address of the decoded translated read command DCTT). The parity bit PT is stored in the data registers 112.

The bus communication circuitry 32-TM of the translation bus controller 16 is operable to receive the pulse that represents the parity bit PT. The bus communication circuitry 32-TM of the translation bus controller 16 is configured to decode the pulse representing the parity PT into the decoded parity bit PS, which is stored by the bus communication circuitry 32-TM in data registers 122. The bus communication circuitry 32-TM of the translation bus controller 16 is also configured to generate a parity bit PW from the decoded data segment DW stored in the data registers 120. The parity bit PW is stored by the bus communication circuitry 32-TM in the data registers 122. When the parity bit PS and the parity bit PW do not match, there is an error in the decoded data segment DDW and thus the decoded data segment DDW and the data segment DW (which was read from the memory location by the slave bus controller 20 indicated by the decoded memory address of the decoded translated read command DCTT) do not match. Thus, the bus communication circuitry 32-SM of the slave bus controller 20 may request a retransmission of the data segment. If the parity bit PS and the parity bit PW do match, then the decoded data segment DDW and the data segment DW match. As such, the decoded data segment DDW is a copy of the data segment DW. Thus, the decoded data segment DDW includes a copy of the bits D7-D0. In response to the decoded data segment DDW and the data segment DW matching, the bus communication circuitry 32-SM is configured to pass the decoded data segment DDW to the operational data register TRAD. In this manner, the bus communication circuitry 32-SM is configured to write the decoded data segment DDW to the operational data register TRAD so that as the decoded data segment DDW is stored as the data segment DRA. The decoded memory address with the copy of the bits SA3-SA0 which was formerly stored in the operational data register TRAD is cleared and the operational data register TRAD is written so that the data segment DRA stored in the operational data register TRAD as the data segment DRA is the decoded data segment DDW with a copy of the bits D7-D0.

Referring now to FIG. 2, FIG. 3, FIG. 4, and FIG. 10, FIG. 10, FIG. 10 illustrates one embodiment of a data frame 500 (also referred to as a cross over read data frame 500) utilized by the bus interface system 10 shown in FIG. 2 to implement the cross over read command COM7. The cross over read data frame 500 describes the organization of data pulses generated along the bus line UTO with the input data signal MODATA by the master bus controller 18 and with the input data signal TODATA in order to implement the cross over read command COM7 shown in FIG. 3. To implement a read bus operation, the data modulator 40 is configured to receive the cross over read command COM7 from the FIFO memory buffer 54.

The cross over read data frame 500 describes an organization of data pulses generated along the bus line UTO with the input data signal MODATA by the master bus controller 18 in order to implement the cross over read commands COM7. In this embodiment, the data modulator 40 in the bus communication circuitry 36-MO of the master bus controller 18 begins the cross over read data frame 500 by generating an initial low pulse and a sequence of data pulses within the input data signal MODATA along the bus line UTO in accordance with the SOS pulse pattern. The data modulator 40 in the bus communication circuitry 36-MO of the master bus controller 18 is configured to transmit this sequence of data pulses along the bus line UTO during the SOS subframe SOSSB, which is at the beginning of the cross over read data frame 500. The sequence of data pulses includes a calibration data pulse, as explained in the aforementioned applications.

The decoder 74 in the data demodulator 70 of the bus communication circuitry 36-TO in the translation bus controller 16 is configured to recognize that the sequence of data pulses transmitted along the bus line UTO by the data modulator 40 of the master bus controller 18 has been provided in accordance with the SOS pulse pattern. In this manner, the decoder 74 in the data demodulator 70 of the bus communication circuitry 36-TO in the translation bus controller 16 can detect when the master bus controller 18 has started the cross over read data frame 500. The decoder 74 in the data demodulator 70 of the bus communication circuitry 36-TO in the translation bus controller 16 is further configured to be calibrated in accordance with the calibration data pulse in response to recognizing that the sequence of data pulses has been provided in accordance with the SOS pulse pattern. As such, the decoder 74 in the data demodulator 70 of the bus communication circuitry 36-TO in the translation bus controller 16 is configured to clear the data frame registers 76 in response to recognizing that the sequence of data pulses transmitted along the bus line UTO by the data modulator 40 in the bus communication circuitry 36-MO of the master bus controller 18 has been provided in accordance with the SOS pulse pattern.

After the SOS subframe SOSSB, the cross over read data frame 500 includes the command field subframe 502. The data modulator 40 of the master bus controller 18 is configured to provide a subset of the data pulses within the input data signal MODATA representing the command field CB7 of the cross over read command COM7 during the command field subframe 502. The command field subframe 502 includes the bus controller identifier subframe USID4, the command identifier subframe CMD4, and the address subframe ADR4 of the cross over read command COM7. During the bus controller identifier subframe USID4, the data modulator 40 of the master bus controller 18 is configured to provide the subset of the data pulses along the bus line UTO within the input data signal MODATA to represent the bus controller identifier in the command field CB7 of the cross over read command COM7.

The bus controller identifier subframe USID4 includes a subset of data pulses that represent a subset of transactional bits named SA7-SA4 in accordance to the one wire bus protocol (which is also the PWM bus protocol). The bus controller identifier represented during the bus controller identifier subframe USID4 identifies the bus controller that the cross over read command COM7 is directed to towards. In this example, the transactional bits named SA7-SA4 identify the translation bus controller 16 shown in FIGS. 2 and 4. Thus, the bus controller identifier is in a bus controller identifier subfield of the command field CB7 includes the bits SA7-SA4 that identify the translation bus controller 16, and thus the subset of data pulses transmitted during the bus controller identifier subframe USID4 represent a bus controller identifier of the translation bus controller 16 in accordance to the one wire bus protocol (which is also the PWM bus protocol).

During the command identifier subframe CMD4 within the command field subframe 502, the command identifier subframe CMD4 includes a subset of data pulses that represents the command identifier in a command identifier subfield of the command field CB7 in accordance to the one wire bus protocol (which is also the PWM bus protocol). In this case, the command identifier subframe CMD4 represents the command identifier of bits "111." The command identifier of bits "111" identifies the type of command as a non-extended read command in the one wire bus protocol (also, the PWM bus protocol) of the bus interface system 14. With respect to the cross over read data frame 500, the subset of the data pulses generated by the input data signal MODATA during the command identifier subframe CMD4 represents the command identifier in the command subfield of transactional bits "111" identifying the type of command as a non-extended write command. The data modulator 40 in the bus communication system 36-MO of the master bus controller 18 is configured to generate the subset of the data pulses within the input data signal MODATA along the bus line UTO to represent the command identifier in command identifier subfield of the command field CB7 of the cross over read command COM7.

With respect to the cross over read data frame 500, the data modulator 40 of the master bus controller 18 is configured to generate a subset of the data pulses during an address field subframe ADR4 representing a memory address in an address subfield of the command field CB7. In this case, the memory address in the address subfield of the command field CB7 that identifies the operational data register TRBA. The memory address includes the transactional bits "10001," where the memory address of the operational data register in hexadecimal notation is (0X11). The data modulator 40 of the master bus controller 18 is configured to generate the subset of the data pulses during the address field subframe ADR4 within the input data signal MODATA along the bus line UTO so that the subset of the data pulses represent the memory address in the address subfield of the transactional bits "10001" in the command field CB7 of the cross over read command COM7. In this manner, the data modulator 40 in the bus communication system 36-MO of the master bus controller 18 is configured to generate a set of the data pulses representing the command field CB7 of the cross over read command COM7 in accordance with the one wire bus protocol (which is also the PWM bus protocol). The command filed CB7 of the cross over read command COM7 thus requests that the translation bus controller 16 write the payload segment MPB7 to the operational data register TRBA. Note that the transactional bits in the command field CB7 are not the transactional bits for the cross over read bus operation transmitted with the payload segments of the cross over write commands COM5, COM6 but rather are transactional bits for a read bus operation of the cross over read command to request to read the data segment DRA (which was set to the decoded data segment DDW, as explained above) stored in the operational data register TRBA of the translation bus controller 16. In this manner, the master bus controller 18 is requesting a copy of the decoded data segment DDW, which is a copy of the data segment requested by the transactional bits in the payload segments of the cross over write command COM5, COM6.

With respect to the command field subframe 502, the subset of the data pulses generated by the data modulator 40 in the bus communication circuitry 36-MO of the master bus controller 18 during the data subframe CMD4 represents the command identifier in the command field CB7 of the cross over read commands COM7 in accordance with the one wire bus protocol (which is also the PWM bus protocol). The data modulator 40 in the bus communication circuitry 36-MO of the master bus controller 18 is configured to generate a subset of the data pulses along the bus line UTO within the input data signal MODATA to represent the command identifier in the command field CB7 of the cross over read command COM7.

Also, with respect to the command field subframe 502, the data modulator 40 in the bus communication circuitry 36-MO of the master bus controller 18 is configured to generate a subset of the data pulses within the command field subframe 502 representing the memory address that identifies the operational data register TRAD in accordance with the one wire bus protocol (also the PWM bus protocol) during the data subframe ADR4. The memory address has the bits "10001", which are formatted in accordance with the one wire bus protocol (also the PWM bus protocol) to identify the operational data register TRAD.

With regards to the cross over read commands COM7, the error coding circuit ECCM shown in FIG. 3 within data modulator 40 in the bus communication circuitry 36-MO of the master bus controller 18 is configured to generate the error code CRCA based on the command field CB7 of one of the cross over read commands COM7. For example, with regards to the cross over read command COM7, the error coding circuit ECCM of the data modulator 40 is configured to generate the error code CRCA based on the command field CB7. The error code CRCA includes the bits FCS4-FCS0. In this embodiment, the error coding circuit ECCM is a cyclic redundancy code generator and the error code CRCA is a cyclic redundancy code. The error coding circuit ECCM is thus configured to implement a cyclic redundancy code algorithm on the command field CB7 in order to generate the error code CRCA. Alternatively, the error coding circuit ECCM may be any type of suitable coding circuit such as a parity code generator and the error code CRCA may include one or more parity bits.

The cross over read data frame 500 also includes the error code subframe CRC1 shown in FIG. 10. During the error code subframe CRC1, the data modulator 40 in the bus communication circuitry 36-MO of the master bus controller 18 is configured to generate a set of data pulses along the bus line UTO within the input data signal MODATA representing the error code CRCA in accordance with the one wire bus protocol (which is also the PWM bus protocol).

As such, the decoder 74 in the data demodulator 70 of the bus communication circuitry 36-TO in the translation bus controller 16 is operable to receive the set of data pulses in the input data signal MODATA that were transmitted along the bus lien UTO during the command field subframe 502. The decoder 74 of the data demodulator 70 is configured to decode this set of data into a decoded command field DCB in accordance with the PWM bus protocol. The decoded command field DCB is stored within the data frame registers 76. In this case, the decoded command field DCB is a decoded read command, since the cross over data command COM7 is the command field CB7.

The decoder 74 in the data demodulator 70 of the bus communication circuitry 36-TO in the translation bus controller 16 is also operable to receive the set of data pulses within the input data signal MODATA that were transmitted during the error code frame CRC1. As such, the decoder 74 in the data demodulator 70 of the bus communication circuitry 36-TO in the translation bus controller 16 is configured to decode the set of data pulses representing the error code CRCA into the decoded error code DCRCA in accordance with the PWM bus protocol. The decoded error code DCRCA is also stored within the data frame registers 76. Additionally, the error detection circuit EDCT of the data demodulator 70 in the bus communication circuitry 36-TO translation bus controller 16 is configured to generate the error code CRCTA based on the decoded command field DCB (which is the decoded data command) provided from the data frame registers 76. For example, with regards to the cross over read command COM7, the error detection circuit EDCT of the data demodulator 70 is configured to generate the error code CRCTA based on the decoded command field DCB (which is the decoded data command) that was decoded from the set of data pulses representing the set of data pulses in the input data signal MODATA representing the command field CB7 of the cross over read command COM7.

The error detection circuit EDCT is then configured to perform an error check on the decoded command field DCB by comparing the decoded error code DCRCA with the error code CRCTA. More specifically, the error detection circuit EDCT is then configured to compare the decoded error code DCRCA with the error code CRCTA. By comparing the decoded error code DCRCA with the error code CRCTA, the error detection circuit EDCT of the data demodulator 70 in the bus communication circuitry 36-TO of the translation bus controller 16 detects whether there is an error in the decoded command field DCB (which is the decoded data command). For example, when the decoded error code DCRCA and the error code CRCTA match (or have a specified relationship to one another), then no error is detected in the decoded command field DCB (which is the decoded data command). As such, the error check is passed by the decoded command field DCB (which is the decoded data command). However, when the decoded error code DCRCA and the error code CRCTA do not match (or do not have the specified relationship to one another) then an error is detected. As such, the decoded command field DCB (which is the decoded data command) fails the error check. For example, for the cross over read command COM7 (which is one of the command field CB7), the error detection circuit EDCT of the data demodulator 70 in the translation bus controller 16 is configured to generate the error code CRCTA based on the decoded command field DCB (which is the decoded data command), which should be a copy of the command field CB7 and thus also a copy of the cross over read command COM7. When the error code DCRCA and the error code CRCTA do not match, the decoded command field DCB (which is also the PWM bus protocol) fails the error check. In this manner, the error detection circuit EDCT is configured to detect whether the set of data pulses representing the command field CB7 were decoded appropriately.

When the error detection circuit EDCT detects an error in the decoded command field DCB and the error check has failed, the translation bus controller 16 aborts the cross over read command COM7. When no error is detected in the decoded command field DCB (which is a decoded read command) and the error check is passed, then the decoded command field DCB (which is the decoded read command) and the command field CB7 (which is the cross over read command COM7) match. As such, the decoded command field DCB (which is the decoded read command) will include a decoded bus controller identifier that is a copy of the bus controller identifier of the command field CB7 represented during the bus identifier subframe USID4. Thus, the decoded bus controller identifier includes a copy of the bits SA7-SA4. The decoded command field DCB (which is the decoded read command) will include a decoded command identifier that is a copy of the command identifier of the command field CB7 represented during the command identifier subframe CMD4. The decoded command field thus includes a copy of the bits "111." The decoded command field DCB (which is the decoded read command) will include a decoded memory address that is a copy of the decoded memory address of the command field CB7 represented during the bus identifier subframe ADR4. Thus, the decoded memory address includes a copy of the bits "10001". In this manner, the decoded command field DCB (which is the decoded read command) is a copy of the command field CB7 (and thus a copy of the cross over read command COM7). The decoded command field DCB (which is the decoded read command) request to read that the translation bus controller 16 read the data segment DRA stored in the operational data register TRAD. As mentioned previously, the data segment DRA is provided as the decoded data segment DDW as discussed above with respect to FIG. 9.

Referring again to FIG. 2, FIG. 3, FIG. 4, and FIG. 10, after the error code subframe CRC1, the read data frame 500 includes a bus park subframe BP2. During the bus park subframe BP2, data modulator 40 in the bus communication circuitry 36-MO of the master bus controller 18 transfers control of the bus line UTO to the translation bus controller 16. The master bus controller 18 is thus configured to transfer control of the bus line UTO to the translation bus controller 16 after transmitting the set of data pulses representing the command field CB7 (also the cross over read command COM7) during the command field subframe 502 and the set of data pulses representing the error code CRCA during the data subframe CRC1. To transfer control of the bus line UTO, the data modulator 40 in the bus communication circuitry 36-MO of the master bus controller 18 is configured to generate the enable signal MEN so that the bidirectional buffer 46 allows the translation bus controller 16 to generate data pulses along the bus line UTO with the input data signal TODATA. In one embodiment, the master bus controller 18 is configured to begin the bus park subframe BP2 by dropping the input data signal MODATA to ground with a passive pull-down. A failing edge of input data signal MODATA begins an error tolerance window with a temporal duration of two standard time slots. After the falling edge of MODATA, the master bus controller 18 transfers control of the bus line UTO to the slave bus controller.

Once the bus park subframe BP2 ends, the master bus controller 18 monitors the bus line UTO during the error tolerance window to detect whether the slave bus controller is responsive. In this embodiment, the master bus controller 18 is configured to monitor the bus line UTO for another falling edge on the bus line UTO after transferring control to the translation bus controller 16. If the translation bus controller 16 generates the falling edge in the error tolerance window, then the master bus controller 18 deems that the translation bus controller 16 is operational, and the read data frame 500 continues. However, when no falling edge is provided, the master bus controller 18 determines that the translation bus controller 16 is stuck high or stuck low, and the master bus controller 18 is thus unresponsive. The master bus controller 18 sets a lock error status register high in its bus status registers. If the lock error status register is pulsed high, then the master bus controller 18 is configured to abort the cross over read command COM7. Once the cross over read command COM7 is aborted, the master bus controller 18 is configured to pull the bus line low so that a supply voltage of the translation bus controller 16 and any other slave bus controller is set to 0V. Accordingly, the translation bus controller 16 is reset.

Referring again to FIG. 2, FIG. 3, FIG. 4, and FIG. 10, after the bus park subframe BP2, the read data frame has a payload subframe TPAYLOAD. During the payload subframe TPAYLOAD, the translation bus controller 16 is configured to generate a set of data pulses within the input data signal TODATA and along the bus line UTO that represent the data segment DRA identified by the decoded command field DCB (the decoded read command), which in this example stored the decoded data segment DDW, as discussed above with respect to FIG. 9. More specifically, the data modulator 72 in the bus communication circuitry 36-TO of the translation bus controller 16 is configured to generate a set of data pulses representing the data segment DRA along the bus line UTO in accordance with the one wire bus protocol (which is also the PWM bus protocol). With decoded command field DCB (the decoded read command) for the cross over read command COM7, the data modulator 72 is configured to read the decoded command field DCB. In response to the decoded command field (the decoded read command), the data modulator 72 of the bus communication circuitry 36-TO to read the data segment DRA stored within the operational data register TRAD. The data modulator 72 of the bus communication circuitry 36-TO in the translation bus controller 16 is configured to generate the set of the data pulses within the input data signal TODATA along the bus line UTO so that the set of data pulses represent the data segment DRA in accordance with the one wire bus protocol (which is also the PWM bus protocol. As mentioned above with respect to FIG. 9, the data segment DRA is the decoded data segment DDW.

The data demodulator 58 in the bus communication circuitry 36-MO of the master bus controller 18 is operable to receive the set of data pulses that represent the data segment DRA within the input data signal TODATA during the payload subframe TPAYLOAD, as shown in FIG. 10. The data demodulator 58 is configured to decode the set of data pulses into a decoded data segment DSDW in accordance with the PWM bus protocol. The decoded data segment DSDW is stored within the payload registers 60.

Referring again to FIG. 2, FIG. 3, FIG. 4, and FIG. 10, the read data frame 500 then includes the error code subframe CRC3. To ensure accurate data transmission, the error coding circuit ECCT shown in FIG. 4 within the data modulator 72 of the bus communication circuitry 36-TO of the translation bus controller 16 is configured to generate an error code CRCT based on the decoded data stored at the memory address identified by the decoded command field DCB (which is the decoded read command) stored in the operation data register TRAD. Since the decoded command field DCB of the decoded read command is a copy of the command field CB7 (and thus the cross over read command COM7), the error coding circuit ECCT shown in FIG. 4 within the data modulator 72 of the translation bus controller 16 is configured to generate the error code CRCT based on the data segment DRA stored at the data register TRBA. In this embodiment, the error coding circuit ECCT is a CRC generator, and the error code CRCT is a CRC. The error coding circuit ECCT is thus configured to implement a CRC algorithm on the data segment DRA identified by the decoded read command in order to generate the error code CRCT. Thus, in this embodiment, the error code CRCT is a CRC. However, the error coding circuit ECCT may be any type of suitable error coding circuit such as a parity code generator. The CRCT includes the bits FCS12-FCS9.

During the error code subframe CRC3, the data modulator 72 of the translation bus controller 16 is configured to generate a set of data pulses within the input data signal TODATA along the bus line UTO representing the error code CRCT in accordance with the PWM bus protocol. Accordingly, the data demodulator 58 of the master bus controller 18 is operable to receive the set of data pulses within the input data signal TODATA representing the CRCB in accordance with the one wire bus protocol (which is also the PWM bus protocol). The data demodulator 58 in the bus communication circuitry 36-MO of the master bus controller 18 is configured to decode the set of data pulses that were transmitted during the error code subframe CRC3 into a decoded error code DCRCB. The decoded error code DCRCB is stored within the payload registers 60.

The error detection circuit EDCM of the data demodulator 58 in the bus communication circuitry 36-MO of the master bus controller 18 is configured to generate an error code CRCM based on the decoded data segment DSDW provided from the payload registers 60. The error detection circuit EDCM may implement the same (or a different but related algorithm) as the error detection circuit ECCT of the translation bus controller 16 in order to generate the error code CRCM. In this embodiment, the error detection circuit EDCM is a CRC error detector and the error code CRCM is a CRC code. The error code CRCM includes the bits FCS12-FCS9.

The error detection circuit EDCM is then configured to perform an error check on the decoded data segment DSDW by comparing the decoded error code DCRCB with the error code CRCM. More specifically, the error detection circuit EDCM is operable to compare the decoded error code DCRCB with the error code CRCM. Based on a correspondence between the decoded error code DCRCB and the error code CRCM, the error detection circuit EDCM of the data demodulator 58 in the master bus controller 18 detects whether there is an error in the decoded data segment DSDW. When the correspondence between the decoded error code DCRCB and the error code CRCM has a specified relationship, no error is detected by the EDCM in the decoded data segment DSDW and the decoded data segment DSDW passes the error check. In one example, the error detection circuit EDCM is configured to compare the decoded error code DCRCB and the error code CRCM to determine whether the decoded error code DCRCB and the error code CRCM match. When the decoded error code DCRCB and the error code CRCM match, the decoded data segment DSDW passes the error check. However, when the decoded error code DCRCB and the error code CRCM don't match, then the decoded data segment DSDW fails the error check. For example, the error detection circuit EDCM of the data demodulator 58 in the master bus controller 18 is configured to generate the error code CRCM based on the decoded data segment DSDW, which should be a copy of the data segment DRA. When the error code DCRCB and the error code CRCM do not match, the decoded data segment DSDW fails the error check, and the decoded data segment DSDW is not an accurate copy of the data segment DRA.

However, when the error code DCRCB and the error code CRCM match, the decoded data segment DSDW passes the error check. The decoded data segment DSDW is thus an accurate copy of the data segment DRA, which was set as the decoded data segment DDW, as explained above with respect to FIG. 9. Accordingly, the data segment DSDW is a copy of the data segment DW and thus the data segment DSDW includes a copy of the bit D7-D0. The data segment DW was the data segment requested to be read by the translated data command CTT and thus also by the transactional bits for the cross over read operation that were included in the payload segments of the cross over write command COM5, COME. In this manner, the error detection circuit EDCM is configured to detect whether the set of data pulses representing data segment DSDDW was decoded appropriately. In this embodiment, the error code circuit ECCM and the error detection circuit ECCT are configured to implement the same CRC algorithm. In alternative embodiments, the error code circuit ECCM and the error detection circuit ECCT are configured to implement the different CRC algorithms, and the correspondence between their results is known.

In response to the decoded error code DCRCB and if the error code and CRCM match (or have a specified relationship to one another), the data demodulator 58 in the bus communication circuitry 36-MO of the master bus controller 18 is configured to store the decoded data segment DSDW within the memory device 56. In this embodiment, the data demodulator 58 stores the decoded data segment DSDW in the slave data image 57 (i.e. the particular one of the slave data images 57W-57Z that is a replica of the slave data 37 stored by the memory device 35 of the slave bus controller 20 shown in FIG. 2) for the slave bus controller 20. More specifically, the decoded word DSDW is stored within the slave data image 57 at a memory address that corresponds with the address identifier of the cross over read command COM7. The address identifier identifies the memory address of the memory device 35 of the slave bus controller 20 storing the data segment DW at the memory address provided by the payload segment MPB6 of the cross over write command COM6. As such, the decoded word DSDW is stored by the memory device 56 of the master bus controller 18 within the slave data image 57 at the memory address that corresponds to the memory address of the memory device 35 in the slave bus controller 20 that stores the data segment DW of the slave data 37 In this manner, the master bus controller 18 can create and maintain the slave data image 57 as an accurate replica of the slave data 37 within the memory device 35. Accordingly, with the translation bus controller 16, the bus interface system 10 implements the cross over read bus operation to read a copy of the data segment DW as requested by the transactional bits provided by the cross over write command COM5, COM6.

As shown in FIG. 10, a bus park subframe BP3 is provided at the end of the read data frame 500 and is used to give the master bus controller 18 control of the bus line UTO. During the bus park subframe BP3, the master bus controller 18 is thus configured to generate the enable signal MEN such that the bidirectional buffer 46 allows the input data signal TODATA to be provided along the bus line UTO or the input data signal SODATA to be provided along the bus line UMS. In one embodiment, the master bus controller 18 is configured to begin the bus park subframe BP3 by dropping the input data signal MODATA to ground with a passive pull-down. A failing edge of input data signal MODATA begins an error tolerance window with a temporal duration of two standard time slots. After the falling edge of MODATA, the master bus controller 18 surrenders control of the bus lines UTO, UMS. The bus park subframe DP2 thus ends and the data frame 500.

Those skilled in the art will recognize improvements and modifications to the preferred embodiments of the present disclosure. All such improvements and modifications are considered within the scope of the concepts disclosed herein and the claims that follow.

What is claimed is:

1. A bus interface system comprising:
a first bus controller operable to generate a first input data signal, wherein the first bus controller is configured to modulate the first input data signal such that the first input data signal represents a cross over write command in accordance with a first bus protocol and wherein the cross over write command is formatted in accordance with the first bus protocol to request that a write bus operation be implemented by a second bus controller;
a translation bus controller coupled to the first bus controller via a first bus consisting of one bus wire and operable to receive the first input data signal and generate a second input data signal, wherein the translation bus controller is configured to modulate the second input data signal such that the second input data signal represents a translated write command in accordance with a second bus protocol wherein the translated write command is a translation of the cross over write command such that the translated write command requests the write bus operation of the cross over write command but the translated write command is formatted in accordance with the second bus protocol; and
the second bus controller operable to receive the second input data signal, wherein the second bus controller is configured to implement the write bus operation requested by the translated write command.

2. The bus interface system of claim 1 further comprising:
a first bus interface subsystem configured to operate in accordance with the first bus protocol, wherein the first bus interface subsystem includes the first bus controller; and
a second bus interface subsystem configured to operate in accordance with the second bus protocol, wherein the second bus interface subsystem includes the first bus controller and the second bus controller.

3. The bus interface system of claim 2 wherein the first bus controller is a master bus controller that operates in accordance with the first bus protocol.

4. The bus interface system of claim 3 wherein the second bus controller is a slave bus controller of the second bus interface subsystem.

5. The bus interface system of claim 4 wherein the second bus interface subsystem further comprises the translation bus controller and a first plurality of slave bus controllers that operates in accordance with the second bus protocol, wherein the master bus controller is configured to provide the cross over write command so that the cross over write command may be directed to any one of the first plurality of slave bus controllers in the second bus interface subsystem.

6. The bus interface system of claim 5 wherein the first bus interface subsystem further comprises a second plurality of slave bus controllers that operates in accordance with the first bus protocol.

7. The bus interface system of claim 6 wherein the translation bus controller is configured to convert the first input data signal into a first supply voltage.

8. The bus interface system of claim 7 wherein the first bus protocol is a one wire bus protocol.

9. The bus interface system of claim 8 wherein the second bus protocol is a Mobile Industry Processor Interface (MIPI) radio frequency front end (RFFE) bus protocol.

10. The bus interface system of claim 1 further comprises a first bus line and a second bus line wherein:
the first bus line is connected between the first bus controller and the translation bus controller;
the second bus line is connected between the translation bus controller and the second bus controller;
the first bus controller is configured to modulate the first input data signal such that the first input data signal represents the cross over write command by being configured to generate a first set of data pulses within the first input data signal in accordance with the first bus protocol such that the first set of data pulses represents the cross over write command; and
the translation bus controller is configured to:
decode the first set of data pulses representing the cross over write command into a first decoded write command formatted in accordance with the first bus protocol;
translate the first decoded write command into the translated write command formatted in accordance with the second bus protocol; and
modulate the second input data signal such that the second input data signal represents the translated write command by being configured to generate a second set of data pulses within the second input data signal along the second bus line in accordance with the second bus protocol such that the second set of data pulses represents the translated write command.

11. The bus interface system of claim 10 wherein the second bus controller is configured to:
decode the second set of data pulses representing the translated write command into a second decoded write command; and
implement the write bus operation requested by the translated write command by being configured to implement the write bus operation that is requested by the second decoded write command.

12. The bus interface system of claim 11 wherein the translation bus controller is configured to convert the first input data signal into a supply voltage.

13. The bus interface system of claim 11 further comprising a third bus line connected between the translation bus controller and the second bus controller wherein:
the translation bus controller comprises a free running oscillator (FRO) configured to generate a clock signal along the third bus line; and
the second bus controller is configured to synchronize the decoding of the second set of data pulses in accordance with the clock signal.

14. The bus interface system of claim 11 wherein:
the second bus controller includes memory;
the cross over write command includes a payload segment wherein the cross over write command is formatted in accordance with the first bus protocol to request that the payload segment be written to a memory location in the memory of the second bus controller; and the translation bus controller is configured to translate the first decoded write command into the translated write command formatted in accordance with the second bus protocol to request that a copy of the payload segment be written to the memory location in the memory of the second bus controller.

15. The bus interface system of claim 14 wherein a slave bus controller is configured to implement the write bus operation that is requested by the second decoded write command by being configured to write a copy of the payload segment to the memory location in the memory of the second bus controller.

16. A translation bus controller comprising:

first bus communication circuitry operable to receive a first input data signal that represents a cross over write command in accordance with a first bus protocol wherein the cross over write command is formatted in accordance with the first bus protocol to request that a write bus operation be implemented by an external bus controller coupled to the first bus communication circuitry via a first bus consisting of one bus wire and wherein the first bus communication circuitry is configured to decode the first input data signal that represents the cross over write command into a decoded write command; and second bus communication circuitry operably associated with the first bus communication circuitry and operable to generate a second input data signal, wherein the second bus communication circuitry is configured to:

translate the decoded write command into a translated write command that is a translation of the cross over write command such that the translated write command requests the write bus operation of the cross over write command but the translated write command is formatted in accordance with a second bus protocol;

modulate the second input data signal such that the second input data signal represents the translated write command in accordance with the second bus protocol; and transmit the second input data signal to the external bus controller.

17. The translation bus controller of claim 16 further comprises power conversion circuitry configured to convert the first input data signal into a supply voltage that powers the first bus communication circuitry.

18. The translation bus controller of claim 16 wherein the first bus protocol is a one wire bus protocol and the second bus protocol is a Mobile Industry Processor Interface (MIPI) radio frequency front end (RFFE) bus protocol.

19. A method comprising:

receiving by a first bus controller a first input data signal that represents a cross over write command in accordance with a first bus protocol, wherein the cross over write command is formatted in accordance with the first bus protocol to request that a write bus operation be implemented by an external bus controller;

decoding by a second bus controller coupled to the first bus controller via a first bus consisting of one bus wire the first input data signal that represents the cross over write command into a decoded write command;

translating by the second bus controller the decoded write command into a translated write command that is a translation of the cross over write command such that the translated write command requests the write bus operation of the cross over write command but the translated write command is formatted in accordance with a second bus protocol; and transmitting by the second bus controller a second input data signal to the external bus controller such that the second input data signal represents the translated write command in accordance with the second bus protocol.

20. The method of claim 19 further comprising converting by the second bus controller the first input data signal into a first supply voltage.

* * * * *

UNITED STATES PATENT AND TRADEMARK OFFICE
CERTIFICATE OF CORRECTION

PATENT NO. : 10,698,847 B2  
APPLICATION NO. : 15/365295  
DATED : June 30, 2020  
INVENTOR(S) : Ngo et al.

Page 1 of 1

It is certified that error appears in the above-identified patent and that said Letters Patent is hereby corrected as shown below:

In the Specification

Column 46, Line 12, replace "COME" with --COM6--.  
Column 47, Line 32, replace "COME" with --COM6--.  
Column 49, Line 54, replace "COME" with --COM6--.  
Column 66, Line 22, replace "COME" with --COM6--.

Signed and Sealed this  
Eleventh Day of August, 2020

Andrei Iancu  
*Director of the United States Patent and Trademark Office*